(12) United States Patent
Thompson et al.

(10) Patent No.: US 8,524,343 B2
(45) Date of Patent: *Sep. 3, 2013

(54) POLYESTER RESINS FOR HIGH-EFFICIENCY INJECTION MOLDING

(75) Inventors: David Eugene Thompson, Matthews, NC (US); Carl Steven Nichols, Waxhaw, NC (US); Tony Clifford Moore, Charlotte, NC (US); Sharon Sue Griffith, Charlotte, NC (US); Billy Mack Humelsine, Waxhaw, NC (US); Robert Joseph Schiavone, Matthews, NC (US)

(73) Assignee: DAK Americas Mississippi Inc., Bay St. Louis, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/210,464

(22) Filed: Aug. 16, 2011

(65) Prior Publication Data

US 2012/0148771 A1 Jun. 14, 2012

Related U.S. Application Data

(63) Continuation of application No. 12/124,592, filed on May 21, 2008, now abandoned, which is a continuation-in-part of application No. PCT/US2006/061187, filed on Nov. 22, 2006.

(60) Provisional application No. 60/738,867, filed on Nov. 22, 2005, provisional application No. 60/739,796, filed on Nov. 23, 2005, provisional application No. 60/739,498, filed on Nov. 23, 2005, provisional application No. 60/739,645, filed on Nov. 23, 2005.

(51) Int. Cl.
*B29D 22/00* (2006.01)
*B29D 23/00* (2006.01)
*B32B 1/08* (2006.01)

(52) U.S. Cl.
USPC ....... 428/35.7; 428/411.1; 428/412; 502/150; 502/208

(58) Field of Classification Search
USPC ............. 428/411.1, 412, 35.7; 502/150, 502/208; 528/271, 272
See application file for complete search history.

(56) References Cited

U.S. PATENT DOCUMENTS 5,744,571 A * 4/1998 Hilbert et al. ............ 528/272
6,150,454 A * 11/2000 Wu et al. .................. 524/492

* cited by examiner

*Primary Examiner* — Michael C Miggins
(74) *Attorney, Agent, or Firm* — Oblon, Spivak, McClelland, Maier & Neustadt, L.L.P.

(57) ABSTRACT

The present invention relates to titanium-catalyzed polyethylene terephthalate resins that are capable of being formed into articles (e.g., carbonated soft drink and water bottle preforms) at reduced injection-molding cycle times. In particular, the titanium-catalyzed polyethylene terephthalate resins of the present invention can be formed into carbonated soft drink bottle preforms at reduced injection-molding cycle times to yield high-clarity, carbonated soft drink bottles that possess satisfactory resistance to stress cracking and thermal creep.

43 Claims, 26 Drawing Sheets

FIG. 9 (Acetaldehyde Concentration)

FIG. 10 (Maximum Fill Pressure)

FIG. 11 (Plaque Haze v. Thickness)

FIG. 13 (Absorbance vs. Wavelength)

FIG. 14 (Absorbance vs. Wavelength)

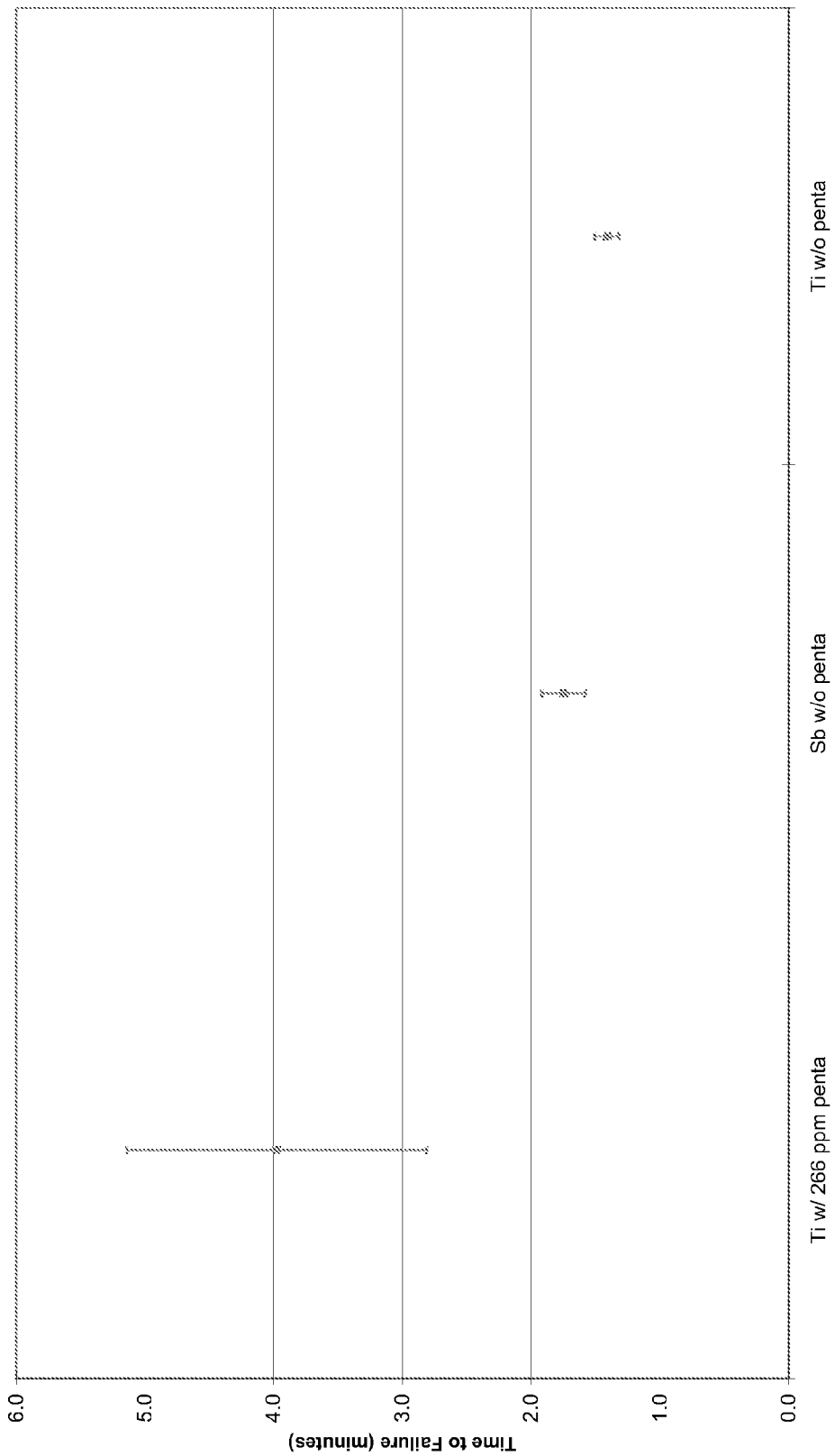

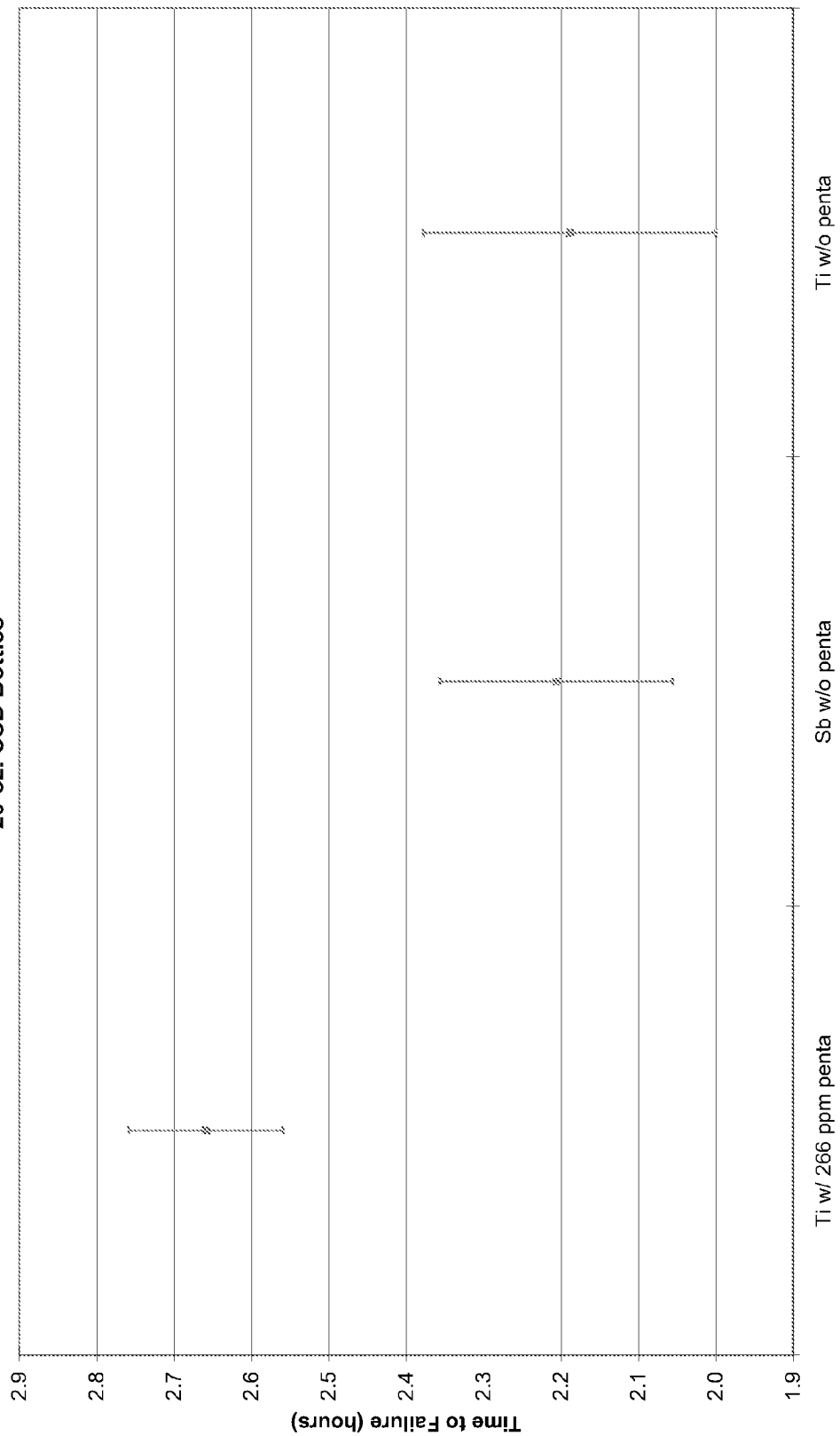

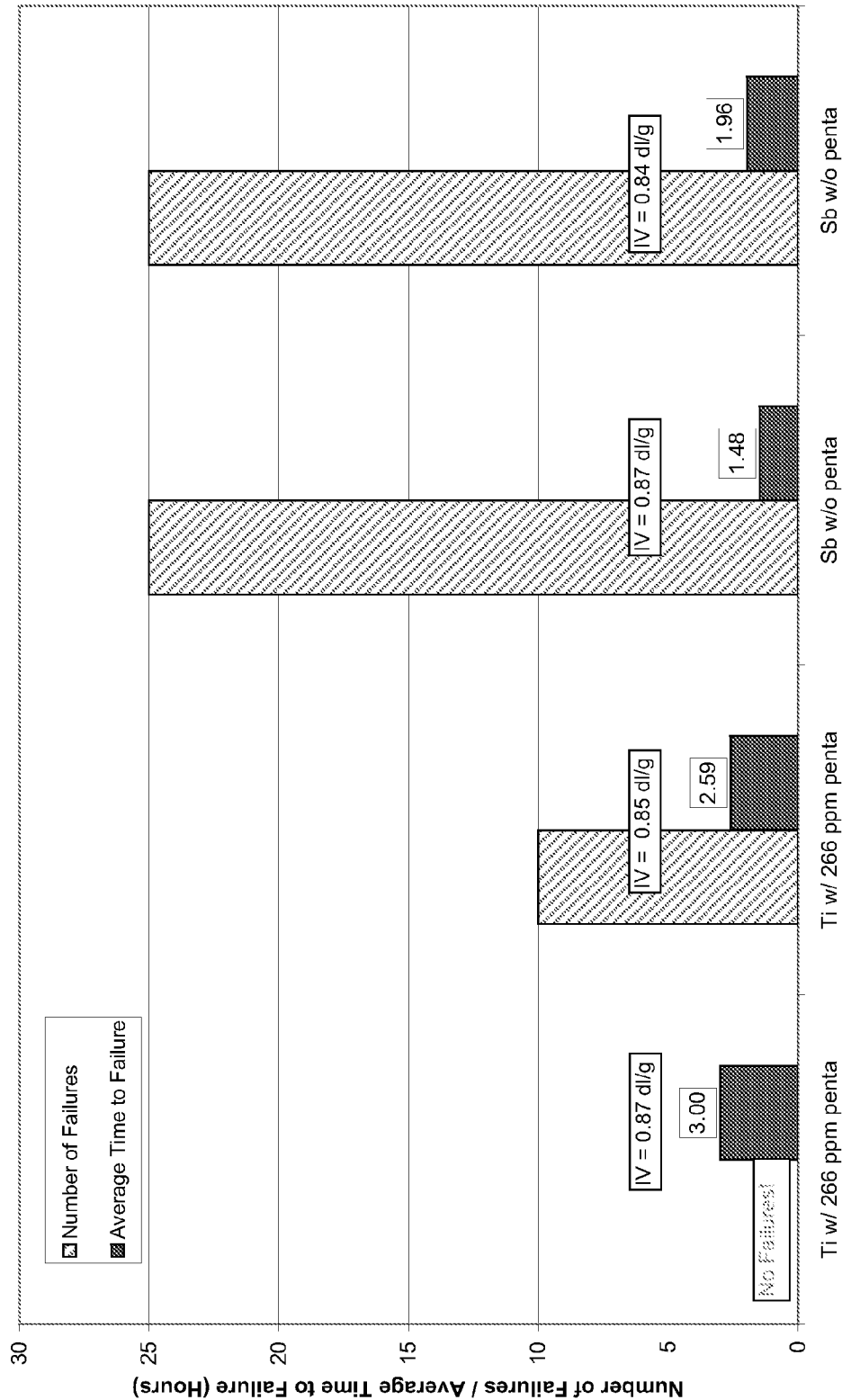

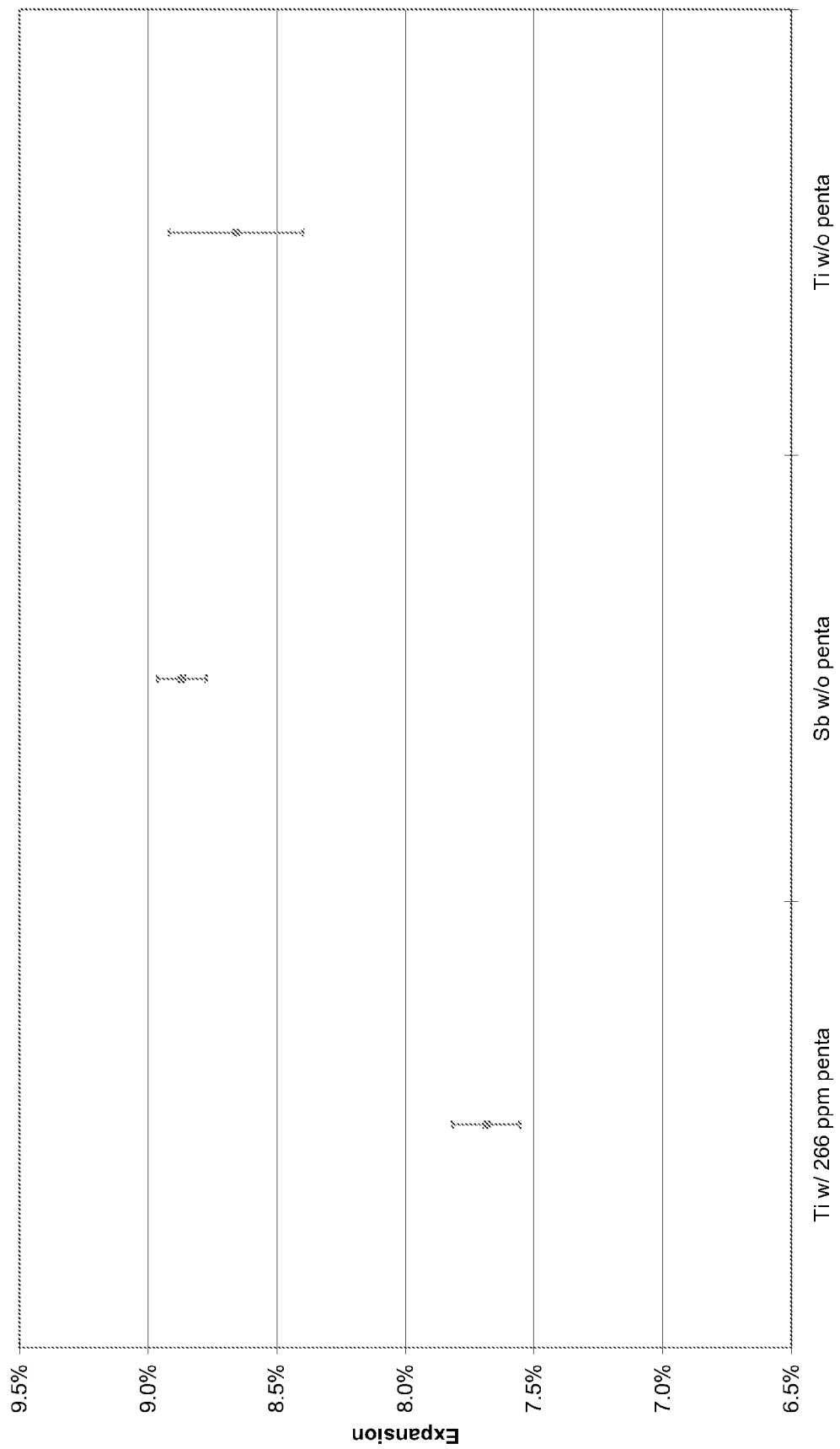

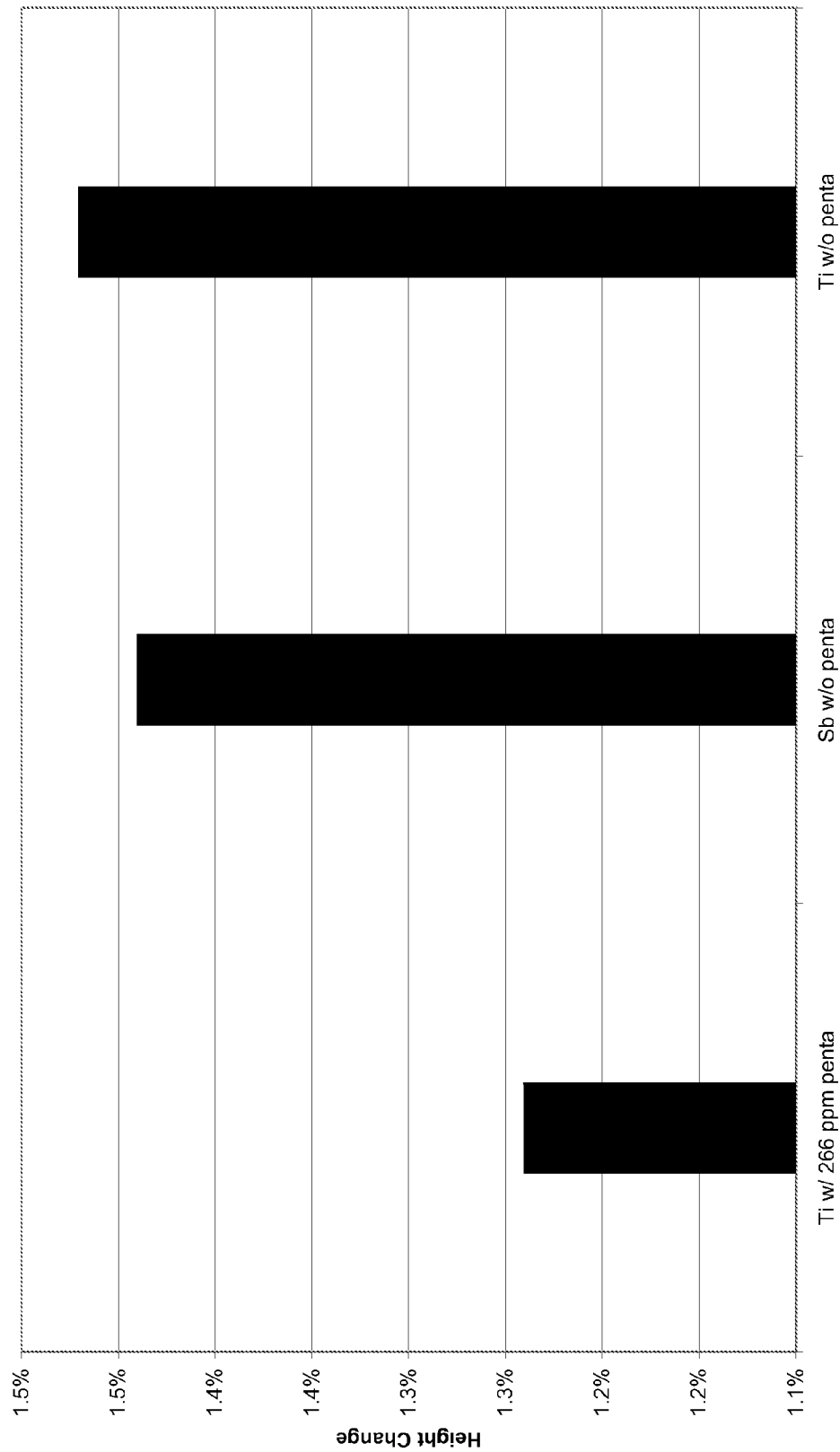

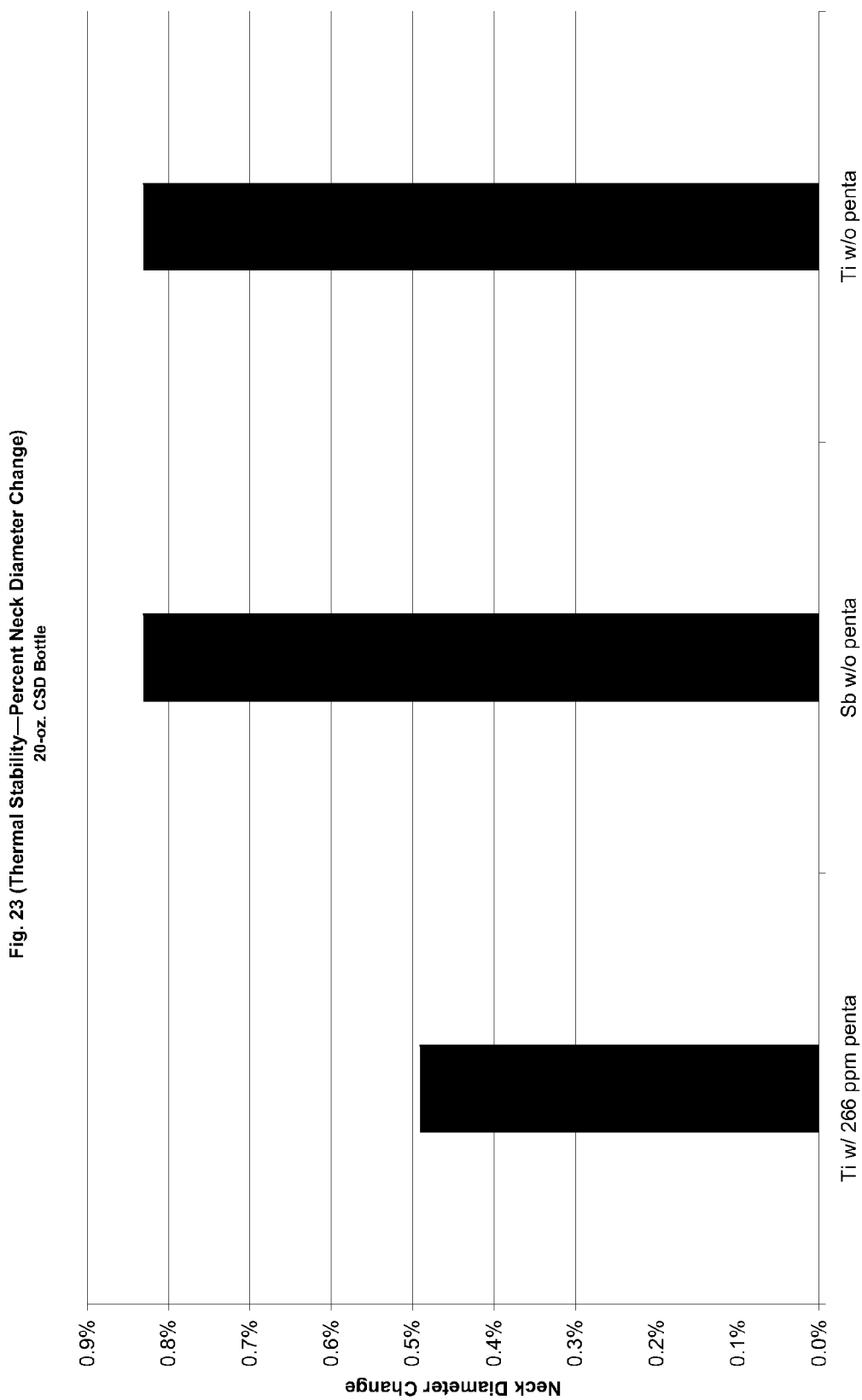

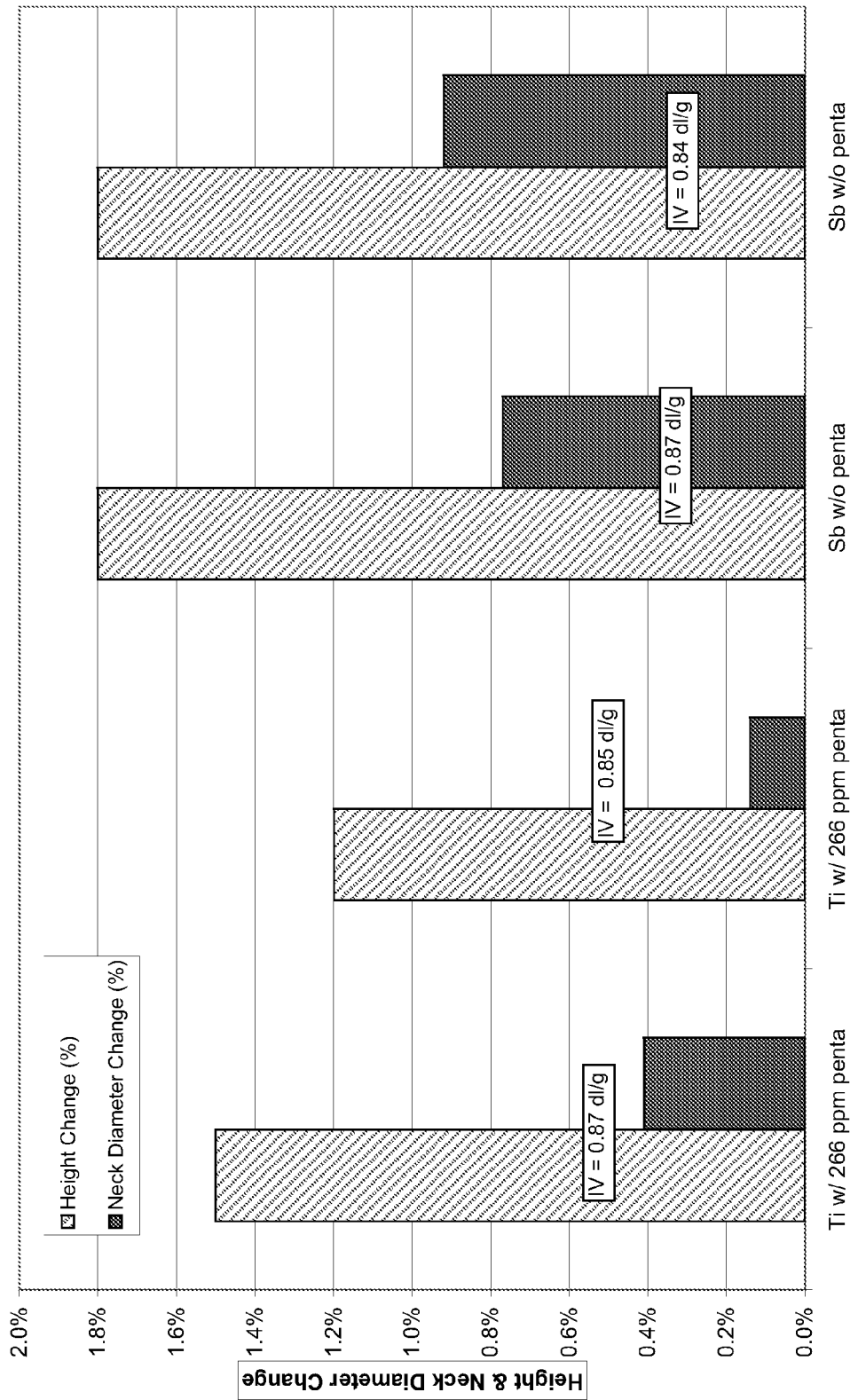

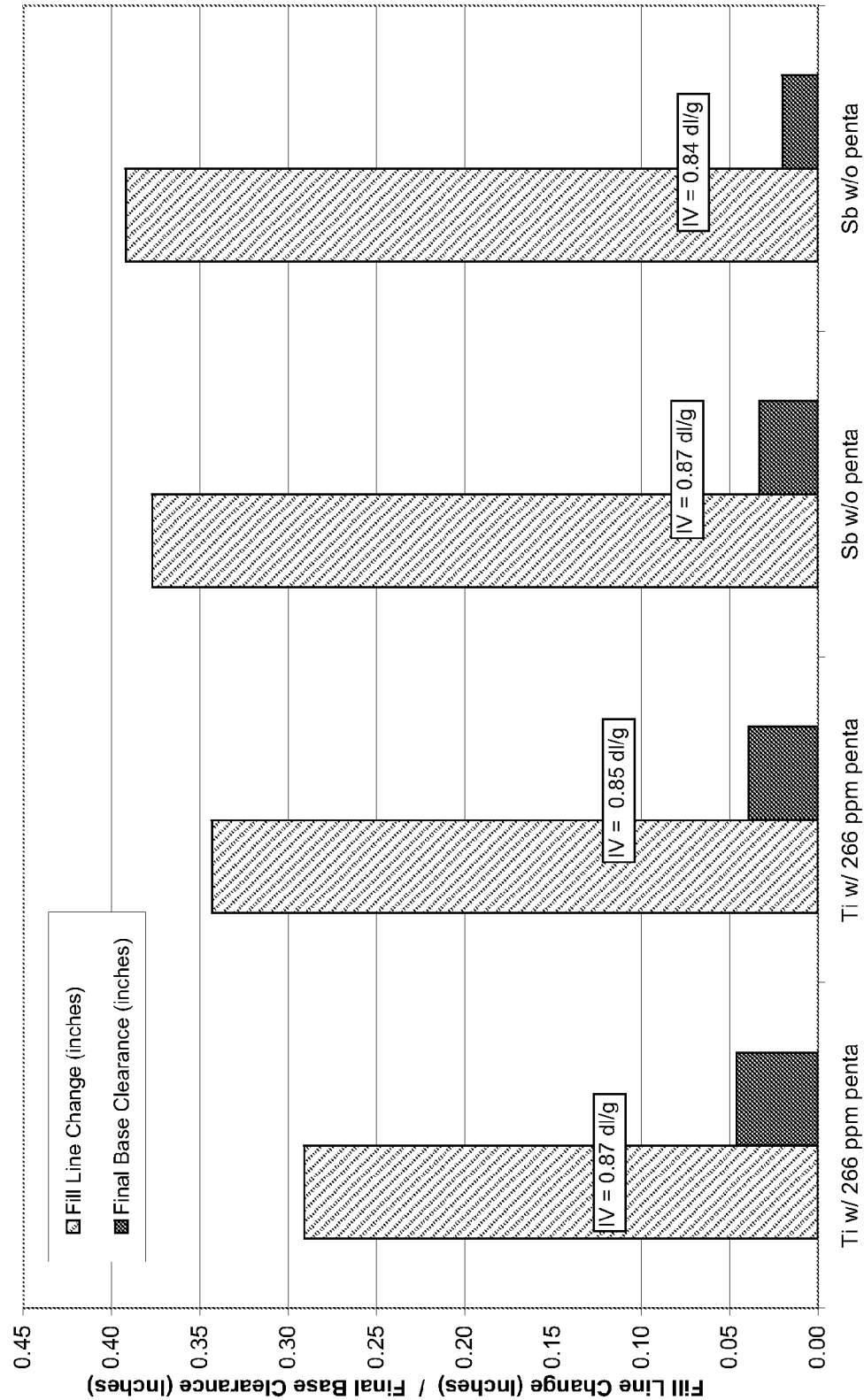
Fig. 25 (Thermal Stability—Fill Line and Base Clearance) 20-oz. CSD Bottle

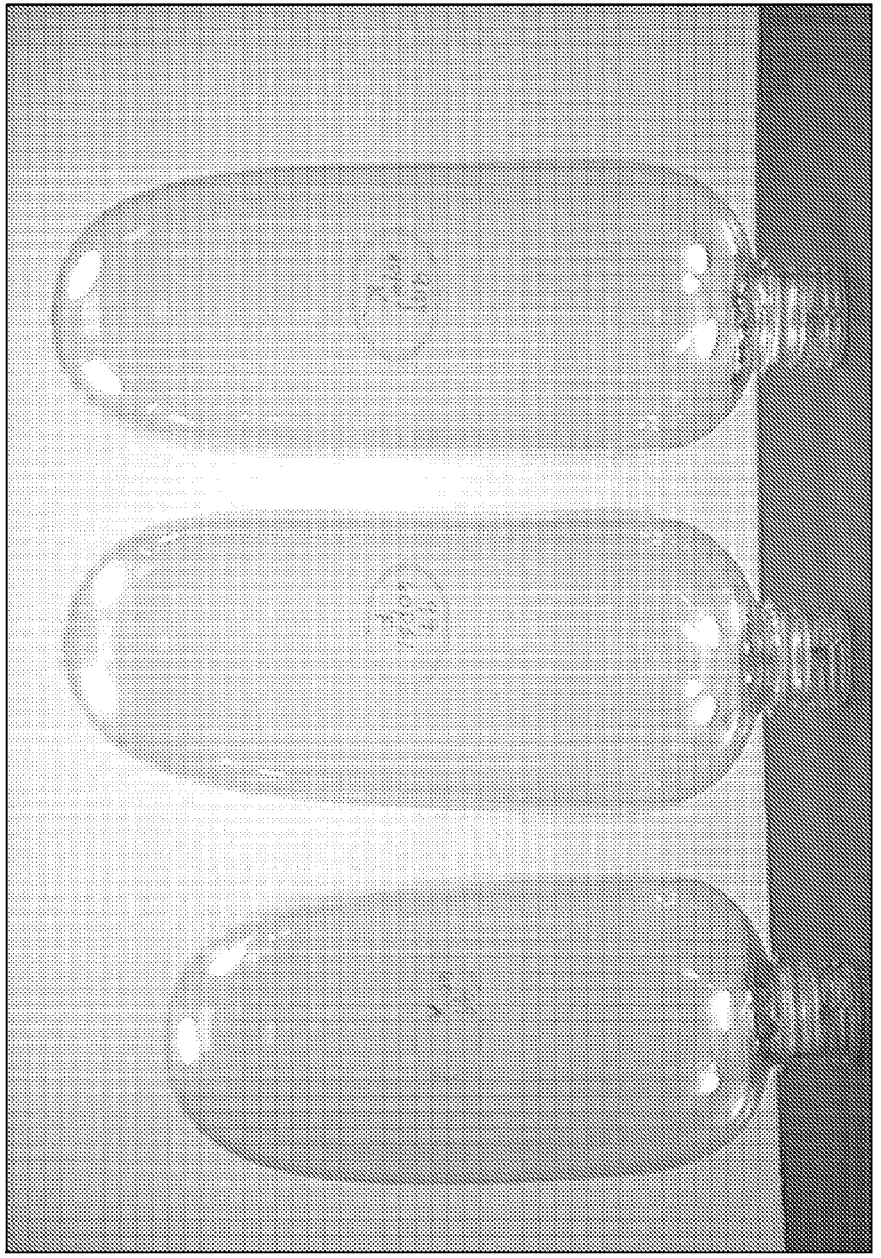
Fig. 26 (Natural Stretch Ratio)
20-oz. CSD preforms ("free blow" @ 60 psig and 99°C)
Ti w/ 266 ppm pentaerythritol    Sb w/o pentaerythritol    Ti w/o pentaerythritol

POLYESTER RESINS FOR HIGH-EFFICIENCY INJECTION MOLDING

CROSS-REFERENCE TO PRIORITY APPLICATIONS

This application is a continuation of U.S. patent application Ser. No. 12/124,592 for Polyester Resins for High-Efficiency Injection Molding, filed May 21, 2008 now abandoned, (and published Nov. 6, 2008, as Publication No. 2008/0274317 A1), which is hereby incorporated by reference in its entirety and which is itself a continuation-in-part of commonly assigned International Patent Application No. PCT/US2006/061187 for Polyester Resins for High-Efficiency Injection Molding, filed Nov. 22, 2006, (and published May 31, 2007, as Publication No. WO 2007/062384), which is hereby incorporated by reference in its entirety and which itself claims the benefit of the following commonly assigned provisional patent applications, each of which is hereby incorporated by reference in its entirety: U.S. Provisional Patent Application Ser. No. 60/738,867, for Melt-Phase Polycondensation of Titanium-Catalyzed PET Resins, filed Nov. 22, 2005; U.S. Provisional Patent Application Ser. No. 60/739,796, for Polyester Resins for High-Strength Articles, filed Nov. 23, 2005; U.S. Provisional Patent Application Ser. No. 60/739,498, for Polyester Resins for High-Efficiency Injection Molding, filed Nov. 23, 2005; and U.S. Provisional Patent Application Ser. No. 60/739,645, for Polyalkylene Terephthalate Resins for High-Strength Articles, filed Nov. 23, 2005.

CROSS-REFERENCE TO COMMONLY ASSIGNED APPLICATIONS

This application incorporates entirely by reference the following commonly assigned patent and patent applications, which disclose polymer resins and polymer processes: U.S. patent application Ser. No. 09/456,253, filed Dec. 7, 1999, for a Method of Preparing Modified Polyester Bottle Resins, now U.S. Pat. No. 6,284,866; U.S. patent application Ser. No. 09/851,240, filed May 8, 2001, for a Method of Preparing Modified Polyester Bottle Resins, now U.S. Pat. No. 6,335,422; U.S. patent application Ser. No. 10/850,269, for Methods of Making Titanium-Catalyzed Polyester Resins, filed May 20, 2004, (and published Nov. 24, 2005, as Publication No. 2005/0261462 A1); U.S. patent application Ser. No. 10/850,918, for Slow-Crystallizing Polyester Resins, now U.S. Pat. No. 7,129,317; U.S. patent application Ser. No. 10/996,789, for Polyester Preforms Useful for Enhanced Heat-Set Bottles, filed Nov. 24, 2004, now U.S. Pat. No. 7,094,863; U.S. patent application Ser. No. 11/046,481, for Methods of Making Imide-Modified Polyester Resins, filed Jan. 28, 2005, (and published Aug. 4, 2005, as Publication No. 2005/0171326 A1); and U.S. patent application Ser. No. 11/466,066, filed Aug. 21, 2006, for Polyester Resins for High-Strength Articles, filed Aug. 21, 2006, (and published Mar. 15, 2007, as Publication No. 2007/0059465 A1).

This application further incorporates entirely by reference the following commonly assigned patents and patent applications, which disclose methods for introducing additives to polymers: Ser. No. 08/650,291 for a Method of Post-Polymerization Stabilization of High Activity Catalysts in Continuous Polyethylene Terephthalate Production, filed May 20, 1996, now U.S. Pat. No. 5,898,058; Ser. No. 09/738,150, for Methods of Post-Polymerization Injection in Continuous Polyethylene Terephthalate Production, filed Dec. 15, 2000, now U.S. Pat. No. 6,599,596; Ser. No. 09/932,150, for Methods of Post-Polymerization Extruder Injection in Polyethylene Terephthalate Production, filed Aug. 17, 2001, now U.S. Pat. No. 6,569,991; Ser. No. 10/017,612, for Methods of Post-Polymerization Injection in Condensation Polymer Production, filed Dec. 14, 2001, now U.S. Pat. No. 6,573,359; Ser. No. 10/017,400, for Methods of Post-Polymerization Extruder Injection in Condensation Polymer Production, filed Dec. 14, 2001, now U.S. Pat. No. 6,590,069; Ser. No. 10/628,077, for Methods for the Late Introduction of Additives into Polyethylene Terephthalate, filed Jul. 25, 2003, now U.S. Pat. No. 6,803,082; and Ser. No. 10/962,167, for Methods for Introducing Additives into Polyethylene Terephthalate, filed Oct. 8, 2004, (and published Aug. 4, 2005, as Publication No. 2005/0170175 A1).

This application further incorporates entirely by reference the following commonly assigned patents and patent applications, which disclose polymer resins having reduced frictional properties and associated methods: Ser. No. 09/738,619, for Polyester Bottle Resins Having Reduced Frictional Properties and Methods for Making the Same, filed Dec. 15, 2000, now U.S. Pat. No. 6,500,890; Ser. No. 10/177,932 for Methods for Making Polyester Bottle Resins Having Reduced Frictional Properties, filed Jun. 21, 2002, now U.S. Pat. No. 6,710,158; and Ser. No. 10/176,737 for Polymer Resins Having Reduced Frictional Properties, filed Jun. 21, 2002, now U.S. Pat. No. 6,727,306.

Finally, this application further incorporates entirely by reference the following commonly assigned international patent applications, which disclose polymer resins and polymer processes: International Patent Application No. PCT/US04/16375 for Slow-Crystallizing Polyester Resins, filed May 21, 2004 (and published Dec. 2, 2004, as WO 2004/104080); International Patent Application No. PCT/US04/39726 for Methods of Making Titanium-Catalyzed Polyethylene Terephthalate Resins, filed Nov. 24, 2004 (and published Nov. 3, 2005, as WO 2005/103110); International Patent Application No. PCT/US05/03149 for Imide-Modified Polyester Resins and Methods of Making the Same, filed Jan. 28, 2005, (and published Aug. 11, 2005, as Publication No. WO 2005/073272); International Patent Application No. PCT/US06/02385 for Improved Polyamide-Polyester Polymer Blends and Methods of Making the Same, filed Jan. 23, 2006, (and published Jul. 27, 2006), as Publication No. WO 2006/079044; International Patent Application No. PCT/US06/044185, for Alumina-Enhanced Polyester Resins and Methods for Making the Same, filed Nov. 14, 2006, (and published May 24, 2007, as Publication No. WO 2007/059128); International Patent Application No. PCT/US07/67392 for Methods for Making Polyester Resins in Falling Film Melt Polycondensation Reactors, filed Apr. 25, 2007, (and published Nov. 8, 2007, as Publication No. WO 2007/127786); International Patent Application No. PCT/US07/73224 for Solid Phase Polymerization Catalyst System, filed Jul. 11, 2007, (and published Jan. 17, 2008, as Publication No. WO 2008/008813); and International Patent Application No. PCT/US07/73259 for Composite Solid Phase Polymerization Catalyst, filed Jul. 11, 2007, (and published Jan. 17, 2008, as Publication No. WO 2008/008836).

BACKGROUND OF THE INVENTION

Because of their strength, heat resistance, and chemical resistance, polyester containers, films, sheets, and fibers are an integral component in numerous consumer products manufactured worldwide. In this regard, most commercial polyester used for polyester containers, films, and fibers is polyethylene terephthalate polyester.

Polyester resins, especially polyethylene terephthalate and its copolyesters, are also widely used to produce rigid packaging, such as two-liter soft drink containers. Polyester packages produced by stretch-blow molding possess outstanding strength and shatter resistance, and have excellent gas barrier and organoleptic properties as well. Consequently, such lightweight plastics have virtually replaced glass in packaging numerous consumer products (e.g., carbonated soft drinks, fruit juices, and peanut butter).

In conventional processes for making polyester resins, modified polyethylene terephthalate resin is polymerized in the melt phase to an intrinsic viscosity of about 0.6 deciliters per gram (dL/g), whereupon it is further polymerized in the solid phase to achieve an intrinsic viscosity that better promotes bottle formation. Thereafter, the polyethylene terephthalate may be formed into articles, such as by injection molding preforms, which in turn may be stretch-blow molded into bottles.

Unfortunately, at normal production rates, most polyester resins cannot be efficiently formed into preforms and bottles that are suitable for hot-fill applications. Most high-clarity polyester bottles do not possess the necessary dimensional stability to be hot-filled with product at temperatures between about 180° F. and 205° F., especially between about 195° F. and 205° F. In particular, at such elevated temperature conventional polyester bottles exhibit unacceptable shrinkage and haze. In addition, polyester bottles that package carbonated beverages have been known to suffer stress cracking, which leads to catastrophic failure, or exhibit thermal instability (e.g., thermal creep), which can result in packaging deformations such as (e.g., fill-line drop, base rocking, and label distortion).

Therefore, there is a need for polyethylene terephthalate resins that are suitable for high-clarity, hot-fill bottles and/or high-clarity, carbonated soft drink (CSD) and water bottles. In particular, there is a need for polyethylene terephthalate resins that can be formed into CSD bottle preforms at reduced injection-molding cycle times to yield high-clarity bottles that possess satisfactory—if not excellent—resistance to stress cracking and thermal creep.

SUMMARY OF THE INVENTION

Accordingly, it is an object of the present invention to provide polyester resin that is capable of being efficiently formed into low-haze, high-clarity articles.

It is a further object of the present invention to provide a polyethylene terephthalate resin that can be efficiently formed into high-clarity polyester preforms and bottles.

It is a further object of the present invention to provide a polyethylene terephthalate resin that can be efficiently formed into high-strength, high-clarity polyester bottles suitable for carbonated soft drinks.

It is a further object of the present invention to provide a polyethylene terephthalate resin that can be formed over a wide stretch-blow molding process window into high-strength, high-clarity polyester bottles.

It is a further object of the present invention to provide high-clarity polyester bottles that possess superior strength properties with respect to stress cracking and thermal stability.

It is a further object of the present invention to provide high-clarity preforms that have improved reheating profiles and that can be efficiently formed into hot-fill polyester bottles.

It is a further object of the present invention to provide high-clarity polyester bottles that retain acceptable dimensional stability upon being filled with product at temperatures between about 195° F. and 205° F.

It is a further object of the present invention to provide methods for efficiently forming titanium-catalyzed polyethylene terephthalate resins, preforms, and bottles.

It is a further object of the present invention to provide methods for efficiently forming titanium-catalyzed polyethylene terephthalate resins via melt-phase polycondensation.

It is a further object of the present invention to provide methods for efficiently forming titanium-catalyzed polyethylene terephthalate preforms at reduced injection-molding cycle times.

It is a further object of the present invention to provide a polyethylene terephthalate resin that can be used to make fibers, yarns, and fabrics.

The foregoing, as well as other objectives and advantages of the invention and the manner in which the same are accomplished, is further specified within the following detailed description and its accompanying drawings.

BRIEF DESCRIPTION OF THE DRAWINGS

FIG. 17 compares caustic stress cracking (95-percent confidence intervals) for 20-oz. carbonated soft drink bottles formed from titanium-catalyzed and antimony-catalyzed polyethylene terephthalate resins (both with and without pentaerythritol branching agent) as determined according to the accelerated testing methodology of the International Society of Beverage Technologists (ISBT).

FIG. 18 compares caustic stress cracking (95-percent confidence intervals) for 20-oz. carbonated soft drink bottles formed from titanium-catalyzed and antimony-catalyzed polyethylene terephthalate resins (both with and without pentaerythritol branching agent) upon prolonged exposure to less severe conditions than those of ISBT's accelerated testing methodology.

FIG. 19 compares caustic stress cracking (95-percent confidence intervals) for two-liter carbonated soft drink bottles formed from titanium-catalyzed polyethylene terephthalate resins that include pentaerythritol and antimony-catalyzed polyethylene terephthalate resins that exclude branching agent as determined according to ISBT's accelerated testing methodology.

FIG. 20 compares caustic stress cracking for 20-oz. carbonated soft drink bottles formed from titanium-catalyzed polyethylene terephthalate resins that include pentaerythritol and antimony-catalyzed polyethylene terephthalate resins that exclude branching agent upon prolonged exposure to less severe conditions than those of ISBT's accelerated testing methodology.

FIG. 21 compares percent high-pressure expansion (95-percent confidence intervals) for 20-oz. carbonated soft drink bottles formed from titanium-catalyzed and antimony-catalyzed polyethylene terephthalate resins (both with and without pentaerythritol branching agent).

FIG. 22 compares thermal stability (i.e., percent height change) for 20-oz. carbonated soft drink bottles formed from titanium-catalyzed and antimony-catalyzed polyethylene terephthalate resins (both with and without pentaerythritol branching agent).

FIG. 23 compares thermal stability (i.e., percent neck diameter change) for 20-oz. carbonated soft drink bottles formed from titanium-catalyzed and antimony-catalyzed polyethylene terephthalate resins (both with and without pentaerythritol branching agent).

FIG. 24 compares thermal stability (i.e., percent height and neck diameter change) for 20-oz. carbonated soft drink bottles formed from titanium-catalyzed polyethylene terephthalate resins that include pentaerythritol and antimony-catalyzed polyethylene terephthalate resins that exclude branching agent.

FIG. 25 compares thermal stability (i.e., fill line change and final base clearance) for 20-oz. carbonated soft drink bottles formed from titanium-catalyzed polyethylene terephthalate resins that include pentaerythritol and antimony-catalyzed polyethylene terephthalate resins that exclude branching agent.

FIG. 26 depicts the free-blow results for preforms formed from titanium-catalyzed and antimony-catalyzed polyethylene terephthalate resins (both with and without pentaerythritol branching agent).

DETAILED DESCRIPTION

Figure 1:
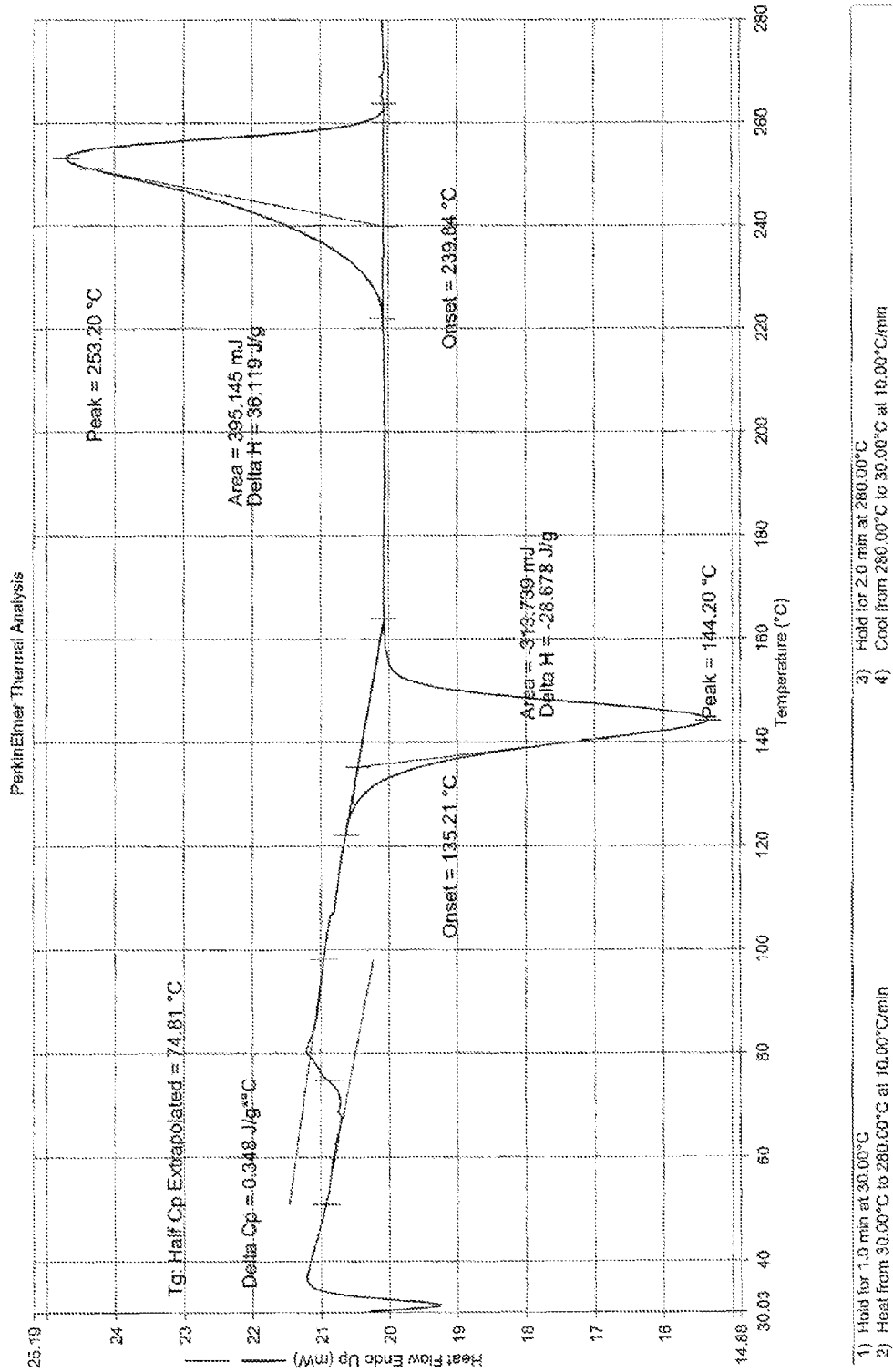
FIGS. 1-2 illustrate differential scanning calorimetry thermal analyses performed on a titanium-catalyzed polyethylene terephthalate resin having an intrinsic viscosity of 0.78 dL/g and being modified with 1.6 mole percent diethylene glycol and 1.5 mole percent isophthalic acid.

The invention is a slow-crystallizing polyethylene terephthalate resin. As herein disclosed, the polyethylene terephthalate resins of the present invention possess a significantly higher heating crystallization exotherm peak temperature ($T_{CH}$) as compared with those of conventional antimony-catalyzed polyethylene terephthalate resins. This elevated heating crystallization exotherm temperature delays the onset of crystallization. Accordingly, the polyethylene terephthalate resins of the present invention are especially useful for making hot-fill bottles having exceptional clarity and shrinkage properties.

In one aspect, the invention is a polyethylene terephthalate resin possessing a heating crystallization exotherm peak temperature ($T_{CH}$) of more than about 140° C., an absorbance (A) of at least about 0.18 cm$^{-1}$ at a wavelength of 1100 nm or 1280 nm, and an L* value of more than about 70 as classified in the CIE L*a*b* color space.

In another aspect, the invention is a polyethylene terephthalate resin that includes at least 2 parts per million (ppm)—and typically less than 50 ppm—of elemental titanium and less than about 6 mole percent comonomer substitution. This titanium-catalyzed polyethylene terephthalate resin is especially useful in containers, sheets, films, and packaging, but may be used for fibers, yarns, and fabrics as well.

In yet another aspect, the invention is a titanium-catalyzed polyethylene terephthalate resin that can be formed into polyester articles (e.g., bottle preforms) at reduced injection-molding cycle times. This polyethylene terephthalate resin typically includes at least about 94 mole percent terephthalate component (i.e., mostly terephthalic acid or its dialkyl ester, dimethyl terephthalate), and a diol component that includes at least about 94 mole percent ethylene glycol. In this aspect, therefore, the titanium-catalyzed polyethylene terephthalate resin may include nearly 12 mole percent comonomer substitution (e.g., between about 7 and 10 mole percent). In some instances, however, the terephthalate component may include additional comonomer substitution such that the terephthalate component includes at least about 90 mole percent terephthalic acid or dimethyl terephthalate (e.g., 92 percent or more diacid or dialkyl ester comonomer substitution.) In other instances, the diol component may include additional comonomer substitution such that the diol component includes at least about 90 mole percent ethylene glycol (e.g., 92 percent or more diol comonomer substitution.)

In yet another aspect, the invention is a polyethylene terephthalate preform that is useful for enhanced heat-set bottles. The polyethylene terephthalate preform possesses a heating crystallization exotherm peak temperature ($T_{CH}$) of more than about 140° C., an absorbance (A) of at least about 0.18 cm$^{-1}$ at a wavelength of 1100 nm or 1280 nm, and an L* value of more than about 70 as classified in the CIE L*a*b* color space.

In yet another aspect, the invention is a polyester preform that can be formed into a high-clarity bottle that has excellent, low shrinkage properties. The preform typically includes less than about six (6) mole percent comonomer substitution and has an intrinsic viscosity of less than about 0.86 dL/g. In a related aspect, the invention is a high-clarity, hot-fill bottle formed from the preform.

In yet another aspect, the invention is a polyester preform that can be formed into a high-clarity bottle having excellent thermal expansion properties. The preform typically includes less than about six (6) mole percent comonomer substitution and has an intrinsic viscosity of between about 0.78 and 0.86 dL/g. In a related aspect, the invention is a high-strength, high-clarity carbonated soft drink bottle formed from the preform. The carbonated soft drink bottle is capable of withstanding internal pressures of about 60 psig.

In yet another aspect, the invention is a titanium-based catalyst system that facilitates the melt phase polymerization of these polyethylene terephthalate resins.

In yet another aspect, the invention is a catalyst system of Group I and Group II metals that facilitates the solid state polymerization (SSP) of polyethylene terephthalate resins. The SSP catalyst system may include alkali earth metals (i.e., Group I metals), alkaline earth metals (i.e., Group II metals), or both.

In yet another aspect, the invention embraces methods for making such polyester resins, preforms, and bottles, as well as other articles (e.g., films and 1+millimeter sheets). In this regard, the method generally includes reacting a terephthalate component and a diol component (i.e., a terephthalate moiety and a diol moiety) in the presence of a titanium catalyst to form polyethylene terephthalate precursors, which are then polymerized via melt phase polycondensation to form polymers of polyethylene terephthalate of desired molecular weight. During polycondensation, which is usually enhanced by catalysts, ethylene glycol is continuously removed to create favorable reaction kinetics.

Those having ordinary skill in the art will appreciate that most commercial polyethylene terephthalate polymers are, in fact, modified polyethylene terephthalate polyesters (i.e., the reaction of the terephthalate moiety and the diol moiety typically yields polyethylene terephthalate prepolymers having at least some comonomer substitution.). Indeed, the "polyethylene terephthalate resins" described herein are typically modified polyethylene terephthalate polyesters. In this regard, the modifiers in the terephthalate component and the diol component (i.e., the terephthalate moiety and the diol moiety) are typically randomly substituted in the resulting polyester composition.

The polyethylene terephthalate resins according to the present invention will generally include less than about 12 mole percent comonomer substitution (e.g., between about 1 and 10 mole percent modifiers). The polyethylene terephthalate resins more typically include less than 8 mole percent comonomer substitution and more than 2 mole percent comonomer substitution (e.g., between about 3 and 6 mole percent modifiers; between about 5 and 8 mole percent modifiers).

As noted, for many applications the titanium-catalyzed polyethylene terephthalate resin possesses low comonomer substitution. For such applications, the polyethylene terephthalate generally includes less than about 6 mole percent comonomer substitution. The polyethylene terephthalate typically includes less than 5 mole percent comonomer substitution or more than 2 mole percent comonomer substitution, or both (i.e., between about 2 and 5 mole percent).

Although higher comonomer substitution disrupts crystallization, thereby improving clarity, heat-setting is enhanced at lower comonomer substitution. Thus, for resins used in making hot-fill bottles, the polyethylene terephthalate typically includes between about 3 and 4 mole percent comonomer substitution. For example, in one such embodiment the modified polyethylene terephthalate is composed of about a 1:1 molar ratio of (1) a diacid component of 2.4 mole percent isophthalic acid with the remainder terephthalic acid, and (2) a diol component of 1.6 mole percent diethylene glycol and the remainder ethylene glycol.

In addition, and as discussed herein, production from injection molding operations (e.g., making bottle preforms) may be increased using resins that possess lower melting points. Such polyethylene terephthalate resins for high-efficiency injection molding can be achieved within the scope of the present invention by maintaining the comonomer substitution less than about 10 mole percent comonomer substitution (e.g., about 8 mole percent), typically at about 6 mole percent (e.g., between 5 and 7 mole percent). To provide a polyethylene terephthalate resin for high-efficiency injection molding, diethylene glycol is an exemplary diol modifier and isophthalic acid and its dialkyl ester, dimethyl isophthalate, are exemplary diacid and diester modifiers, respectively.

Furthermore, to achieve this aspect of the present invention the concentration of diethylene glycol (or other diol modifier) may be greater than the concentration of the diacid or diester comonomer modifiers by a mole ratio of at least 3:2, typically at least 2:1, and in some instances at least 3:1. Alternatively, the concentration of the diacid or diester comonomer modifiers (e.g., isophthalic acid or dimethyl isophthalate) may be greater than the concentration of the diol comonomer modifiers (e.g., diethylene glycol) by a mole ratio of at least 3:2, typically at least 2:1, and in some instances at least 3:1 (e.g., between about 1.6 and 2.4 mole percent diethylene glycol and between about 2.4 and 4.8 mole percent isophthalic acid).

As used herein, the term "diol component" refers primarily to ethylene glycol, although other diols (e.g., diethylene glycol) may be used as well.

The term "terephthalate component" broadly refers to diacids and diesters that can be used to prepare polyethylene terephthalate. In particular, the terephthalate component mostly includes either terephthalic acid or dimethyl terephthalate, but can include diacid and diester comonomers as well. In other words, the "terephthalate component" is either a "diacid component" or a "diester component."

The term "diacid component" refers somewhat more specifically to diacids (e.g., terephthalic acid) that can be used to prepare polyethylene terephthalate via direct esterification. The term "diacid component," however, is intended to embrace relatively minor amounts of diester comonomer (e.g., mostly terephthalic acid and one or more diacid modifiers, but optionally with some diester modifiers, too).

Similarly, the term "diester component" refers somewhat more specifically to diesters (e.g., dimethyl terephthalate) that can be used to prepare polyethylene terephthalate via ester exchange. The term "diester component," however, is intended to embrace relatively minor amounts of diacid comonomer (e.g., mostly dimethyl terephthalate and one or more diester modifiers, but optionally with some diacid modifiers, too).

Moreover, as used herein, the term "comonomer" is intended to include monomeric and oligomeric modifiers (e.g., polyethylene glycol).

The diol component can include other diols besides ethylene glycol (e.g., diethylene glycol, polyalkylene glycols, 1,3-propane diol, 1,4-butane diol, 1,5-pentanediol, 1,6-hexanediol, propylene glycol, 1,4-cyclohexane dimethanol (CHDM), neopentyl glycol, 2-methyl-1,3-propanediol, 2,2,4,4-tetramethyl-1,3-cyclobutanediol, adamantane-1,3-diol, 3,9-bis(1,1-dimethyl-2-hydroxyethyl)-2,4,8,10-tetraoxaspiro[5.5]undecane, and isosorbide), or the terephthalate component, in addition to terephthalic acid or its dialkyl ester (i.e., dimethyl terephthalate), can include modifiers such as isophthalic acid or its dialkyl ester (i.e., dimethyl isophthalate), 2,6-naphthalene dicarboxylic acid or its dialkyl ester (i.e., dimethyl 2,6 naphthalene dicarboxylate), adipic acid or its dialkyl ester (i.e., dimethyl adipate), succinic acid, its dialkyl ester (i.e., dimethyl succinate), or its anhydride (i.e., succinic anhydride), or one or more functional derivatives of terephthalic acid. The terephthalate component may also include phthalic acid, phthalic anhydride, biphenyl dicarboxylic acid, cyclohexane dicarboxylic acid, anthracene dicarboxylic acid, adamantane 1,3-dicarboxylic acid, glutaric acid, sebacic acid, or azelaic acid.

For polyethylene terephthalate bottle resins according to the present invention, isophthalic acid and diethylene glycol are the preferred modifiers. Those having ordinary skill in the art will appreciate that as a modifier, cyclohexane dimethanol efficiently suppresses polymer crystallinity, but has poor oxygen permeability properties.

For polyethylene terephthalate fiber resins according to the present invention, no comonomer substitution is necessary, but where employed, typically includes diethylene glycol or polyethylene glycol.

It will be understood that diacid comonomer should be employed when the terephthalate component is mostly terephthalic acid (i.e., a diacid component), and diester comonomer should be employed when the terephthalate component is mostly dimethyl terephthalate (i.e., a diester component).

It will be further understood by those having ordinary skill in the art that to achieve the polyester compositions of the present invention a molar excess of the diol component is reacted with the terephthalate component (i.e., the diol component is present in excess of stoichiometric proportions).

In reacting a diacid component and a diol component via a direct esterification reaction, the molar ratio of the diacid component and the diol component is typically between about 1.0:1.0 and 1.0:1.6. Alternatively, in reacting a diester component and a diol component via an ester interchange reaction, the molar ratio of the diester component and the diol component is typically greater than about 1.0:2.0.

The diol component usually forms the majority of terminal ends of the polymer chains and so is present in the resulting polyester composition in slightly greater fractions. This is what is meant by the phrases "about a 1:1 molar ratio of a terephthalate component and a diol component," "about a 1:1 molar ratio of a diacid component and a diol component," and "about a 1:1 molar ratio of the diester component and the diol component," each of which may be used to describe the polyester compositions of the present invention.

The titanium-catalyzed polyethylene terephthalate resin is typically composed of about a 1:1 molar ratio of a diacid component and a diol component. For titanium-catalyzed polyethylene terephthalate resin for use as high-clarity hot-fill bottles and high-strength carbonated soft drink bottles, the diacid component typically includes at least about 94 mole percent terephthalic acid (e.g., terephthalic acid and isophthalic acid) and the diol component includes at least about 94 mole percent ethylene glycol (e.g., ethylene glycol and diethylene glycol).

For titanium-catalyzed polyethylene terephthalate resin for high-efficiency injection molding, the diol component generally includes at least about 90 mole percent ethylene glycol (e.g., ethylene glycol, diethylene glycol, and 1,4-cyclohexane dimethanol) and/or the diacid component includes at least about 90 mole percent terephthalic acid (e.g., isophthalic acid and at least about 92 mole percent terephthalic acid). More typically, the diacid component includes at least about 94 mole percent terephthalic acid (e.g., terephthalic acid and isophthalic acid) and the diol component includes at least about 92 mole percent ethylene glycol (e.g., diethylene glycol and at least about 94 mole percent ethylene glycol). Those having ordinary skill in the art will understand that corresponding ranges apply to polyethylene terephthalate resins composed of diester (i.e., mostly dimethyl terephthalate) and diol moieties.

In an exemplary embodiment, the polyethylene terephthalate includes about a 1:1 molar ratio of (1) a diacid component of mostly terephthalic acid and (2) a diol component of between about 1 and 2 mole percent diethylene glycol, between about 1 and 3 mole percent 1,4-cyclohexane dimethanol, and the remainder ethylene glycol (e.g., about 3-4 diol comonomer substitution). In an alternative exemplary embodiment, the polyethylene terephthalate includes about a 1:1 molar ratio of (1) a diester component of mostly dimethyl terephthalate and (2) a diol component of between about 1 and 2 mole percent diethylene glycol, between about 1 and 3 mole percent 1,4-cyclohexane dimethanol, and the remainder ethylene glycol.

The titanium-catalyzed polyethylene terephthalate resin according to the present invention generally possesses an exemplary intrinsic viscosity of more than about 0.70 dL/g or less than about 0.90 dL/g, or both (i.e., between about 0.70 dL/g and 0.90 dL/g). Those having ordinary skill in the art will appreciate, however, that during injection molding operations polyester resins tend to lose intrinsic viscosity (e.g., an intrinsic viscosity loss of about 0.02-0.06 dL/g from chip to preform).

Alternatively, the polyethylene terephthalate may have an intrinsic viscosity of more than about 0.78 dL/g (e.g., 0.81 dL/g) or less than about 0.86 dL/g (e.g., 0.84 dL/g), or both (i.e., between about 0.78 dL/g and 0.86 dL/g).

For polyester resins that are capable of forming high-clarity, hot-fill preforms and bottles according to the present invention, the polyethylene terephthalate generally has an intrinsic viscosity of less than about 0.86 dL/g, such as between about 0.72 dL/g and 0.84 dL/g. For example, the polyethylene terephthalate has an intrinsic viscosity of more than about 0.68 dL/g or less than about 0.80 dL/g, or both (i.e., between about 0.68 dL/g and 0.80 dL/g). Typically, the polyethylene terephthalate has an intrinsic viscosity of more than about 0.75 dL/g as well (i.e., between about 0.75 dL/g and 0.78 dL/g or, more likely, between about 0.78 dL/g and 0.82 dL/g). For preforms used to make hot-fill bottles, heat-setting performance diminishes at higher intrinsic viscosity levels and mechanical properties (e.g., stress cracking, drop impact, and creep) decrease at lower intrinsic viscosity levels (e.g., less than 0.6 dL/g).

For polyester resins that are capable of forming high-strength, high-clarity carbonated soft drink preforms and bottles according to the present invention, the polyethylene terephthalate typically has an intrinsic viscosity of more than about 0.72 dL/g or less than about 0.88 dL/g, or both (i.e., between about 0.72 dL/g and 0.84 dL/g). The polyethylene terephthalate typically has an intrinsic viscosity of more than about 0.78 dL/g, and most typically, an intrinsic viscosity of between about 0.80 dL/g and 0.84 dL/g.

As noted, mechanical properties (e.g., stress cracking, drop impact, and creep) decrease at lower intrinsic viscosity levels (e.g., less than about 0.6 dL/g). Accordingly, bottle resins according to the present invention typically have an intrinsic viscosity of about 0.60 dL/g or more. In this regard, for water bottles and other applications that do not demand high strength (e.g., some sheets and films), the polyethylene terephthalate may have an intrinsic viscosity of more than about 0.60 dL/g (e.g., between about 0.60 dL/g and 0.65 dL/g), typically more than about 0.72 dL/g or less than about 0.78 dL/g (e.g., 0.74-0.76 dL/g), or both (i.e., between about 0.72 dL/g and 0.78 dL/g). For some bottle applications it may be possible to employ resins having even lower intrinsic viscosities (e.g., between about 0.50 dL/g and 0.60 dL/g), albeit at reduced bottle physical and thermal properties.

For polyester fibers (and some films and bottles) according to the present invention, the polyethylene terephthalate typically has an intrinsic viscosity of between about 0.50 dL/g and 0.70 dL/g and typically an intrinsic viscosity between about 0.60 dL/g and 0.65 dL/g (e.g., 0.62 dL/g). The polyethylene terephthalate fiber resins are typically polymerized only in the melt phase (i.e., the fiber resins usually do not undergo solid state polymerization). More generally, to the extent resins according to the present invention are polymerized only in the melt phase (i.e., no solid state polymerization), such resins may possess an intrinsic viscosity floor of about 0.50 dL/g.

As used herein, the term "intrinsic viscosity" is the ratio of the specific viscosity of a polymer solution of known concentration to the concentration of solute, extrapolated to zero concentration. Intrinsic viscosity, which is widely recognized as standard measurements of polymer characteristics, is directly proportional to average polymer molecular weight. See, e.g., *Dictionary of Fiber and Textile Technology*, Hoechst Celanese Corporation (1990); Tortora & Merkel, *Fairchild's Dictionary of Textiles* (7$^{th}$ Edition 1996).

Intrinsic viscosity can be measured and determined without undue experimentation by those of ordinary skill in this art. For the intrinsic viscosity values described herein, the intrinsic viscosity is determined by dissolving the copolyester in orthochlorophenol (OCP), measuring the relative viscosity of the solution using a Schott Autoviscometer (AVS Schott and AVS 500 Viscosystem), and then calculating the intrinsic viscosity based on the relative viscosity. See, e.g., *Dictionary of Fiber and Textile Technology* ("intrinsic viscosity").

In particular, a 0.6-gram sample (+/−0.005 g) of dried polymer sample is dissolved in about 50 ml (61.0-63.5 grams) of orthochlorophenol at a temperature of about 105° C. Fibrous samples are typically cut into small pieces, whereas chip samples are ground. After cooling to room temperature, the solution is placed in the viscometer at a controlled, constant temperature, (e.g., between about 20° and 25° C.), and the relative viscosity is measured. As noted, intrinsic viscosity is calculated from relative viscosity.

As noted, the titanium-catalyzed polyethylene terephthalate resin typically includes between about 2 ppm and 50 ppm of elemental titanium. Typically, the resin includes less than 25 ppm of elemental titanium (e.g., between about 2 and 20 ppm). More typically, the resin includes at least about 5 ppm of elemental titanium or less than about 15 ppm of elemental titanium, or both (i.e., between about 5 and 15 ppm, such as about 10 ppm). The titanium catalyst is typically a titanate, such as titanium diisopropoxide bis(acetyl-acetonate) or tetrabutyl titanate. In some embodiments, the resin includes more than about 10 ppm of elemental titanium (e.g., between about 10 and 25 ppm).

Those having ordinary skill in the art will appreciate that germanium is an excellent polyethylene terephthalate catalyst. Germanium, however, is prohibitively expensive and so is disfavored in the production of commercial polyesters.

Accordingly, the present resin reduces costs by including less than about 20 ppm of elemental germanium, typically less than about 15 ppm of elemental germanium, and more typically less than about 10 ppm of elemental germanium. Typically, the titanium-catalyzed polyethylene terephthalate resins include less than 5 ppm of elemental germanium and more typically less than about 2 ppm of elemental germanium. In many instances, the titanium-catalyzed polyethylene terephthalate resins are essentially free of elemental germanium. In other instances, however, the titanium-catalyzed polyethylene terephthalate resins include at least about 2 ppm of elemental germanium.

Those having ordinary skill in the art will further appreciate that titanium-catalyzed polyester resins possess lower rates of crystallization as compared with conventional antimony-catalyzed polyester resins. The titanium-catalyzed polyethylene terephthalate resins of the present invention thus possess lower crystallinity than otherwise identical antimony-catalyzed polyethylene terephthalate resins. Without being bound to a particular theory, it is believed that titanium is a poor nucleator as compared with antimony. Consequently, the titanium-catalyzed polyethylene terephthalate resins of the present invention possess lower crystallization rates as compared with antimony-catalyzed polyesters. As will be understood by those having ordinary skill in art, this permits preforms according to the present invention to be blow molded into high-clarity bottles.

Accordingly, the present resin includes less than about 100 ppm of elemental antimony, typically less than about 75 ppm of elemental antimony, and more typically less than about 50 ppm of elemental antimony. Typically, the titanium-catalyzed polyethylene terephthalate resins include less than 25 ppm of elemental antimony and more typically less than about 10 ppm of elemental antimony. In many instances, the titanium-catalyzed polyethylene terephthalate resins are essentially free of elemental antimony. Antimony-free polyethylene terephthalate resins may be desirable as antimony is considered a heavy metal. In other instances, however, the titanium-catalyzed polyethylene terephthalate resins include at least about 10 ppm of elemental antimony.

FIGS. 1-8 depict differential scanning calorimetry (DSC) thermal analyses performed on both titanium-catalyzed and antimony-catalyzed polyester resins at an intrinsic viscosity of about 0.78 dL/g. FIGS. 1-4 compare titanium-catalyzed and antimony-catalyzed polyethylene terephthalate resins having about 3 mole percent comonomer substitution. FIGS. 5-8 compare the titanium-catalyzed and antimony-catalyzed polyethylene terephthalate resins including about 4 mole percent comonomer substitution.

The differential scanning calorimetry was performed by (1) holding a modified polyethylene terephthalate sample for one minute at 30 degrees Celsius; (2) heating the sample from 30 degrees Celsius to 280 degrees Celsius at 10 degrees Celsius per minute; (3) holding the sample at 280 degrees Celsius for two minutes; and (4) cooling the sample from 280 degrees to 30 degrees Celsius at 10 degrees Celsius per minute. FIGS. 1, 3, 5, and 7 correspond to the heating of amorphous polymer and FIGS. 2, 4, 6, and 8 correspond to the cooling of the same polymer from the melt phase.

Figure 2:
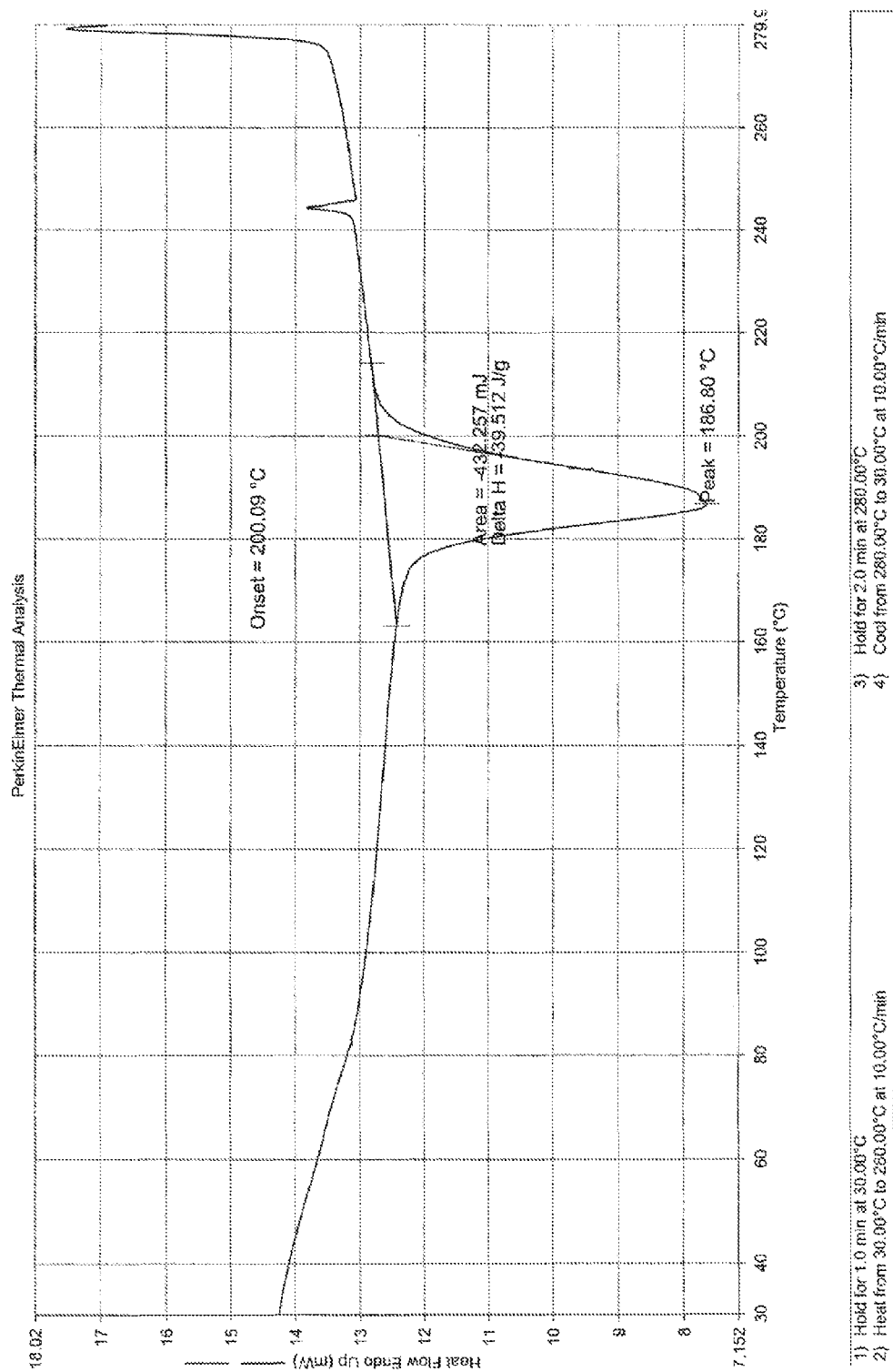

FIGS. 1-2 show that at the comonomer substitution of about 3 percent (i.e., 1.6 mole percent diethylene glycol and 1.5 mole percent isophthalic acid substitution), the titanium-catalyzed polyethylene terephthalate polyester possesses a heating crystallization exotherm peak temperature ($T_{CH}$) of 144.2° C., crystalline melting peak temperature ($T_M$) of 253.2° C., and a cooling crystallization exotherm peak temperature ($T_{CC}$) of 186.8° C.

Figure 3:
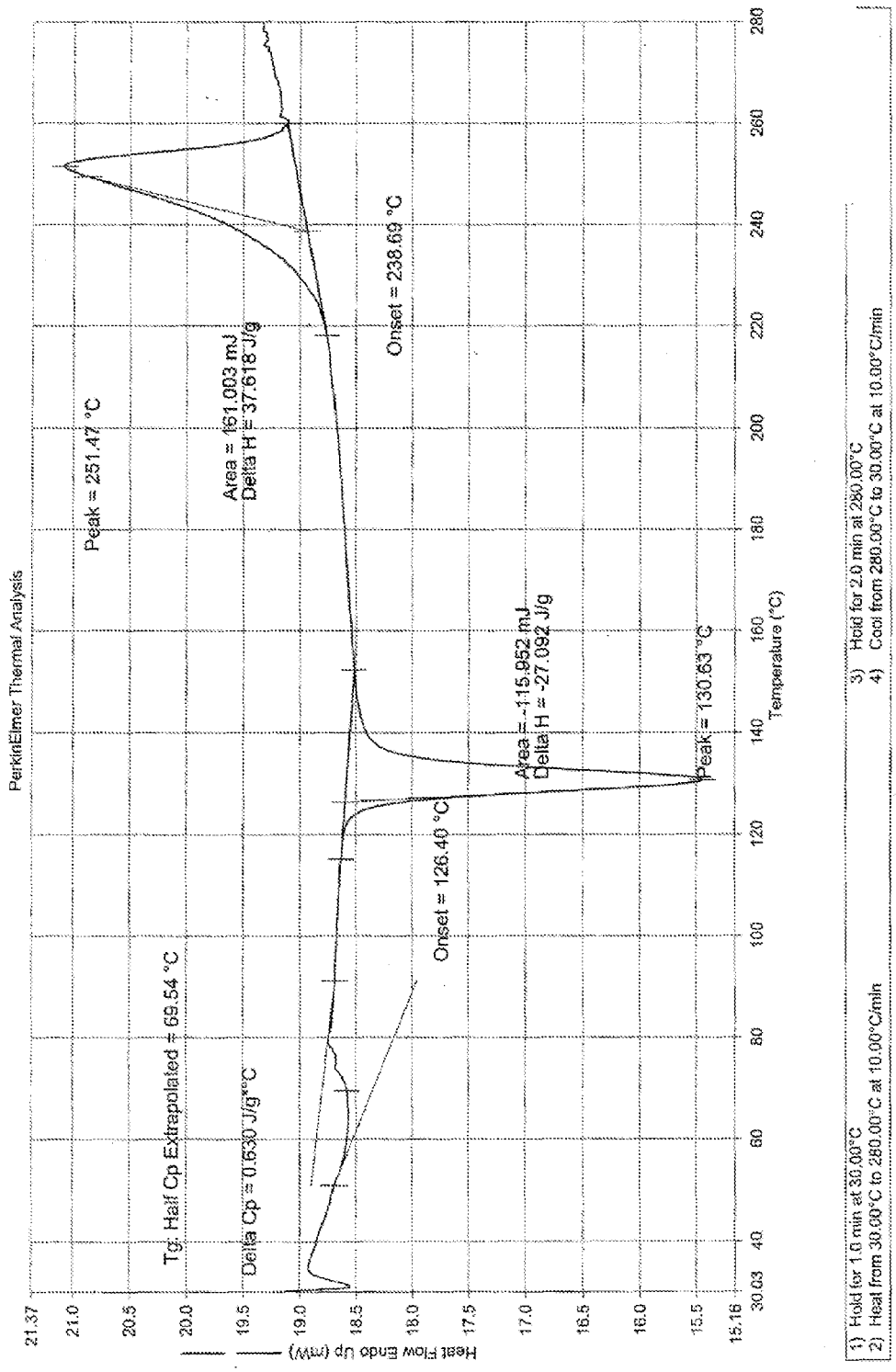
FIGS. 3-4 illustrate differential scanning calorimetry thermal analyses performed on an antimony-catalyzed polyethylene terephthalate resin having an intrinsic viscosity of 0.78 dL/g and being modified with 1.6 mole percent diethylene glycol and 1.5 mole percent isophthalic acid.
Figure 4:
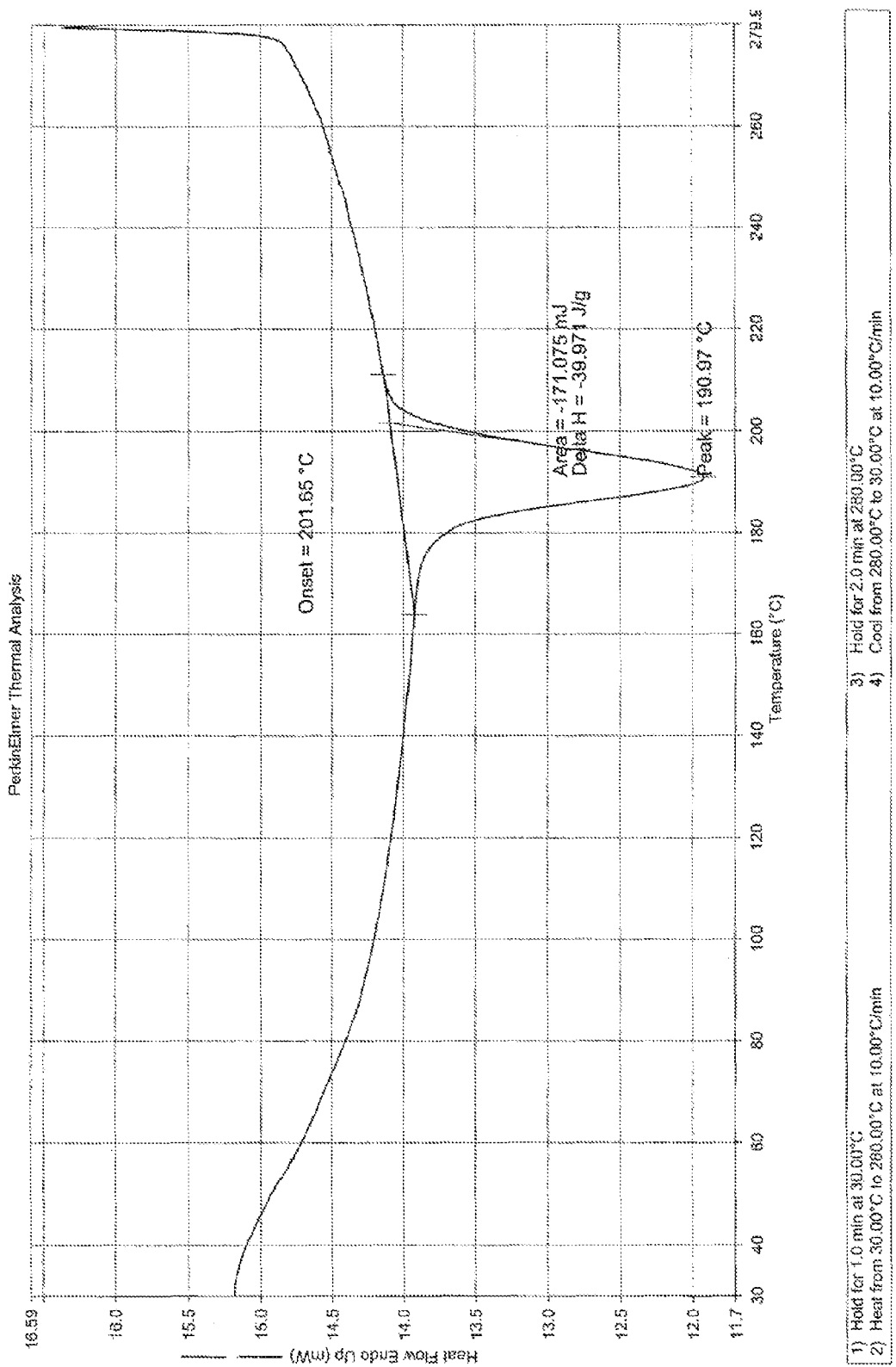

FIGS. 3-4 show that at the comonomer substitution of about 3 percent (i.e., 1.6 mole percent diethylene glycol and 1.5 mole percent isophthalic acid substitution), antimony-catalyzed polyethylene terephthalate polyester possesses a heating crystallization exotherm peak temperature ($T_{CH}$) of 130.6° C., crystalline melting peak temperature ($T_M$) of 251.5° C., and a cooling crystallization exotherm peak temperature ($T_{CC}$) of 191.0° C.

Figure 5:
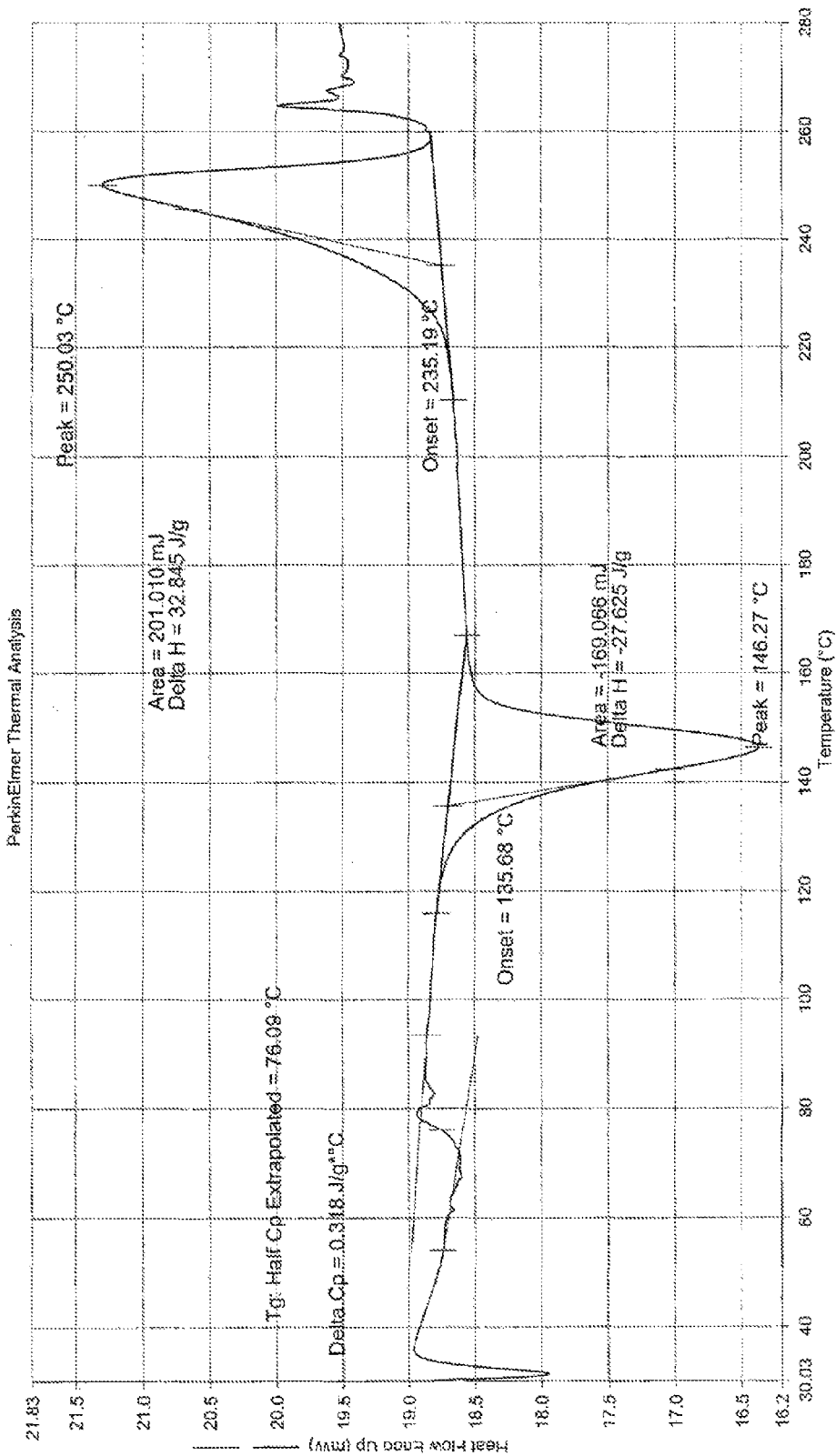
FIGS. 5-6 illustrate differential scanning calorimetry thermal analyses performed on a titanium-catalyzed polyethylene terephthalate resin having an intrinsic viscosity of 0.78 dL/g and being modified with 1.6 mole percent diethylene glycol and 2.4 mole percent isophthalic acid.
Figure 6:
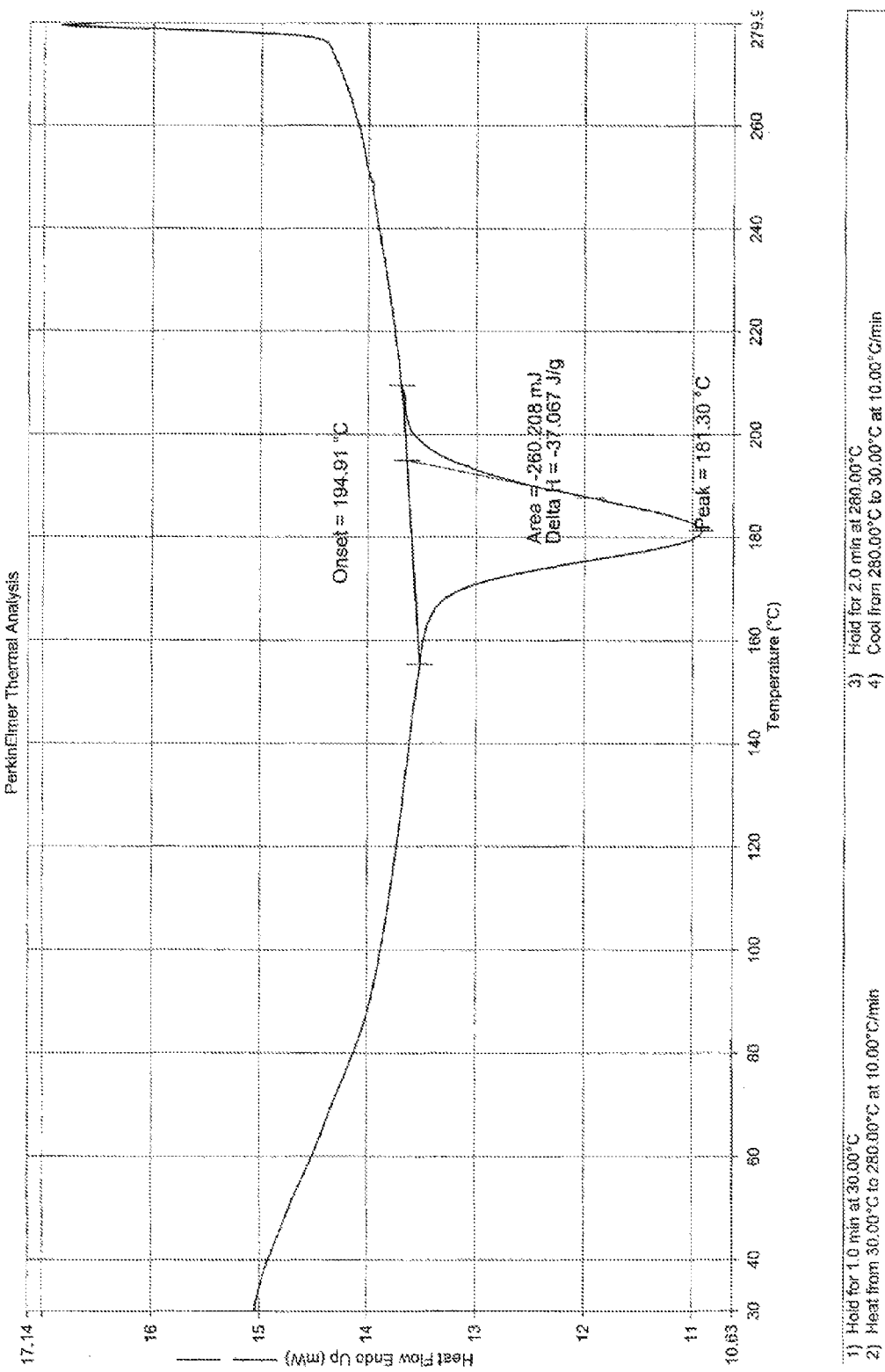

FIGS. 5-6 show that at the comonomer substitution of about 4 percent (i.e., 1.6 mole percent diethylene glycol and 2.4 mole percent isophthalic acid substitution), the titanium-catalyzed polyethylene terephthalate polyester possesses a heating crystallization exotherm peak temperature ($T_{CH}$) of 146.3° C., crystalline melting peak temperature ($T_M$) of 250.0° C., and a cooling crystallization exotherm peak temperature ($T_{CC}$) of 181.3° C.

Figure 7:
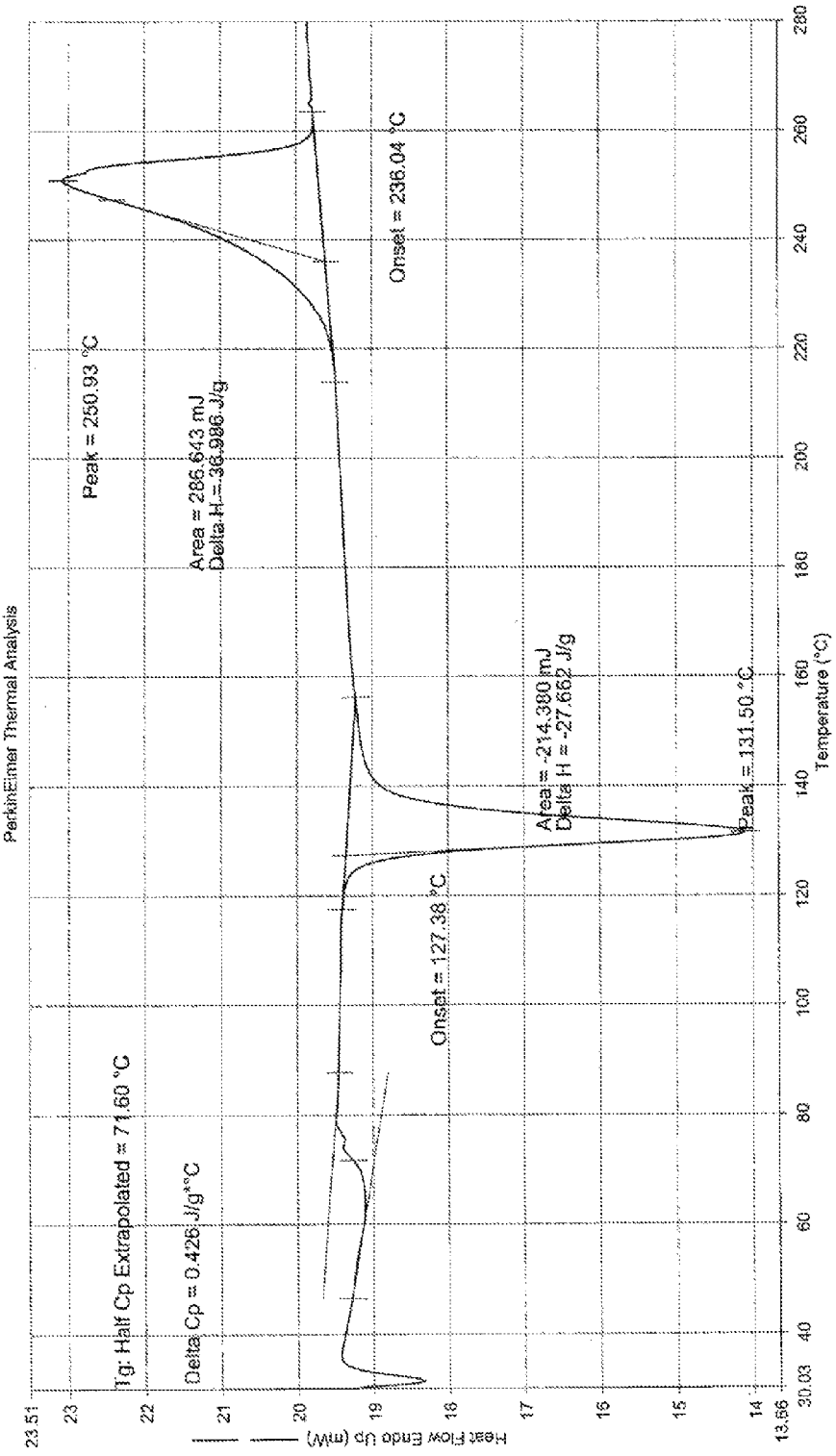
FIGS. 7-8 illustrate differential scanning calorimetry thermal analyses performed on an antimony-catalyzed polyethylene terephthalate resin having an intrinsic viscosity of 0.78 dL/g and being modified with 1.6 mole percent diethylene glycol and 2.4 mole percent isophthalic acid.
Figure 8:
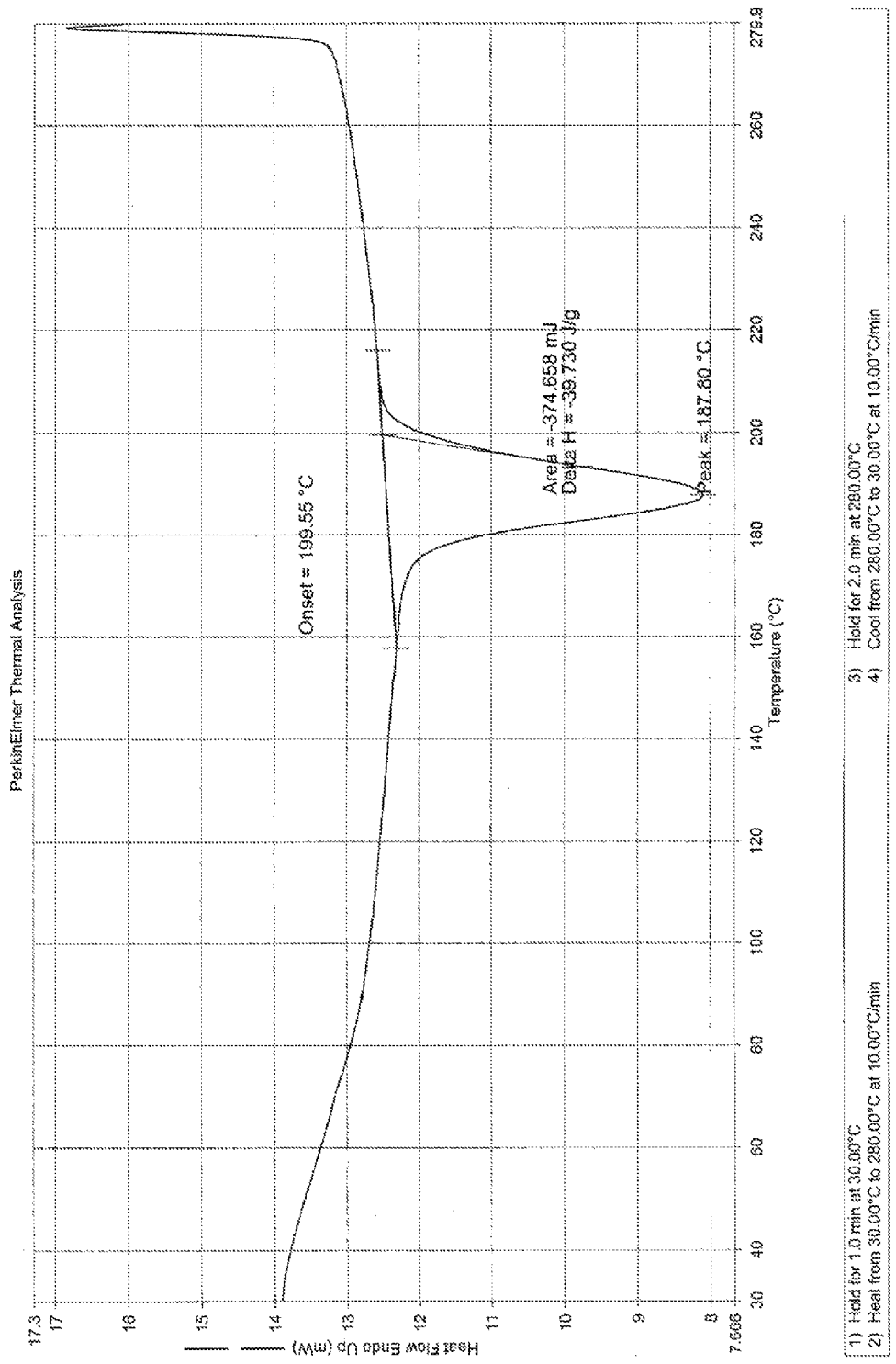

FIGS. 7-8 show that at the comonomer substitution of about 4 percent (i.e., 1.6 mole percent diethylene glycol and 2.4 mole percent isophthalic acid substitution), antimony-catalyzed polyethylene terephthalate polyester possesses a heating crystallization exotherm peak temperature($T_{CH}$) of 131.5° C., crystalline melting peak temperature ($T_M$) of 250.9° C., and a cooling crystallization exotherm peak temperature ($T_{CC}$) of 187.8° C.

As FIGS. 1-8 illustrate, the titanium-catalyzed polyethylene terephthalate resins of the present invention possess a significantly higher heating crystallization exotherm peak temperature ($T_{CH}$) as compared with antimony-catalyzed polyethylene terephthalate. Those having ordinary skill in the art will appreciate that this higher heating crystallization exotherm temperature is especially desirable in blow molding operations as it delays the onset of crystallization, thereby facilitating the formation of high-clarity bottles.

Accordingly, at a heating rate of 10° C. per minute as measured by differential scanning calorimetry, the polyethylene terephthalate resin has a heating crystallization exotherm peak temperature ($T_{CH}$) of more than about 140° C. and typically more than about 142° C. (e.g., between 143° C. and 153° C.). Indeed, the polyethylene terephthalate resin can possess a crystallization exotherm peak temperature ($T_{CH}$) of 155° C. or more. Those having ordinary skill in the art will recognize that heating crystallization exotherm peak temperature ($T_{CH}$) is determined on a non-crystalline polyethylene terephthalate resin.

The polyethylene terephthalate resin also has a crystalline melting peak temperature ($T_M$) of at least about 240° C., typically at least about 245° C., and more typically at least about 250° C. Those having ordinary skill in the art will understand that the melting point is largely dependent on comonomer content.

In this regard, using higher levels of comonomer tends to suppress crystalline melting peak temperature ($T_M$). Those having ordinary skill in the art will appreciate that, as noted, injection molding operations may run faster using polyester resins that possess lower melting points. Accordingly, higher comonomer content may be desirable to achieve a polyester resin that delivers faster cycle times during injection molding. As noted, a titanium-catalyzed polyethylene terephthalate resin that promotes faster injection molding cycle times generally includes less than about 10 mole percent comonomer substitution—between about 5 and 7 mole percent might be typical (i.e., about 6 mole percent comonomer substitution).

In an exemplary embodiment, the polyethylene terephthalate resin engineered to reduce injection-molding cycle times may include more than about 5 mole percent diethylene glycol, which effectively depresses melt point at less cost. (Diethylene glycol generally costs less than diacid comonomer substitutes.) Moreover, the concentration of the diethylene glycol is usually greater than the concentration of the diacid or diester comonomer modifiers (e.g., isophthalic acid) by a mole ratio of at least 3:2, typically at least 2:1, and in some instances at least 3:1. Thus, for example, a polyethylene terephthalate resin for high-efficiency injection molding might include about 6 mole percent diethylene glycol (e.g., 7 mole percent) and less than about 2 mole percent isophthalic acid, if any. Similarly, the polyethylene terephthalate resin might include, in addition to ethylene glycol and terephthalic acid (or dimethyl terephthalate), about 6-7 mole percent diol comonomer modifiers and less than about 1-2 diacid or diester comonomer modifiers.

Alternatively, in another exemplary embodiment, the polyethylene terephthalate resin engineered to reduce injection-molding cycle times may include a greater mole fraction of diacid or diester comonomer modifiers (e.g., isophthalic acid or dimethyl isophthalate) than diol comonomer modifiers (e.g., diethylene glycol). As noted, the diacid or diester comonomer modifiers (e.g., isophthalic acid or dimethyl isophthalate) and the diol comonomer modifiers (e.g., diethylene glycol) may be present in the polyethylene terephthalate resin at a mole ratio of between about 3:2 and 3:1 (e.g., between about 1.6 and 2.4 mole percent diethylene glycol and between about 2.4 and 4.8 mole percent isophthalic acid). See FIGS. 5-6. This may be desirable to reduce the generation of unwanted acetaldehyde. Thus, for example, a polyethylene terephthalate resin for high-efficiency injection molding might include at least about 3 mole percent diacid comonomer modifier (e.g., between about 3 and 6 mole percent) and less than about 3 or 4 mole percent diol comonomer modifier (e.g., 1.6 mole percent diethylene glycol).

In particular, in one exemplary embodiment for high-efficiency injection molding, the polyethylene terephthalate resin includes at least about 3 mole percent diacid and/or diester comonomer substitution and less than about 3.5 mole percent diol comonomer substitution. In another such embodiment, the polyethylene terephthalate resin includes at least about 4 mole percent diacid and/or diester comonomer substitution and less than about 3 mole percent diol comonomer substitution. In yet another such embodiment, the polyethylene terephthalate resin includes (i) a diacid moiety of between about 3 and 6 mole percent isophthalic acid with the remainder terephthalic acid, and (ii) a diol moiety of between about 1 and 4 mole percent diethylene glycol.

In accordance with the present invention, two exemplary polyester resins (i.e., "Ti Resin A" and "Ti Resin B") were prepared in the presence of a titanium catalyst and a cobalt catalyst in amounts sufficient for the resulting polyester resins to include about 5-7 ppm of elemental titanium and 25-30 ppm of elemental cobalt. "Ti Resin A" included about 4.0 mole percent isophthalic acid substitution and 1.8 mole percent diethylene glycol substitution and "Ti Resin B" included about 4.0 mole percent isophthalic acid substitution and 2.3 mole percent diethylene glycol substitution. Each exemplary polyester resin (i.e., "Ti Resin A" and "Ti Resin B") further included about 142 ppm of pentaerythritol (i.e., 0.02 mole percent branching agent).

These exemplary polyester resins were compared with an antimony-catalyzed polyester resin (i.e., Wellman's Perma-Clear® HP806 polyester resin), which included about 2.8 mole percent isophthalic acid substitution and 3.0 mole percent diethylene glycol substitution. This comparative antimony-catalyzed polyester resin also included more than 200 ppm of elemental antimony.

Both the two exemplary titanium-catalyzed resins according to the present invention and the comparative antimony-catalyzed resin are formulated for use in carbonated soft drink bottles. Table 1 (below) lists properties of these polyester resins:

TABLE 1

| Resin Properties | Ti Resin A | Ti Resin B | Sb Resin |
|---|---|---|---|
| Intrinsic Viscosity (dL/g) | 0.781 | 0.780 | 0.840 |
| Comonomer Substitution (percent) | 5.8 | 6.3 | 5.8 |
| Branching Agent (ppm pentaerythritol) | 142 | 142 | 0 |

The three respective resins were formed into 26.5 gram preforms in a 32-cavity Husky Generation 3.5 HyPET injection molding machine. Table 2 (below) provides experimental injection molding results comparing the two exemplary titanium-catalyzed polyester resins with the comparative antimony-catalyzed resin:

TABLE 2

| Injection Molding Parameter | Ti Resin A | Ti Resin B | Sb Resin |
|---|---|---|---|
| Optimal Injection Temperature (° C.) | 260.1 | 265.1 | 280.0 |
| Cycle Time (seconds) | 11.5 | 11.3 | 12.5 |
| Maximum Injection Pressure (psig) | 2072 | 1941 | 2089 |
| Preform Acetaldehyde Concentration (ppm) | 2.8 | 2.8 | 4.2 |

Figure 9:
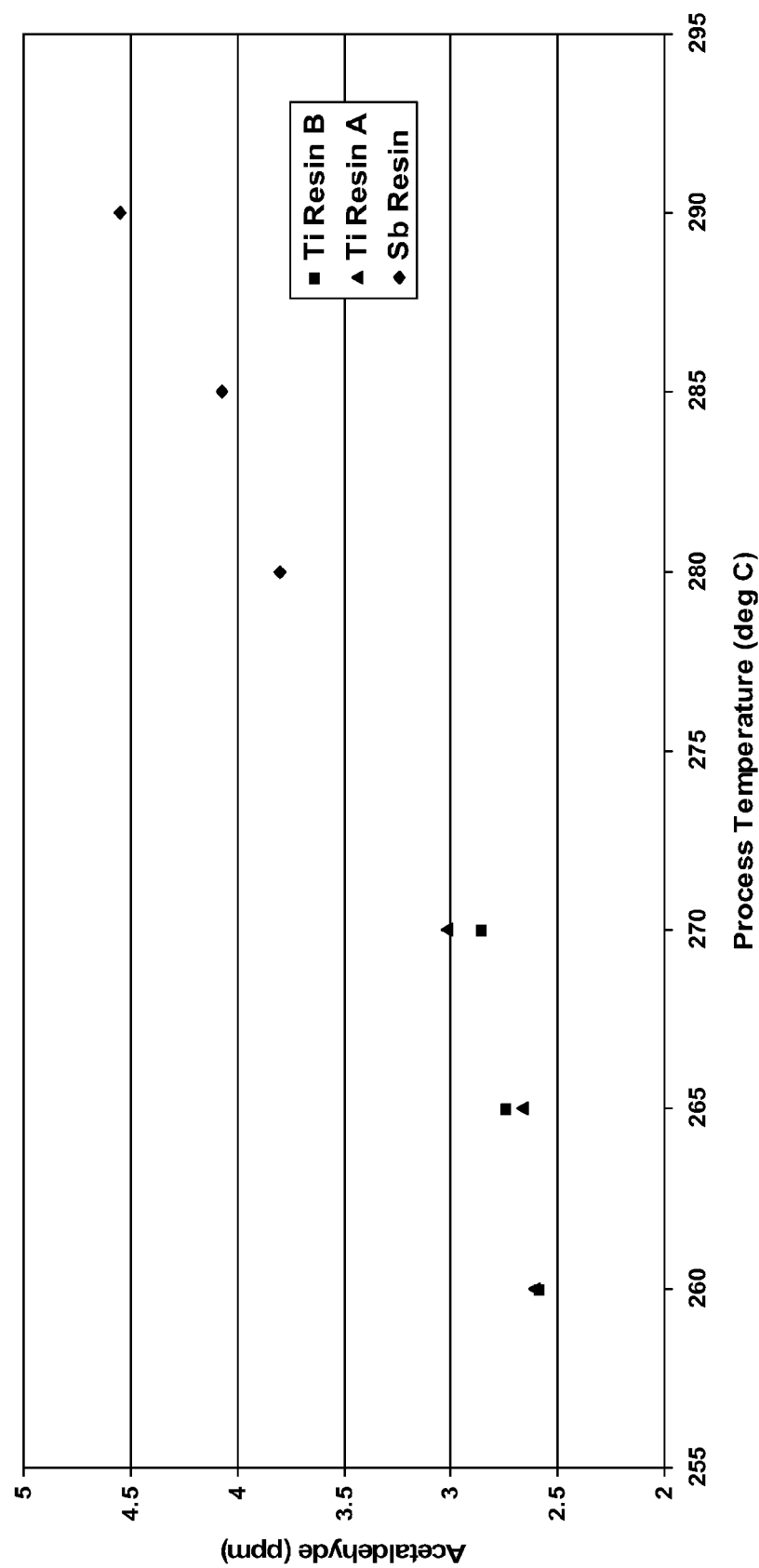
FIG. 9 illustrates acetaldehyde concentration in preforms formed from titanium-catalyzed and antimony catalyzed polyethylene terephthalate resins.
Figure 10:
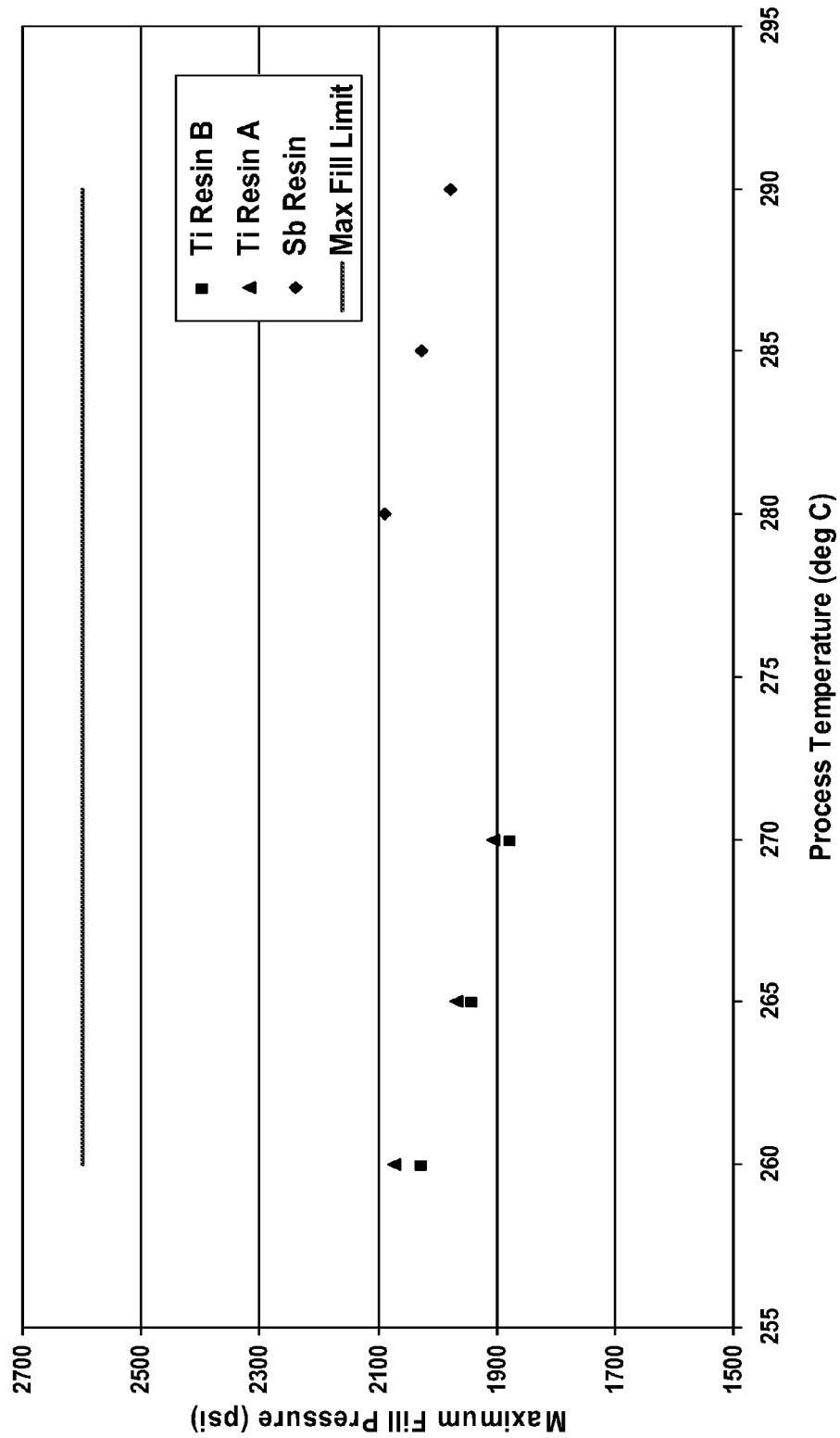
FIG. 10 illustrates maximum fill pressures during injection molding processes using titanium-catalyzed and antimony catalyzed polyethylene terephthalate resins.

Table 2 (above) shows that, as compared with the antimony-catalyzed resin, the two exemplary titanium-catalyzed resins according to the present invention had better cycle times (i.e., a one second reduction) at comparable injection molding pressures. Moreover, the two exemplary titanium-catalyzed resins were formed at lower melt temperatures (i.e., optimal injection temperatures). This reduced acetaldehyde formation (i.e., the preforms formed from the titanium-catalyzed resins possessed less acetaldehyde). FIG. 9 depicts acetaldehyde concentration in preforms formed from the three respective resins at various injection molding temperatures. Likewise, FIG. 10 depicts maximum fill pressures for each of the three resins at various injection molding temperatures.

The respective preforms (i.e., Table 2) were then stretch-blow molded into 24-oz. CSD bottles using a Sidel SB01 laboratory blow-molding machine. Table 3 (below) provides experimental results comparing CSD bottles formed from the two exemplary titanium-catalyzed polyester resins with CSD bottles formed from the comparative antimony-catalyzed resin:

TABLE 3

| Bottle Properties | Ti Resin A | Ti Resin B | Sb Resin |
|---|---|---|---|
| Burst Pressure (psig) | 216.3 | 222.5 | 229.4 |
| Percent Expansion (1 minute at 135 psig) | 9.8 | 10.7 | 9.3 |
| Accelerated Caustic Stress Cracking (minutes to failure) | 4.5 | 3.3 | 6.0 |

Table 3 (above) shows that the 24-oz. CSD bottles formed from the two exemplary titanium-catalyzed resins and the antimony-catalyzed resin possessed comparable bottle properties.

In addition, "Ti Resin A" and the comparative antimony-catalyzed resin were formed into 48 gram preforms in an Arburg single-cavity injection molding machine, then stretch-blow molded into two-liter CSD bottles using a Sidel SB01 laboratory blow-molding machine. Table 4 (below) provides experimental results comparing two-liter CSD bottles formed from "Ti Resin A" with two-liter CSD bottles formed from the comparative antimony-catalyzed resin:

TABLE 4

| Bottle Properties | Ti resin A | Sb Resin |
|---|---|---|
| Burst Pressure (psig) | 166.0 | 168.0 |
| Percent Expansion (1 minute at 135 psig) | 15.7 | 15.7 |
| Accelerated Caustic Stress Cracking (minutes to failure) | 180.0 | 140.4 |
| Height Charge (percent after thermal treatment) | 1.55 | 1.95 |
| Fill Line Change (cm after thermal treatment) | 1.77 | 1.94 |
| Label Diameter Change (percent after thermal treatment) | 2.04 | 2.16 |

Table 4 (above) shows that two-liter CSD bottles formed from the exemplary titanium-catalyzed resin (i.e., "Ti Resin A") and the antimony-catalyzed resin possessed comparable bottle properties.

Polyethylene terephthalate resins according to this aspect of the invention might possess crystalline melting peak temperature ($T_M$) below 240° C. (e.g., between about 225° C. and 235° C. Also as noted, in some instances, polyethylene terephthalate resin for high-efficiency injection molding may include slightly higher comonomer fractions (e.g., between about 8 and 10 mole percent.)

Moreover, at a cooling rate of 10° C. per minute as measured by differential scanning calorimetry, the polyethylene terephthalate resin has a cooling crystallization exotherm peak temperature ($T_{CC}$) of less than about 190° C. and typically less than about 185° C. In some instances, the polyethylene terephthalate resin has a cooling crystallization exotherm peak temperature ($T_{CC}$) of less than about 180° C.

Figure 11:
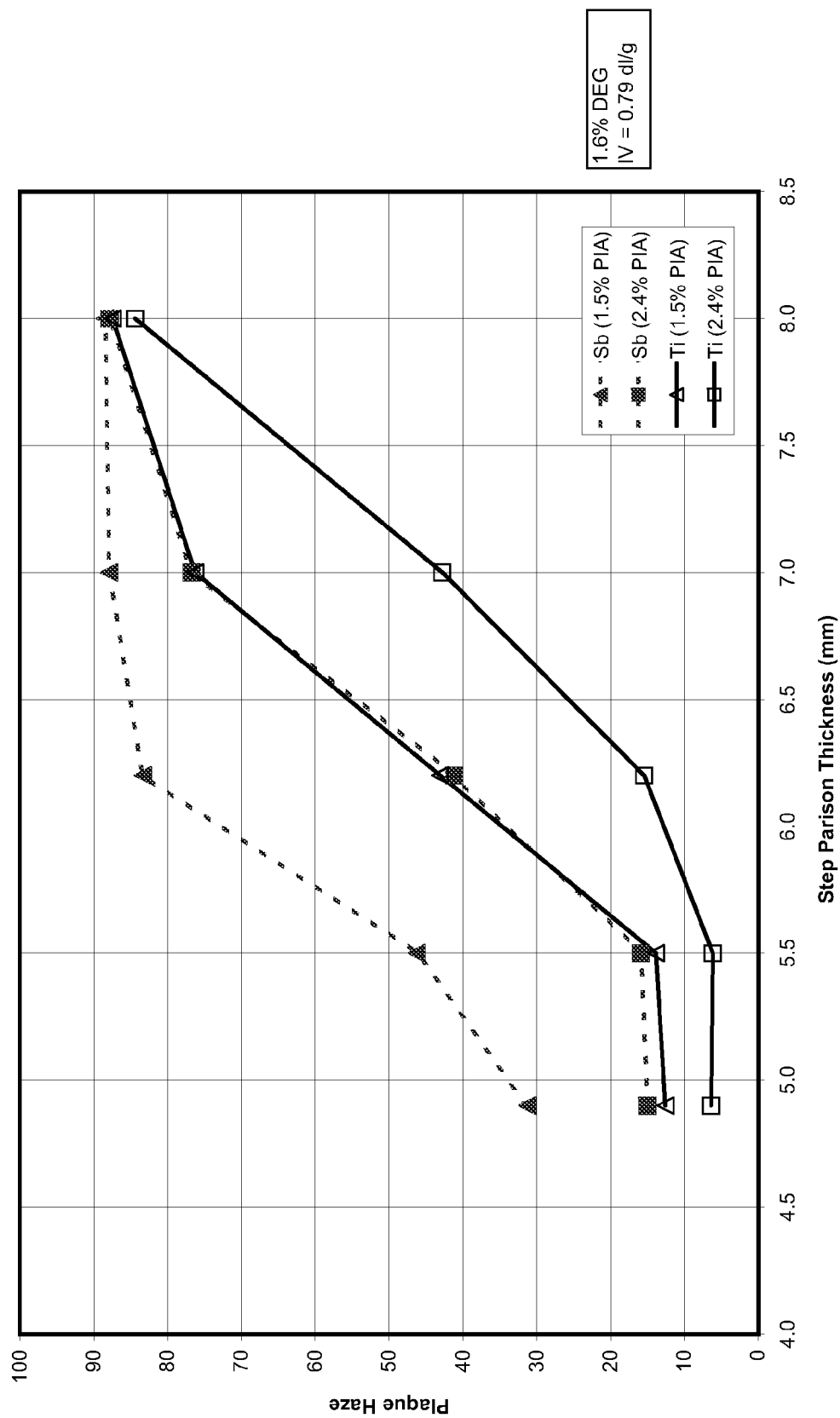
FIG. 11 illustrates percent haze versus preform thickness as measured in a step parison for titanium-catalyzed and antimony-catalyzed polyethylene terephthalate resins.

The titanium-catalyzed polyethylene terephthalate resin of the present invention possesses high clarity as compared with an otherwise identical antimony-catalyzed polyethylene terephthalate resin. In this regard, FIG. 11 depicts percent haze versus preform thickness as measured in a step parison for titanium-catalyzed and antimony-catalyzed polyethylene terephthalate resins at an intrinsic viscosity of about 0.78 dL/g and either 3 mole percent comonomer substitution (i.e., 1.6 mole percent diethylene glycol and 1.5 mole percent isophthalic acid substitution) or 4 mole percent comonomer substitution (i.e., 1.6 mole percent diethylene glycol and 2.4 mole percent isophthalic acid substitution). FIG. 11 illustrates that at a given comonomer substitution, the titanium-catalyzed polyethylene terephthalate resin possesses substantially lower haze as compared with its corresponding antimony-catalyzed polyethylene terephthalate resin. Those having ordinary skill in the art will appreciate that, in general, higher comonomer substitution disrupts polymer crystallinity, thereby reducing preform and bottle haze.

As measured in a step parison, the polyethylene terephthalate of the present invention typically possesses less than about 20 percent haze—preferably less than about 15 percent haze—at a thickness of more than about 6 mm and less than about 5 percent haze at a thickness of more than about 4 mm. Moreover, as measured in a step parison, the polyethylene terephthalate typically possesses less than about 10 percent haze at a thickness of more than about 4.5 mm, and sometimes at a thickness of more than 5.5 mm (e.g., less than about 10 percent haze at a thickness of between 4.5 and 6.0 mm). In some formulations, the polyethylene terephthalate possesses less than about 20 percent haze at a thickness of between 5.5 and 6.5 mm as measured in a step parison. As depicted in FIG. 11, the polyethylene terephthalate can possess less than about 50 percent haze at a thickness of more than about 7 mm.

As measured in a polyester container having a sidewall thickness of less than about 0.02 inch (0.5 mm), the polyethylene terephthalate of the present invention typically possesses less than about 15 percent haze—preferably less than about 10 percent haze. Such a container might be designed for a product capacity of less than about 2.5 liters (e.g., a two-liter carbonated soft drink bottle).

Likewise, as measured in two-liter polyester bottle having a sidewall thickness of 0.014 inch (0.35 mm), the polyethylene terephthalate of the present invention typically possesses less than about 15 percent sidewall haze, typically less than about 10 percent sidewall haze, and more typically less than about 5 percent sidewall haze (e.g., 3-4 percent or less sidewall haze). Those having ordinary skill in the art will understand as 16-ounce (~500-milliliter) and 20-ounce (~600-milliliter) carbonated soft drink bottles may have somewhat thinner sidewalls, sidewall haze will be comparable (or better) than the sidewall haze achieved for two-liter polyester bottles. More specifically, sidewalls for two-liter carbonated soft drink bottles are typically less than 0.014 inch (0.35 mm), whereas sidewalls for 16-ounce (~500-milliliter) and 20-ounce (~600-milliliter) carbonated soft drink bottles are typically about 0.010-0.012 inch (about 0.25-0.30 mm).

Those having ordinary skill in the art will appreciate that these nominal bottle volumes refer to product delivery amount rather than maximum capacity. As bottles are designed and formed with headspace allocations, a bottle's total capacity is somewhat larger than its nominal size. In other words, it is the amount of delivered product that determines nominal bottle size. For instance, a nominal two-liter bottle actually possesses a total capacity of more than two liters.

Figure 12:
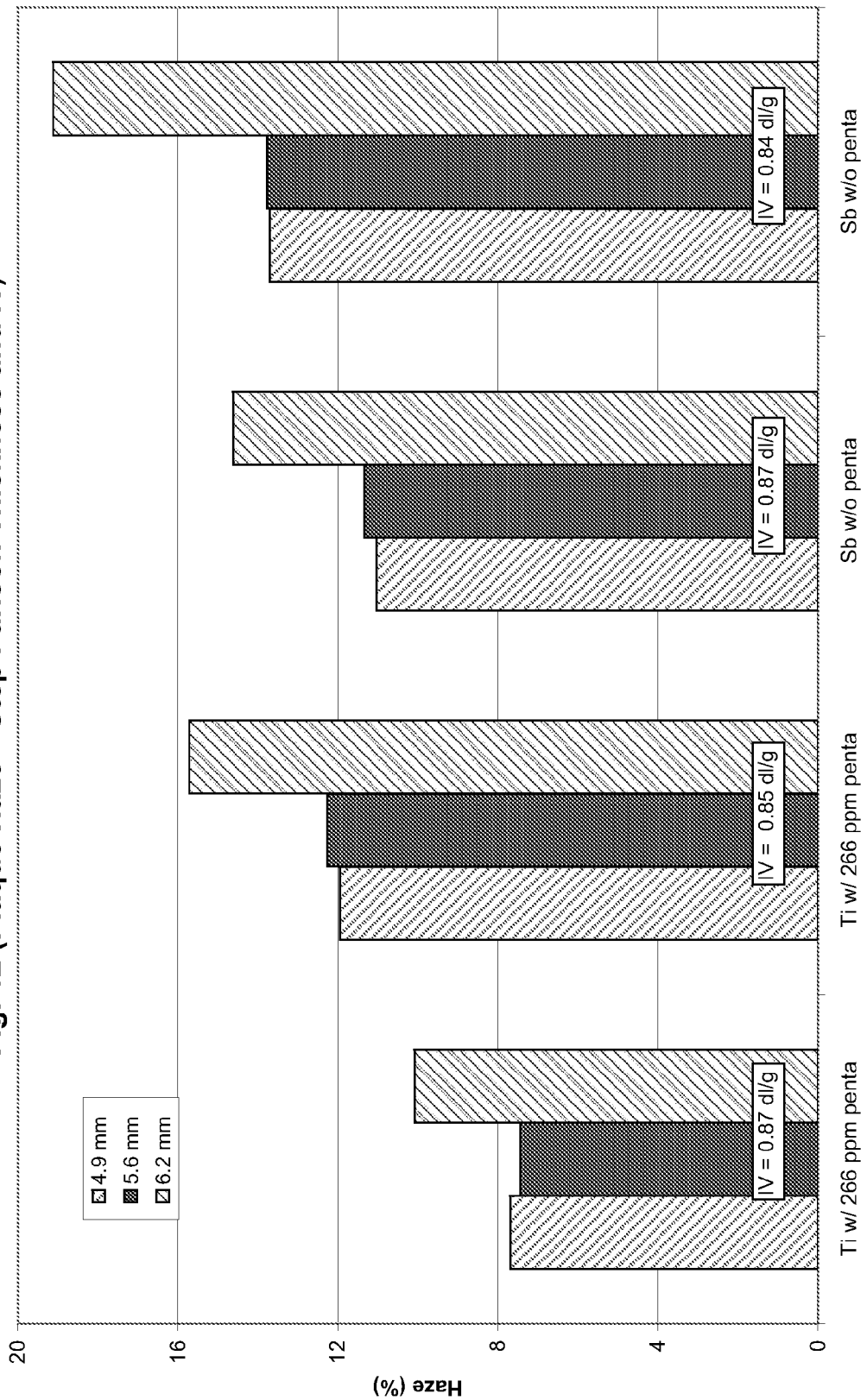
FIG. 12 illustrates percent haze versus preform thickness as measured in a step parison formed from titanium-catalyzed polyethylene terephthalate resins that include pentaerythritol according to the present invention and antimony-catalyzed polyethylene terephthalate resins that exclude branching agent.

FIG. 12 compares percent haze as measured in step parisons formed from titanium-catalyzed polyethylene terephthalate resins that include pentaerythritol according to the present invention and step parisons formed from antimony-catalyzed polyethylene terephthalate resins that exclude branching agent. FIG. 12 illustrates the superior clarity of polyethylene terephthalate resins of the present invention versus antimony-catalyzed polyethylene terephthalate resins that, except for catalyst and branching agent differences, possess comparable formulations (i.e., between 5 and 6 mole percent comonomer, namely 3.0 mole percent isophthalic acid and 2.4 mole percent diethylene glycol, and 2.8 mole percent isophthalic acid and 3.0 mole percent diethylene glycol, respectively).

Those having ordinary skill in the art understand that polyethylene terephthalate preforms and bottles must possess excellent color (i.e., not too yellow). In this regard, excessive levels of titanium catalyst can cause the polyethylene terephthalate resin to appear yellow.

Color differences are commonly classified according to the L*a*b* color space of the Commission Internationale l'Eclairage (CIE). The three components of this system consist of L*, which describes luminosity on a scale of 0-100 (i.e., 0 is black and 100 is white), a*, which describes the red-green axis (i.e., positive values are red and negative values are green), and b*, which describes the yellow-blue axis (i.e., positive values are yellow and negative values are blue). For characterizing polyester resins, L* and b* values are of particular interest.

In this regard, it is preferred that polyester color be measured after crystallization and polymerization in the solid phase. (Luminosity of polyethylene terephthalate tends to increase upon solid state polymerization.) After solid state polymerization, the polyethylene terephthalate resin of the present invention possesses an L* value (i.e., luminosity) of more than about 70, typically more than about 75 (e.g., 77), and in some instances more than about 80 as classified in the CIE L*a*b* color space. That said, the polyethylene terephthalate resin can possess an L* value as low as about 65 and still be suitable for carbonated soft drink bottles. In addition, the polyethylene terephthalate resin typically possesses a b* color value of less than about 2 (e.g., less than about 0) as classified by the CIE L*a*b* color space. Typically, the polyethylene terephthalate resin possesses a b* color value of between about −3 and 2 as classified by the CIE L*a*b* color space.

Those having ordinary skill in the art will appreciate that although color can be measured in polyester preforms and polyester bottles, color is often more conveniently measured in polyester pellets or polyester plaques. (As set forth herein, the term "pellets" is used generally to refer to chips, pellets, and the like.)

Those having ordinary skill in the art will know that polyethylene terephthalate resins are typically formed into pellets before undergoing crystallization and/or solid state polymerization. As a result, after crystallization (and/or solid state polymerization) but prior to polymer processing (e.g., injection molding), the polyethylene terephthalate resins of the present invention are crystalline pellets; it is preferred that color be measured in that form. In this regard and unless otherwise indicated (e.g., such as with respect to non-crystalline plaques), the CIE L*a*b* color space values reported herein for the polyethylene terephthalate resins of the present invention relate to crystalline polyethylene terephthalate pellets.

CIE L*a*b* color space values for the crystalline polyethylene terephthalate pellets were determined using a Hunter-Lab LabScan XE spectrophotometer (illuminant/observer: D65/10°; 0°/45° geometry; perfect reflectance diffuser NBS78; standard color tile LX16696). Those having ordinary skill in the art will appreciate that crystalline polyester pellets are translucent and so are typically measured via reflectance using a clear sample cup. In this regard, test procedures (e.g., standards and calibrations) appropriate for measuring color properties of crystalline polyester in various forms (e.g., pellets) are readily available to and within the understanding of those having ordinary skill in the art.

As described herein, the polyethylene terephthalate resin of the present invention can be injection molded into preforms, which in turn may be blow molded into bottles. Measuring color in preforms and bottles is typically performed on the preform sidewall or bottle sidewall. Such measurements, however, can be awkward. Consequently, it is preferred that preforms and bottles be formed into plaques to facilitate comparative color measurements. In this regard, the polyethylene terephthalate preforms and bottles according to the present invention are ground, melted at 280° C., and then injected into a cold mold to form standard, three millimeter (3 mm) non-crystalline polyester test plaques. Unless otherwise indicated, the CIE L*a*b* color space values reported herein for the polyethylene terephthalate preforms and bottles of the present invention relate to measurements taken upon such standard test plaques.

As these standard test plaques are formed from either polyester preforms or polyester bottles, the constituent polyesters may possess unfavorable heat histories. Those having ordinary skill in the art will appreciate that this may somewhat degrade the constituent polyesters. In this regard, it has been observed that injection molding preforms from the crystalline polyethylene terephthalate pellets of the present invention (and thereafter forming standard test plaques) can introduce some yellowing (i.e., the b* color value increases slightly).

Accordingly, the polyethylene terephthalate preforms and bottles of the present invention typically possess a b* color value of less than about 4—preferably less than about 2 (e.g., less than about 0)—as classified by the CIE L*a*b* color space. Most typically, the polyethylene terephthalate preforms and bottles possess a b* color value of between about −3 and 3 as classified by the CIE L*a*b* color space.

Like the aforementioned crystalline polyethylene terephthalate pellets, however, the polyethylene terephthalate preforms and bottles of the present invention possess an L* value of more than about 50 (e.g., 60 or 70 or more), typically more than about 75 (e.g., 77), and preferably more than about 80 (e.g., 83 or more) as classified in the CIE L*a*b* color space.

As noted and unless otherwise indicated, these CIE L*a*b* color space values for preforms and bottles refer to measurements from standard, non-crystalline polyester test plaques.

CIE L*a*b* color space values for the three-millimeter, non-crystalline polyethylene terephthalate test plaques were determined using a HunterLab UltraScan XE spectrophotometer (illuminant/observer: D65/10°; diffuse 8° geometry; transmittance port). Those having ordinary skill in the art will appreciate that non-crystalline polyester plaques are essentially transparent and so are measured by transmittance. In this regard, test procedures (e.g., standards and calibrations) appropriate for measuring color properties of non-crystalline polyester in various forms are readily available to and within the understanding of those having ordinary skill in the art.

Such color has been achieved according to the present invention by including more than about 10 ppm of elemental cobalt (e.g., between about 10 and 50 ppm), typically between about 15 and 40 ppm of elemental cobalt, and most typically between 20 and 30 ppm of elemental cobalt. In the absence of cobalt, the polyethylene terephthalate resin of the present invention tends to appear yellowish. The present polyethylene terephthalate resin possesses excellent color without the inclusion of colorants, apart from a cobalt catalyst. (Those having ordinary skill in the art will appreciate that cobalt not only provides catalytic activity, but also imparts blue coloration to the polyethylene terephthalate resin.)

Where the polyethylene terephthalate resin is intended for packaging (e.g., polyester preforms and bottles), it may include a heat-up rate additive. In this regard, the heat-up rate additive is present in the resin in an amount sufficient to improve the resin's reheating profile. As will be understood by those having ordinary skill in the art, a heat-up rate additive helps preforms absorb energy during preform reheating processes. In reheating preforms, the inside of the preform should be at least as warm as the outside of the preform as the inside undergoes more stretching during blow molding.

To those having ordinary skill in the art, it is counterintuitive to use a slow-crystallizing polyethylene terephthalate resin in the production of heat-set bottles. For example, U.S. Pat. No. 6,699,546 (Tseng), which is hereby incorporated entirely by reference, teaches the inclusion of nucleation agents to accelerate the rate of resin crystallization for improved heat-set bottles.

As explained previously, slow-crystallizing polyethylene terephthalate resins possess a significantly higher heating crystallization exotherm peak temperature ($T_{CH}$) as compared with those of antimony-catalyzed polyethylene terephthalate resins. The objective of the heat-setting process is to maximize bottle crystallinity and stress relaxation while maintaining clarity. It would seem that a slower crystallizing resin would have inferior heat-setting capability. Consequently, including a heat-up rate additive to achieve higher preform temperatures—and thus promoting crystallinity in the slower crystallizing resin—would seem to be of no practical benefit. Under such circumstances, those having ordinary skill in the art would not expect to achieve improved bottle properties (e.g., clarity and shrinkage).

For example, consider a bottle preform made from a slow-crystallizing polyethylene terephthalate resin (e.g., the titanium-catalyzed polyester resins herein disclosed) that further includes a heat-up rate additive. As noted, compared with antimony, titanium slows the onset of thermal crystallization in the preform as the preform is heated. The heat-up rate additive, however, causes the preform to absorb more energy and, therefore, to reach significantly higher temperatures before the onset of crystallization. Thus, good preform clarity is maintained even at elevated preform temperatures.

Surprisingly, the inventors have discovered that modifying a slow-crystallizing polyester resin to include sufficient heat-up rate additive to enhance the resin's reheating profile actually improves blow molding performance and bottle properties, such as shrinkage. The increased preform temperature in the blow molding and heat-setting processes promotes bottle crystallization and stress relaxation while producing bottles having clarity superior to those of antimony-catalyzed polyethylene terephthalate resins.

In one embodiment, the heat-up rate additive is a carbon-based heat-up rate additive. Carbon-based heat-up rate additive is typically present in the polyethylene terephthalate resin in an amount less than about 25 ppm. More typically, carbon-based heat-up rate additive is present in the polyethylene terephthalate resin in an amount between about 4 and 16 ppm (e.g., 8-12 ppm), most typically in an amount between about 6 and 10 ppm. Suitable carbon-based additives include carbon black, activated carbon, and graphite. For example, satisfactory carbon black heat-up rate additives are disclosed in U.S. Pat. No. 4,408,004 (Pengilly), which is hereby incorporated entirely by reference.

In another embodiment, the heat-up rate additive is a metal-containing heat-up rate additive. Metal-containing heat-up rate additive is typically present in the polyethylene terephthalate resin in an amount between about 10 and 300 ppm, more typically in an amount greater than about 75 ppm (e.g., between about 150 and 250 ppm). Suitable metal containing heat-up rate additives include metals, metal oxides, minerals (e.g., copper chromite spinels), and dyes. For example, satisfactory inorganic black pigments and particles are disclosed in U.S. Pat. No. 6,503,586 (Wu), which is hereby incorporated entirely by reference.

Preferred metal-containing heat-up rate additives are tungsten-based additives, such as tungsten metal or tungsten carbide. In this regard, tungsten-containing heat-up rate additive powders typically have an average particle size of between about 0.7 and 5.0 microns, more typically between about 0.9 and 2.0 microns.

As will be understood by those familiar with this art, particle size is typically measured by techniques based on light scattering. Particle sizes and distributions are often characterized according to ASTM B330-2 ("Standard Test Method for Fisher Number of Metal Powders and Related Compounds").

Other preferred metal-containing heat-up rate additives are molybdenum-based additives, especially molybdenum sulfide ($MoS_2$). In this regard, molybdenum sulfide has outstanding heat absorption properties, so it can be included in somewhat lesser quantities (e.g., 5-100 ppm) as compared with other metal-containing heat-up rate additives.

The most preferred heat-up rate additives are natural spinels and synthetic spinels. Spinels are typically included in the polyethylene terephthalate resin in an amount between about 10 and 100 ppm (e.g., between about 15 and 25 ppm). Particularly outstanding spinel pigments are copper chromite black spinel and chrome iron nickel black spinel.

These spinels are disclosed in commonly assigned U.S. patent application Ser. No. 09/247,355, for Thermoplastic Polymers with Improved Infrared Reheat Properties, filed Feb. 10, 1999, now abandoned, and its divisions: U.S. patent application Ser. No. 09/973,499, published as U.S. Patent Publication 2002/0011694 A1 on Jan. 31, 2002; U.S. patent application Ser. No. 09/973,520, published as U.S. Patent Publication 2002/0027314 A1 on Mar. 7, 2002: and U.S. patent application Ser. No. 09/973,436, published as U.S. Patent Publication 2002/0033560 A1 on Mar. 21, 2002. Each of these patent applications and patent publications is hereby incorporated entirely by reference.

The heat-up rate of a polyethylene terephthalate preform can be described by surface temperature measurements at a fixed location on a preform for a particular bottle production rate.

In polyethylene terephthalate bottle production, polyethylene terephthalate bottle preforms are reheated by passing the preforms through a reheat oven of a blow molding machine. The reheat oven consists of a bank of quartz lamps (3,000 and 2,500 watt lamps) that emit radiation mostly in the infrared range. The ability of the preform to absorb this radiation and convert it into heat, thereby allowing the preform to reach the orientation temperature for blow molding, is important for optimum bottle performance and efficient production. Important bottle properties for bottle performance are material distribution, orientation, and sidewall crystallinity.

Preform reheat temperature is important for control of these properties. Depending on the kind of bottle being produced, the preform reheat temperature is typically in the range of 30-50° C. above the glass transition temperature ($T_g$) of polyethylene terephthalate. The reheat temperature depends on the application (e.g., hot-filled beverage bottle or carbonated soft drink bottles). The rate at which a preform can be reheated to the orientation temperature is important for optimal bottle performance in high-speed, polyethylene terephthalate blow-molding machines, such as those manufactured by Sidel, Inc. (LeHavre, France). This is especially true for heat-set bottles that are intended for filling with hot liquids in excess of 185° F. In heat-set bottle production, the preform is reheated rapidly to as high a temperature as possible. This maximizes crystallization upon blow molding and avoids thermal crystallization in the preform. Those having ordinary skill in the art will appreciate that such thermal crystallization can cause unacceptable haze as a result of spherulitic crystallization.

In view of the importance of preform reheating, the following method has been used to assess the reheat characteristics of polyethylene terephthalate preforms. As initial matter, this test method analyzes the reheat characteristics of polyethylene terephthalate preforms (or resins) by forming test parisons from one or more polyethylene terephthalate resin formulations. It is the test parisons (i.e., stepped-core preforms)—not commercial preforms—that are actually tested:

First, the subject resin is formed into a 5.25-inch test parison having a weight of 47 grams, an overall diameter of 1.125 inches, and a 0.75-inch neck finish. To form such a test parison, a polyethylene terephthalate resin is dried at 350° F. for four hours in a desiccant dryer. The dried resin is introduced into a 4-ounce Newbury injection-molding machine. The resin is kneaded and melted to provide a molten resin with a temperature in the range of 500° F. to 520° F. Then, the molten resin is injected into a preform mold designed for a two-liter carbonated soft drink bottle. The total cycle time is 60 seconds, including injection, pack, and cooling time. The mold is continuously chilled to 45° F. These injection molding conditions give a clear test parison that is predominately amorphous (i.e., less than about 4 percent crystallinity).

The reheat performance of the 5.25-inch test parison is tested using a Sidel SBO1 laboratory blow-molding machine. This machine has one reheat oven with a bank of up to ten independently adjustable quartz lamps, an infrared camera to measure preform surface temperature, a transfer arm form the oven to blow mold, one blow mold, and a bottle transfer arm extending from the blow mold to the machine exit.

In this test method, the SBO1 laboratory blow molding machine continuously produces polyethylene terephthalate bottles at a rate of 1,000 bottles per hour using eight quartz lamps. The oven has power control that can be adjusted as a percentage of the overall oven power output. Likewise, each lamp can be adjusted as a percentage of the individual lamp power output.

To determine the reheat characteristics of a 5.25-inch parison, the machine is set up at a bottle production rate of 1,000 bottles per hour. A standard resin is selected to produce a test parison. Then, the reheating profile for this test parison is established. The reheating profile is used to produce commercially acceptable bottles at an overall power output of 80 percent. Thereafter, the percentage of the overall power is varied between 65 and 90 percent and the surface temperature is repeatedly measured at a fixed location on the test parison.

The reheat performance of the 5.25-inch test parison is consistently measured 1.4 inches below the support ring of the neck finish. At this location, (i.e., 1.4 inches below the support ring), the test parison has a wall thickness of 0.157-inch.

Example 1

A two-liter polyethylene terephthalate bottle test parison was produced from a standard resin (i.e., Wellman's PermaClear® HP806 polyester resin). This test parison required eight reheat zones for production of a straight-wall, two-liter bottle. At an overall oven power percentage of 80 percent, the reheating profile for this PermaClear® HP806 test parison is shown in Table 5 (below):

TABLE 5

| Heating Zones | Power output (%) |
|---|---|
| 1 | 74 |
| 2 | 60 |
| 3 | 55 |
| 4 | 55 |
| 5 | 55 |
| 6 | 68 |
| 7 | 86 |
| 8 | 74 |

After establishing this reheating profile, two samples were prepared from an antimony-catalyzed polyethylene terephthalate resin having less than about 6 mole percent comonomer substitution. One sample included about 11 ppm of a carbon-based heat-up rate additive (Resin A) and the other sample, a control, included no heat-up rate additive (Resin B). Besides the presence of a heat-up rate additive, Resin A and Resin B were otherwise identical. The reheat performance (i.e., via surface temperature measurements) for both Resin A and Resin B were then measured (in five-percent increments) at the overall oven power outputs of between 65 and 90 percent:

TABLE 6

| Overall Oven Power Output (%) | Resin A (surface temp. ° C.) | Resin B (surface temp. ° C.) |
|---|---|---|
| 65 | 87.3 | 81.0 |
| 70 | 92.0 | 85.0 |
| 75 | 95.8 | 87.5 |
| 80 | 100.5 | 92.0 |
| 85 | 107.0 | 97.3 |
| 90 | 113.0 | 101.0 |

Table 6 (above) demonstrates that improved preform reheat performance is achieved as a result of the inclusion of a heat-up rate additive.

Accordingly, to improve preform reheat performance, the polyethylene terephthalate resin of the present invention may include a heat-up rate additive in a concentration sufficient for an aforementioned 5.25-inch test parison to achieve reheating surface temperatures that, as measured 1.4 inches below the support ring of the neck finish where the wall thickness is 0.157 inch, are at least about 4° C. higher than corresponding reheating temperatures achievable by an otherwise identical 5.25-inch test parison (i.e., without a heat-up rate additive) as measured on a Sidel SB01 laboratory blow-molding machine operating at a production rate of 1,000 bottles per hour and using eight lamps at overall power levels of 65 percent, 70 percent, 75 percent, 80 percent, 85 percent, and 90 percent, respectively. The difference in respective reheating surface temperatures is more preferably at least about 7° C. and most preferably at least about 10° C.

In another embodiment, the polyethylene terephthalate resin of the present invention includes a heat-up rate additive in a concentration sufficient for an aforementioned 5.25-inch test parison to achieve an average reheating surface temperature that, as measured 1.4 inches below the support ring of the neck finish where the wall thickness is 0.157 inch, is at least about 5° C. higher—preferably 10° C. higher—than the average reheating temperature achievable by an otherwise identical 5.25-inch test parison (i.e., without a heat-up rate additive) as measured on a Sidel SB01 laboratory blow-molding machine operating at a production rate of 1,000 bottles per hour and using eight lamps at overall power levels between about 65 and 90 percent.

Alternatively, the intrinsic heat-up rate of polyester resin can be described by its characteristic absorption of energy. In this regard, electromagnetic radiation exists across several spectra. For example, electromagnetic radiation can be measured in the ultraviolet, visible, near-infrared, and infrared ranges. The visible light spectrum falls between about 430 nm and 690 nm. This spectrum is bounded by ultraviolet radiation and infrared radiation, respectively. With respect to the reheating profile of polyester, near infrared radiation (NIR) is of particular interest.

More specifically, the intrinsic heat-up rate of polyester resin can be characterized by its absorption of electromagnetic radiation. Absorbance is described by Beer's Law, which is expressed as equation 1:

$$A = \epsilon \cdot l \cdot c \qquad \text{Eq. 1}$$

wherein
A is absorbance of electromagnetic radiation by a sample,
$\epsilon$ is the proportionality constant of the sample (i.e., "molar absorptivity"),
l is the path length of the sample through which electromagnetic radiation must pass, and
c is the concentration of the sample (typically measured in moles/liter).

With respect to polyester resin, however, equation 1 can be simplified. For a particular polyester resin, molar absorptivity and sample concentration can be ignored. Moreover, a linear relationship exists between absorbance and path length (i.e., sample thickness). Thus, for a polymer resin, absorbance (A) can be calculated from transmittance (T) as follows:

$$A = \log(100) - \log(\% T) \qquad \text{Eq. 2}$$

Equation 2 is further simplified as expressed in equation 3:

$$A = 2 - \log(\% T) \qquad \text{Eq. 3}$$

In brief, transmittance is the ratio of the intensity of the electromagnetic radiation that passes through the polymer resin to the intensity of the electromagnetic radiation that enters the polymer resin. As reported herein, absorbance, which is calculated from the relationship expressed in equation 3, describes the electromagnetic radiation that a non-crystalline polyethylene terephthalate resin fails to transmit.

As noted previously, the polyethylene terephthalate resins of the present invention generally possess absorbance (A) of at least about 0.18 $cm^{-1}$ at a wavelength of 1100 nm or at a wavelength of 1280 nm. Moreover, the present polyethylene terephthalate resins typically possess absorbance (A) of at least about 0.20 $cm^{-1}$ at a wavelength of 1100 nm or at a wavelength of 1280 nm, preferably possess absorbance (A) of at least about 0.24 $cm^{-1}$ at a wavelength of 1100 nm or at a wavelength of 1280 nm absorbance (A), and more preferably possess absorbance (A) of at least about 0.28 $cm^{-1}$ at a wavelength of 1100 nm or at a wavelength of 1280 nm absorbance (A).

Those having ordinary skill in the art will understand that as used herein the disjunctive (i.e., "or") includes the conjunctive (i.e., "and"). Moreover, with respect to the present disclosure, absorbance is reported for non-crystalline polyester.

In its most preferred embodiments, the polyethylene terephthalate resins possess an absorbance (A) of at least about 0.25 $cm^{-1}$ at a wavelength of 1100 nm or at a wavelength of 1280 nm, and preferably an absorbance (A) of at least about 0.30 $cm^{-1}$ at a wavelength of 1100 nm or at a wavelength of 1280 nm. In some embodiments, the polyethylene terephthalate resins possess an absorbance (A) of at least about 0.30 $cm^{-1}$ at a wavelength of 1100 nm or at a wavelength of 1280 nm, and in particular embodiments an absorbance (A) of at least about 0.40 $cm^{-1}$ at a wavelength of 1100 nm or at a wavelength of 1280 nm. These polyethylene terephthalate resins can be achieved by including between about 10 and 100 ppm of a copper chromite black spinel.

In this regard, absorbance was determined within the visible and NIR spectra for both a non-crystalline unenhanced polyethylene terephthalate resin (PET) and an otherwise identical polyethylene terephthalate resin, albeit enhanced with 22 ppm of a copper chromite black spinel heat-up rate additive (PET/spinel). Table 7 (below) reports absorbance for these polyester resins at 550 nm, 700 nm, 1100 nm, and 1280 nm:

TABLE 7

| Absorbance ($cm^{-1}$) | 550 nm | 700 nm | 1100 nm | 1280 nm |
|---|---|---|---|---|
| PET | 0.209 | 0.170 | 0.145 | 0.144 |
| PET/spinel | 0.399 | 0.374 | 0.314 | 0.314 |

Figure 13:
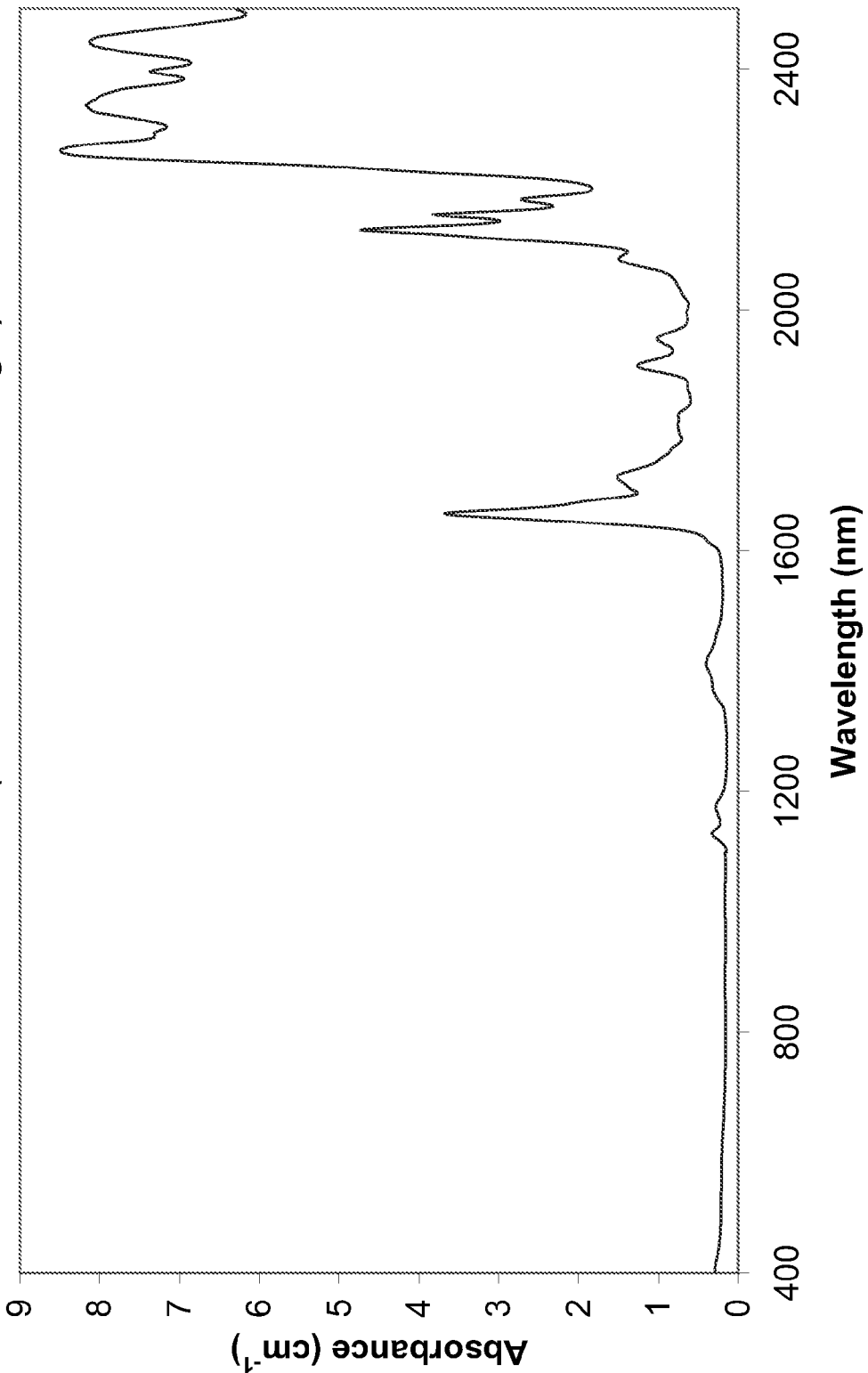
FIGS. 13-14 illustrates the absorbance ($cm^{-1}$) of a representative polyethylene terephthalate unenhanced by heat-up rate additives.
Figure 14:
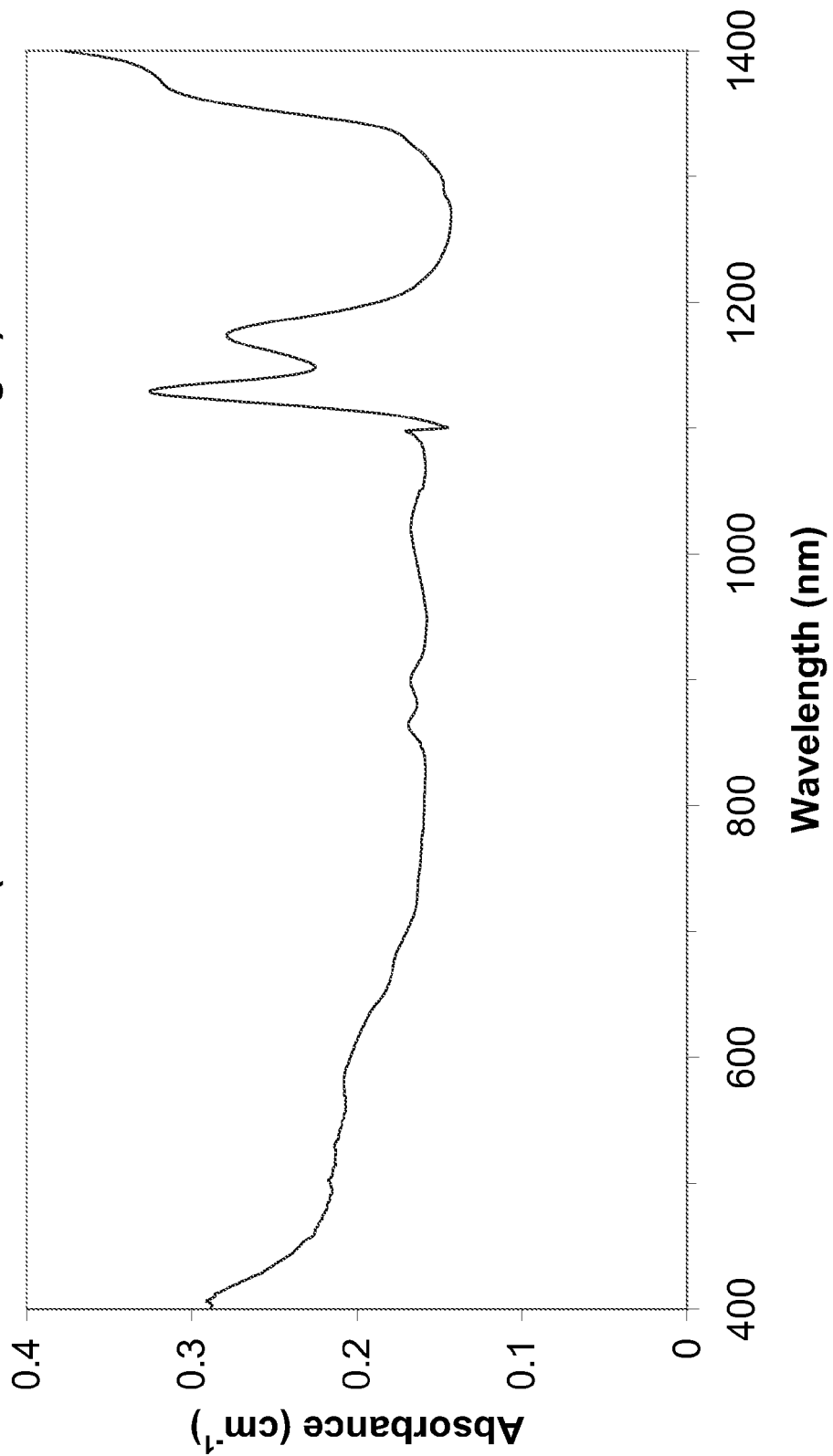

The wavelengths reported in Table 7 (above) are meaningful. In particular, 550 nm falls near the midpoint of the visible light spectrum and 700 nm falls near the upper end of the visible spectrum. Moreover, as depicted in FIGS. 13-14, the absorbance for unenhanced polyethylene terephthalate is nearly flat (i.e., the slope is about 0) at 1100 nm and 1280 nm, thereby facilitating repeatable measurements at these wavelengths within the NIR spectrum.

To enhance color, it is preferred that heat-up rate additives promote the absorption of more NIR radiation and lesser amounts of visible radiation. This can be described by the absorption ratio as herein defined. In brief, for a polyester resin, the absorption ratio is simply the antilog of the absorbance at a first wavelength divided by the antilog of the absorbance at a second wavelength. This is expressed in equation 4:

$$\text{absorption ratio} = (\text{antilog } A_1)/(\text{antilog } A_2) \qquad \text{Eq. 4}$$

wherein
$A_1$ is absorbance at a first wavelength, and
$A_2$ is absorbance at a second wavelength.

With respect to absorption ratio, the first wavelength typically falls within the NIR spectrum (e.g., 1280 nm) and the second wavelength typically falls within the visible spectrum (e.g., 550 nm). Table 8 (below) indicates that the polyethylene terephthalate enhanced with 22 ppm of copper chromite spinel has similar absorption selectivity to that of the unenhanced polyethylene terephthalate, despite having significantly higher absorbance (e.g., absorbance greater than 0.30 $cm^{-1}$ at both 1100 nm and 1280 nm).

TABLE 8

| Absorption Ratio | 1100:550 | 1280:550 | 1100:700 | 1280:700 |
|---|---|---|---|---|
| PET | 0.864 | 0.862 | 0.945 | 0.943 |
| PET/spinel | 0.822 | 0.822 | 0.871 | 0.871 |

The present polyethylene terephthalate resins preferably possess a 1100:550 absorption ratio of at least about 70 percent or a 1280:550 absorption ratio of at least about 70 percent. More preferably, the present polyethylene terephthalate resins possess a 1100:550 absorption ratio of at least about 75 percent or a 1280:550 absorption ratio of at least about 75 percent. In some embodiments, the present polyethylene terephthalate resins preferably possess a 1100:550 absorption ratio of at least about 80 percent or a 1280:550 absorption ratio of at least about 80 percent.

Similarly, the present polyethylene terephthalate resins preferably possess a 1100:700 absorption ratio of at least about 85 percent or a 1280:700 absorption ratio of at least about 85 percent. In some embodiments, the present polyethylene terephthalate resins possess a 1100:700 absorption ratio of at least about 90 percent (e.g., 95 percent or more) or a 1280:700 absorption ratio of at least about 90 percent (e.g., 95 percent or more).

With respect to the present disclosure, absorbance was determined for three millimeter (3 mm), non-crystalline polyester plaques using a Foss Series 6500 Transport Analyzer. This instrument is typical of those capable of measuring transmittance in the visible and NIR spectra in that instrumentation factors (e.g., lamp, detector, vibration, and air filtration) can affect absorbance measurements. Of course, the use of appropriate standards and calibrations is within the understanding of those having ordinary skill in the art.

To control for testing variability, the absorbance data must be normalized at an incident wavelength of 2132 nm such that the corresponding absorbance is 0.473 $mm^{-1}$ (i.e., 4.73 $cm^{-1}$). At this wavelength additives have modest effect on absorbance for non-crystalline polyethylene terephthalate.

The inventors have also considered the effect of sample reflectance, but have determined that it may be disregarded when determining absorbance of polyester resins. In brief, reflectance is radiation that has been scattered from the surface of a solid, liquid, or gas. Reflected electromagnetic energy is expressed in relation to the energy absorbed and energy transmitted as expressed in equation 5:

$$I_O = I_A + I_T + I_R \qquad \text{Eq. 5}$$

wherein
$I_O$ is incident energy,
$I_A$ is absorbed energy,
$I_T$ is transmitted energy, and
$I_R$ is reflected energy.

As described previously, absorbance is derived from the transmittance. See equation 3. Reflectance is generally not measured, and so the inventors have considered whether ignoring reflectance introduces substantial errors in the determination of absorbance.

In this regard, it would seem that a polyester plaque having a polished surface would have a higher reflectance than would a polyester plaque having a "matte" or other non-reflective finish. If reflectance is not considered, increasing reflectance would seem to decrease transmittance. In accordance with equation 3, this would have the effect of falsely increasing calculated absorbance.

Therefore, to reduce absolute reflectance and control reflectance variability, the polyester plaques should have a consistent finish across batches (i.e., semi-glossy). It is believed that by controlling the physical properties of the polyester plaques in this way, reflectance becomes negligible in assessing absorbance and absorption ratio.

Those having ordinary skill in the art will know that there are two primary methods for making polyethylene terephthalate. Each of these methods reacts a terephthalate component and a diol component (i.e., a terephthalate moiety and a diol moiety) to form polyethylene terephthalate prepolymers, and then polymerizes the prepolymers (i.e., melt phase polycondensation and/or solid state polymerization) to form polyethylene terephthalate polymers. These methods are well known to those skilled in the art.

One method employs a direct esterification reaction using terephthalic acid and excess ethylene glycol. In this method, the aforementioned step of reacting a terephthalate component and a diol component includes reacting terephthalic acid and ethylene glycol in a heated esterification reaction to form monomers and oligomers of terephthalic acid and ethylene glycol, as well as a water byproduct. To enable the esterification reaction to go essentially to completion, the water must be continuously removed as it is formed. The monomers and oligomers are subsequently catalytically polymerized via polycondensation (i.e., melt phase and/or solid state polymerization) to form polyethylene terephthalate polyester. As noted, ethylene glycol is continuously removed during polycondensation to create favorable reaction kinetics.

The other method involves a two-step ester exchange reaction and polymerization using dimethyl terephthalate and excess ethylene glycol. In this technique, the aforementioned step of reacting a terephthalate component and a diol component includes reacting dimethyl terephthalate and ethylene glycol in a heated, catalyzed ester exchange reaction (i.e., transesterification) to form bis(2-hydroxyethyl)-terephthalate monomers, as well as methanol as a byproduct. To enable the ester exchange reaction to go essentially to completion, the methanol must be continuously removed as it is formed. The bis(2-hydroxyethyl)terephthalate monomer product is then catalytically polymerized via polycondensation (i.e., melt phase and/or solid state polymerization) to produce polyethylene terephthalate polymers. The resulting polyethylene terephthalate polymers are substantially identical to the polyethylene terephthalate polymer resulting from direct esterification using terephthalic acid, albeit with some minor chemical differences (e.g., end group differences).

Polyethylene terephthalate polyester may be produced in a batch process in which the product of the ester interchange or esterification reaction is formed in one vessel and then transferred to a second, agitated vessel for polymerization (i.e., melt phase polycondensation). Generally, the polycondensation reaction continues in the second vessel until the power used by the agitator indicates that the polyester melt has achieved the desired intrinsic viscosity and, thus, the desired molecular weight. It is more commercially practicable, however, to carry out the esterification or ester interchange reactions, and then the polymerization reaction as a continuous process. The continuous production of polyethylene terephthalate results in greater throughput, and so is more typical in large-scale manufacturing facilities.

In the present invention, the direct esterification reaction is preferred over the older, two-step ester exchange reaction. Direct esterification terephthalic acid is not only more economical but often yields polyethylene terephthalate resins having better color.

In this regard and as noted, the direct esterification method typically reacts terephthalic acid and ethylene glycol along with no more than about 12 mole percent diacid and diol modifiers to form low molecular weight monomers, oligomers, and water. In particular, both titanium and cobalt catalysts preferably are added during esterification as this has been found to improve the color of the resulting polyethylene terephthalate resins. The polyethylene terephthalate resin may optionally include other catalysts, such as aluminum-based catalysts, manganese-based catalysts, or zinc-based catalysts.

More specifically, the titanium catalyst is introduced in an amount sufficient for the final polyethylene terephthalate resin to include between about 2 and 50 ppm of elemental titanium. Likewise, the cobalt catalyst is introduced in an amount sufficient for the final polyethylene terephthalate resin to include between about 10 and 50 ppm of elemental cobalt. To prevent process disruptions (e.g., clogged piping), it is recommended that the titanium and cobalt catalysts be introduced into an esterification vessel by a different delivery means.

The inclusion of a titanium or cobalt catalyst increases the rate of esterification and polycondensation and, hence, the production of the polyethylene terephthalate resins. These catalysts, however, will eventually degrade the polyethylene terephthalate polymer. For example, degradation may include polymer discoloration (e.g., yellowing), acetaldehyde formation, or molecular weight reduction. To reduce these undesirable effects, stabilizing compounds can be employed to sequester ("cool") the catalysts. The most commonly used stabilizers contain phosphorus, typically in the form of phosphates and phosphites.

Accordingly, the present resin typically includes a phosphorus stabilizer. In this regard, the phosphorus stabilizer may be introduced into the polyethylene terephthalate polymers such that the phosphorus is present in the resulting resin, on an elemental basis, in an amount less than about 100 ppm (e.g., between 2 and 100, such as between about 15 and 75), typically in an amount less than about 60 ppm (e.g., between about 10 and 20 ppm), and more typically in an amount between about 2 and 40 ppm (e.g., between about 5 and 15 ppm). In one exemplary embodiment, the phosphorus is present in the resulting resin in an amount less than about 10 ppm (i.e., between about 2 and 10 ppm). In another exemplary embodiment, the phosphorus is present in the resulting resin in an amount greater than about 15 ppm (e.g., between about 20 and 50 ppm). The phosphorus stabilizer may be introduced into the melt phase any time after esterification, but it is typically added to the melt after polycondensation is essentially complete.

Although adding a phosphorus stabilizer to the polymer melt in a batch reactor is a relatively simple process, numerous problems arise if the stabilizers are added in the continuous production of polyethylene terephthalate. For example, while early addition of the stabilizer prevents discoloration and degradation of the polyester, it also causes reduced production throughput (i.e., decreases polycondensation reaction rates). Moreover, phosphorus stabilizers are typically dissolved in ethylene glycol, the addition of which further slows the polymerization process. Consequently, early addition of the stabilizer in the polymerization process requires an undesirable choice between production throughput and thermal stability of the polymer. As used herein, "thermal stability" refers to a low rate of acetaldehyde generation (e.g., less than about 5 ppm), low discoloration, and retention of molecular weight following subsequent heat treatment or other processing.

Later addition of the phosphorus stabilizer may provide insufficient opportunity for the stabilizer to fully blend with the polymer. Consequently, the phosphorus stabilizer may not prevent degradation and discoloration of the polyester. In addition, adding phosphorus stabilizer during polymer processing is often inconvenient and does not provide economies of scale.

U.S. Pat. No. 5,376,702 for a Process and Apparatus for the Direct and Continuous Modification of Polymer Melts, which is hereby incorporated entirely herein by reference, discloses dividing a polymer melt stream into an unmodified stream and a branch stream that receives additives. In particular, a side stream takes a portion of the branch stream to an extruder, where additives are introduced. Such techniques, however, are not only complicated, but also costly, requiring a screw extruder and melt piping to process additives. Consequently, such arrangements are inconvenient and even impractical where total additive concentrations are low (e.g., less than one weight percent).

Certain problems associated with late addition of stabilizer are addressed in U.S. Pat. No. 5,898,058 for a Method of Post-Polymerization Stabilization of High Activity Catalysts in Continuous Polyethylene Terephthalate Production, which discloses a method of stabilizing high activity polymerization catalysts in continuous polyethylene terephthalate production. This patent, which is commonly assigned with this application, is hereby incorporated entirely herein by reference.

In particular, U.S. Pat. No. 5,898,058 discloses adding a stabilizer, which preferably contains phosphorus, at or after the end of the polymerization reaction and before polymer processing. This deactivates the polymerization catalyst and increases the throughput of the polyester without adversely affecting the thermal stability of the polyethylene terephthalate polyester. In this regard U.S. Pat. No. 5,898,058 discloses that "sufficient stabilizer should be employed so that phosphorous is present in a range from about 25 to about 150 ppm based on the theoretical yield of the polymer." While a noteworthy improvement over conventional techniques, U.S. Pat. No. 5,898,058 teaches adding the stabilizer without a carrier. Consequently, the addition of solids into the polymer necessitates the costly use of an extruder.

The aforementioned U.S. application Ser. No. 09/738,150 for Methods of Post-Polymerization Injection in Continuous Polyethylene Terephthalate Production, now U.S. Pat. No.

6,599,596, discloses a process for the production of high quality polyethylene terephthalate polyester that improves upon the stabilizer-addition techniques disclosed by commonly assigned U.S. Pat. No. 5,898,058.

More specifically, U.S. application Ser. No. 09/738,150 discloses a method for the late introduction of additives into a process for making polyethylene terephthalate. The additives are introduced during, and preferably after, the polycondensation of polyethylene terephthalate polymers. In particular, the method employs a reactive carrier that not only functions as a delivery vehicle for one or more additives, but also reacts with the polyethylene terephthalate, thereby binding the carrier in the polyethylene terephthalate resin. Moreover, U.S. application Ser. No. 09/738,150 discloses that this may be achieved using a simplified additive delivery system that does not require the use of an extruder. (U.S. application Ser. No. 09/932,150, for Methods of Post-Polymerization Extruder Injection in Polyethylene Terephthalate Production, now U.S. Pat. No. 6,569,991, which is a continuation-in-part of U.S. application Ser. No. 09/738,150, discloses a method for late additive introduction at an extruder during a process for making polyethylene terephthalate.)

The phosphorus stabilizers herein disclosed can be introduced to the polyethylene terephthalate polymers directly, as a concentrate in polyethylene terephthalate, or as a concentrate in a liquid carrier. The preferred point of addition in the polyethylene terephthalate polymerization process is after completion of polycondensation (i.e., mixed with the molten polymer stream after the final polymerization vessel). Those having ordinary skill in the art will appreciate that if added to deactivate one or more polymerization catalysts, phosphorus must be introduced in sufficient amounts to achieve that objective. Phosphorus in excess of the amount required to deactivate polymerization catalysts (e.g., more than about 60 ppm and perhaps even more than 100 ppm, such as 150 ppm) might be unnecessary but not especially detrimental to the resulting polyethylene terephthalate resin.

The phosphorus stabilizer is typically introduced to the polyethylene terephthalate polymers via a reactive carrier, rather than via an inert carrier or no carrier at all. The reactive carrier, which preferably has a molecular weight of more than about 200 g/mol and less than about 10,000 g/mol may be introduced during polycondensation, or more typically, after the polycondensation is complete. In either respect, the reactive carrier should be introduced to the polyethylene terephthalate polymers in quantities such that bulk polymer properties are not detrimentally affected.

As a general matter, the reactive carrier should make up no more than about one weight percent of the polyethylene terephthalate resin (i.e., 10,000 ppm). Preferably, the reactive carrier is introduced to the polyethylene terephthalate polymers in quantities such that its concentration in the polymer resin is less than about 1,000 ppm (i.e., 0.1 weight percent). Reducing the reactive carrier to quantities such that its concentration in the polymer resin is less than 500 ppm (i.e., 0.05 weight percent) will further reduce potential adverse effects to bulk polymer properties.

Most preferably, the reactive carrier has a melting point that ensures that it is a liquid or slurry at near ambient temperatures. Near ambient temperatures not only simplify the unit operations (e.g., extruders, heaters, and piping), but also minimize degradation of the inert particulate additives. As used herein, the term "near ambient" includes temperatures between about 20° C. and 60° C.

In general, reactive carriers having carboxyl, hydroxyl, or amine functional groups are favored. Preferred are polyols, especially polyester polyols and polyether polyols, having a molecular weight that is sufficiently high such that the polyol will not substantially reduce the intrinsic viscosity of the polyethylene terephthalate polymer, and a viscosity that facilitates pumping of the polyol. Polyethylene glycol is a preferred polyol. Other exemplary polyols include functional polyethers, such as polypropylene glycol that is prepared from propylene oxide, random and block copolymers of ethylene oxide and propylene oxide, and polytetramethylene glycol that is derived from the polymerization of tetrahydrofuran.

Alternatively, the reactive carrier may include dimer or trimer acids and anhydrides. In another embodiment, the reactive carrier may possess, in addition to or in place of terminal functional groups, internal functional groups (e.g., esters, amides, and anhydrides) that react with the polyethylene terephthalate polymers. In yet another embodiment, the reactive carrier may include non-functional esters, amides, or anhydrides that is capable of reacting into the polyethylene terephthalate polymers during solid state polymerization and that will not cause the polyethylene terephthalate polymers to suffer intrinsic viscosity loss during injection molding processes.

In view of the foregoing, an exemplary method of making the titanium-catalyzed polyethylene terephthalate resin of the present invention includes reacting, in a heated esterification reaction, a diacid moiety that includes at least 94 mole percent terephthalic acid and a diol moiety that includes at least 94 mole percent ethylene glycol.

For many applications, the diacid and diol modifiers should be included such that the resulting polyethylene terephthalate polymer has less than about 6 mole percent comonomer substitution. The diacid component may include between about 1.6 and 2.4 mole percent isophthalic acid with the remainder terephthalic acid, and the diol component may include 1.6 mole percent diethylene glycol and the remainder ethylene glycol. For instance, a polyethylene terephthalate resin that is useful for making high-strength, high-clarity carbonated soft drink preforms and bottles may include between about 2 and 3 mole percent isophthalic acid (e.g., about 2.4 mole percent) and less than about 3 mole percent diethylene glycol (e.g., less than 2.4 mole percent).

The esterification reaction is catalyzed by both titanium and cobalt to form monomers and oligomers of terephthalic acid and diacid modifiers, and ethylene glycol and diol modifiers, as well as water, which is continuously removed as it is formed to enable the esterification reaction to go essentially to completion. The titanium catalyst and the cobalt catalyst are concurrently introduced in amounts sufficient for the polyethylene terephthalate resin to include between about 2 and 50 ppm (e.g., 5-15 ppm) of elemental titanium and between about 10 and 50 ppm of elemental cobalt (e.g., 20-30 ppm).

The monomers and oligomers are then polymerized via melt phase polycondensation to form polyethylene terephthalate polymers. A phosphorus stabilizer is then introduced into the polyethylene terephthalate polymers, preferably using a reactive carrier. As noted, the reactive carrier facilitates uniform blending within the polymer melt. The phosphorus stabilizer is typically introduced into the polyethylene terephthalate polymers such that the phosphorus is present in the resulting resin, on an elemental basis, in an amount less than about 100 ppm, typically between about 2 and 60 ppm (e.g., between about 20 and 50 ppm).

The melt phase polycondensation usually continues until the polyethylene terephthalate polymers achieve an intrinsic viscosity greater than about 0.50 dL/g (e.g., greater than about 0.55 dL/g), more typically greater than about 0.60 dL/g (e.g., greater than about 0.65 dL/g), and perhaps greater than about 0.70 dL/g (e.g., between about 0.70 dL/g and 0.90 dL/g, or greater than about 0.75 dL/g, such as between about 0.78 and 0.86 dL/g).

Thereafter, the polyethylene terephthalate polymers are formed into pellets, which are then crystallized and, optionally, polymerized in the solid state to an intrinsic viscosity of greater than about 0.70 dL/g (e.g., greater than about 0.75 dL/g) and more typically greater than about 0.80 dL/g (e.g., between about 0.81 and 0.87 dL/g). In some instances, polyethylene terephthalate polymers can be polymerized in the solid state to an intrinsic viscosity of greater than about 0.85 dL/g or 0.90 dL/g. In many instances, the polyethylene terephthalate polymers are polymerized in the solid state to an intrinsic viscosity of less than 0.86 dL/g (e.g., 0.75-0.78 dL/g).

An exemplary reactive carrier is a polyol (e.g., polyethylene glycol) having a molecular weight that permits the polyol to be pumped at near ambient temperatures (e.g., less than about 60° C.) and that is introduced to the polyethylene terephthalate polymers in quantities such that bulk properties of the polyethylene terephthalate polymers are not detrimentally affected (e.g., quantities such that its concentration in the polymers is less than about one weight percent). The polyethylene terephthalate polymers are then formed into chips (or pellets via a polymer cutter) before being solid state polymerized. Importantly, the polyol reactive carrier combines with the polyethylene terephthalate polymer such that it is non-extractable during subsequent processing operations (e.g., forming polyester preforms or beverage containers).

Other additives can be incorporated via reactive carrier into the polyethylene terephthalate resins of the present invention. Such additives include preform heat-up rate enhancers, friction-reducing additives, UV absorbers, inert particulate additives (e.g., clays or silicas), colorants, antioxidants, branching agents, oxygen barrier agents, carbon dioxide barrier agents, oxygen scavengers, flame retardants, crystallization control agents, acetaldehyde reducing agents, impact modifiers, catalyst deactivators, melt strength enhancers, anti-static agents, lubricants, chain extenders, nucleating agents, solvents, fillers, and plasticizers.

Late addition is especially desirable where the additives are volatile or subject to thermal degradation. Conventional additive injection prior to polycondensation, such as during an esterification stage in the synthesis of polyester, or early during the polycondensation stage subjects additives to several hours of high-temperature (greater than 260° C.) and reduced-pressure (less than 10 torr) conditions. Consequently, additives that have significant vapor pressure at these conditions will be lost from the process. Advantageously, late addition via reactive carrier significantly reduces the time additives are exposed to high polycondensation temperatures.

As will be understood by those of ordinary skill in the art, macromolecules are considered to be polymers at an intrinsic viscosity of about 0.45 dL/g. For polyethylene terephthalate, this roughly translates to a molecular weight of at least about 13,000 g/mol. At this molecular weight, polyethylene terephthalate polymers possess sufficient molecular weight, mechanical properties, melt strength, and crystallinity to facilitate polymer processing.

In contrast, the reactive carriers according to the present invention have molecular weights that are less than about 10,000 g/mol (e.g., between about 200 g/mol and 10,000 g/mol). The molecular weight of the reactive carrier is generally less than 6,000 g/mol, typically less than 4,000 g/mol, more typically between about 300 and 2,000 g/mol, and most typically between about 400 and 1,000 g/mol. As used herein, molecular weight refers to number-average molecular weight, rather than weight-average molecular weight.

Figure 15:
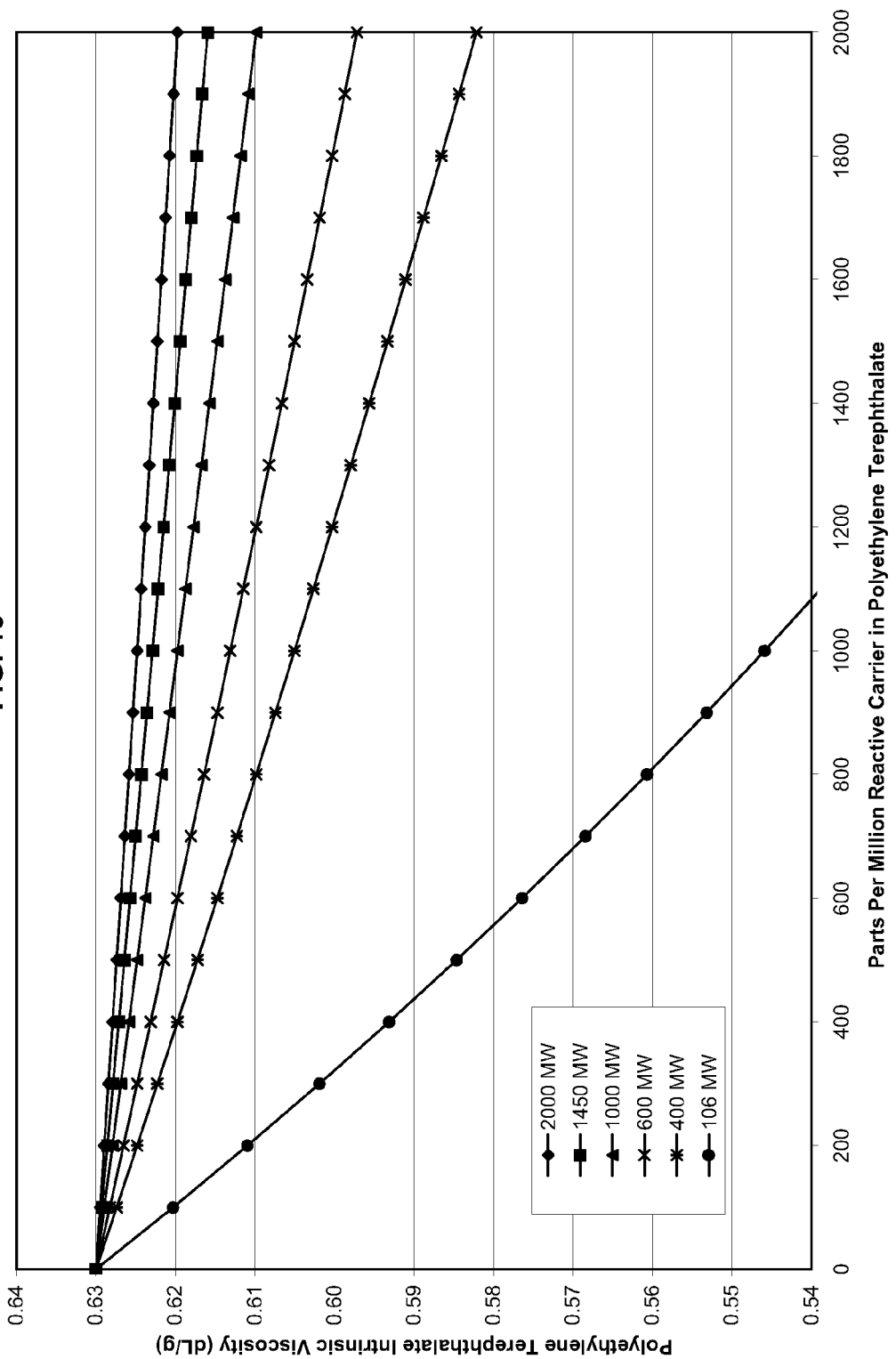
FIG. 15 illustrates the theoretical loss of intrinsic viscosity of polyethylene terephthalate having an intrinsic viscosity of 0.63 dL/g as a function of the concentration of the reactive carrier at various molecular weights.
Figure 16:
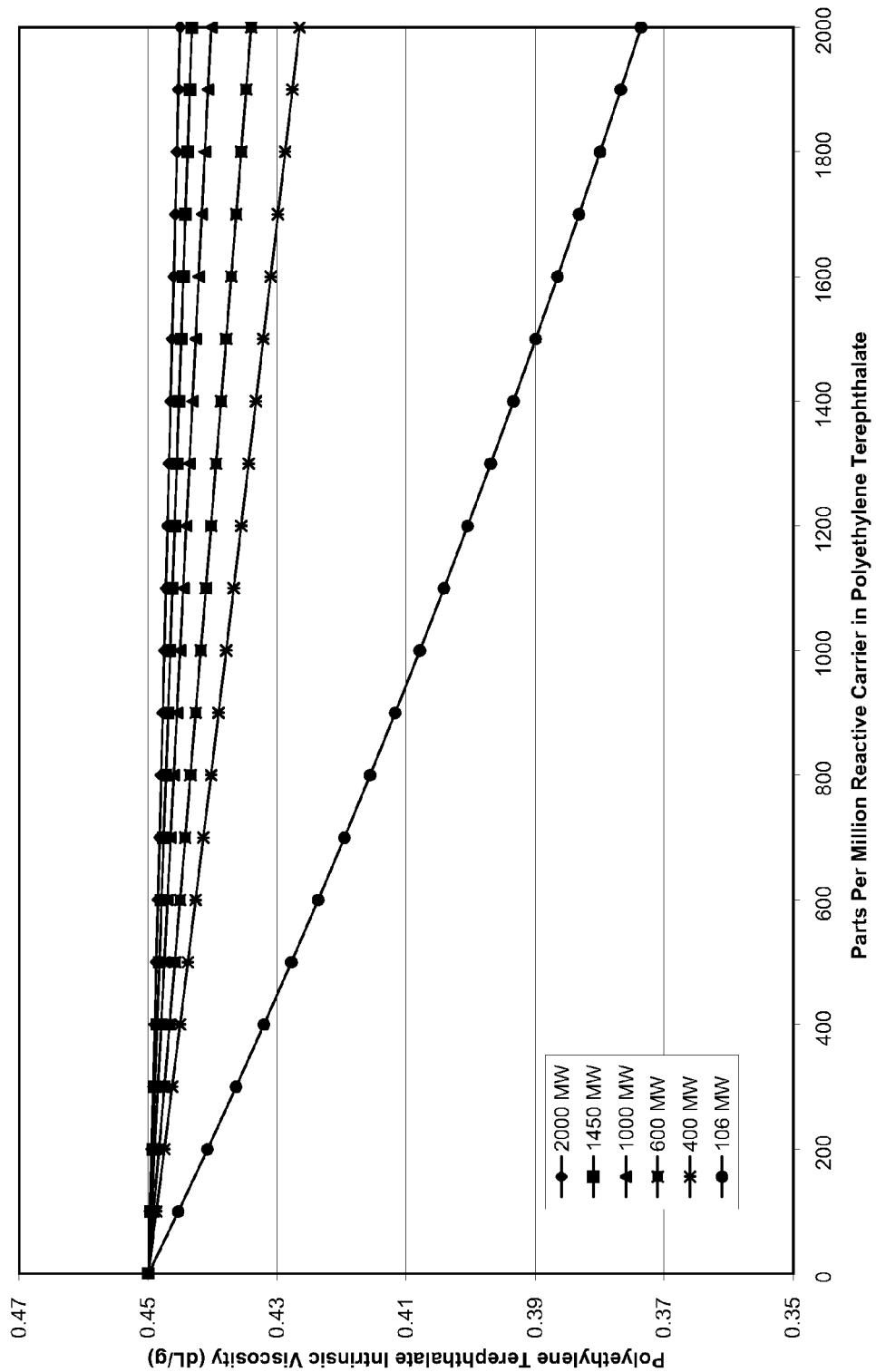
FIG. 16 illustrates the theoretical loss of intrinsic viscosity of polyethylene terephthalate having an intrinsic viscosity of 0.45 dL/g as a function of the concentration of the reactive carrier at various molecular weights.

FIGS. 15 and 16 illustrate the theoretical loss of intrinsic viscosity as a function of reactive carrier concentration at several molecular weights. FIG. 15 depicts the impact of the reactive carrier on polyethylene terephthalate having an intrinsic viscosity of 0.63 dL/g. Similarly, FIG. 16 depicts the impact of the reactive carrier on polyethylene terephthalate having intrinsic viscosity of 0.45 dL/g. Note that at any concentration, the reactive carriers having higher molecular weights have less adverse effect upon intrinsic viscosity of the polymer resin.

In an exemplary process, the continuous feed of terephthalic acid and excess ethylene glycol enters a direct esterification vessel. The esterification vessel is operated at a temperature of between about 240° C. and 290° C. and at a pressure of between about 5 and 85 psia (e.g., atmospheric pressure) for between about one and five hours. The esterification reaction, which is typically catalyzed using both titanium and cobalt catalysts, forms low molecular weight monomers, oligomers, and water. The water is removed as the reaction proceeds to provide favorable reaction equilibrium.

Thereafter, the low molecular weight monomers and oligomers are polymerized via melt polycondensation to form polyethylene terephthalate polyester. This polycondensation stage generally employs a series of two or more vessels and is operated at a temperature of between about 250° C. and 305° C. for between about one and four hours. The polycondensation reaction usually begins in a first vessel called the low polymerizer. The low polymerizer is operated at a pressure range of between about 0 and 70 torr (e.g., 10-60 mm Hg). The monomers and oligomers polycondense to form polyethylene terephthalate prepolymers and polymers (i.e., the polymer melt), as well as ethylene glycol.

To promote favorable reaction kinetics, ethylene glycol is removed from the polymer melt using an applied vacuum to drive the reaction to completion. In this regard, the polymer melt is typically agitated to promote the escape of the ethylene glycol from the polymer melt and to assist the highly viscous polymer melt in moving through the polymerization vessel.

As the polymer melt is fed into successive vessels, the molecular weight and thus the intrinsic viscosity of the polymer melt increases. The temperature of each vessel is generally increased and the pressure decreased to allow greater polymerization in each successive vessel.

The final vessel, generally called the "high polymerizer," is operated at a pressure of between about 0 and 40 torr. Like the low polymerizer, each of the polymerization vessels is connected to a vacuum system having a condenser, and each is typically agitated to facilitate the removal of ethylene glycol and degradation byproducts. The residence time in the polymerization vessels and the feed rate of the ethylene glycol and terephthalic acid into the continuous process is determined, in part, based on the target molecular weight of the polyethylene terephthalate polyester. Because the molecular weight can be readily determined based on the intrinsic viscosity of the polymer melt, the intrinsic viscosity of the polymer melt is generally used to determine polymerization conditions, such as temperature, pressure, the feed rate of the reactants, and the residence time within the polymerization vessels.

Note that in addition to the formation of polyethylene terephthalate polymers, side reactions occur that produce undesirable by-products. For example, the esterification of ethylene glycol forms diethylene glycol, which is incorporated into the polymer chain. As is known to those of skill in the art, diethylene glycol lowers the softening point of the polymer. Moreover, cyclic oligomers (e.g., trimer and tetramers of terephthalic acid and ethylene glycol) may occur in minor amounts. The continued removal of ethylene glycol as it forms in the polycondensation reaction will generally reduce the formation of these by-products.

After the polymer melt exits the polycondensation stage, typically from the high polymerizer, phosphorus stabilizer is introduced via a reactive carrier. Thereafter, the polymer melt is generally filtered and extruded. After extrusion, the polyethylene terephthalate is quenched, typically by spraying with water, to solidify it. The solidified polyethylene terephthalate polyester is cut into chips or pellets for storage and handling purposes. The polyester pellets typically have an average mass of about 15-20 mg. As used herein, the term "pellets" is used generally to refer to chips, pellets, and the like.

Although the prior discussion assumes a continuous production process, it will be understood that the invention is not so limited. The teachings disclosed herein may be applied to semi-continuous processes and even batch processes.

As will be known to those of skill in the art, the pellets formed from the polyethylene terephthalate polymers may be subjected to crystallization and, if necessary, solid state polymerization to increase the molecular weight of the polyethylene terephthalate resin. As compared with antimony, for example, titanium is substantially less active as an SSP catalyst. Thus, to facilitate the solid phase polymerization of the polyethylene terephthalate resins, complementary SSP catalysts are introduced to the polymer melt prior to solid phase polymerization, typically during polycondensation.

Preferred SSP catalysts include Group I and Group II metals. Acetate salts of Group I and Group II metals (e.g., calcium acetate, lithium acetate, manganese acetate, potassium acetate, or sodium acetate) or terephthalate salts can increase solid state polymerization rates. The SSP catalyst is typically introduced in an amount sufficient for the final polyethylene terephthalate resin to include between about 10 and 70 ppm of the elemental metal.

After solid state polymerization, the polyester chips are then re-melted and re-extruded to form bottle preforms, which can thereafter be formed into polyester containers (e.g., beverage bottles). Bottles formed from the resins and preforms described herein preferably have sidewall haze of less than about 15 percent, more preferably less than about 10 percent.

Typically, a hot-fill bottle according to the present invention, exhibits an average circumferential dimension change, as measured from the bottle shoulder to the bottle base, of less than about 3 percent when filled at 195° F. and less than about 5 percent when filled at 205° F. Moreover, such a hot-fill bottle according to the present invention exhibits a maximum circumferential dimension change from the bottle shoulder to the bottle base of less than about 5 percent—preferably less than 4 percent—when the bottle is filled at 195° F. (Such shrinkage properties are measured on a 24-hour aged bottle.)

As will be understood by those having ordinary skill in the art, polyethylene terephthalate is typically converted into a container via a two-step process. First, an amorphous bottle preform (e.g., less than about 4 percent crystallinity and typically between about 4 and 7 mm in thickness) is produced from bottle resin by melting the resin in an extruder and injection molding the molten polyester into a preform. Such a preform usually has an outside surface area that is at least an order of magnitude smaller than the outside surface of the final container. The preform is reheated to an orientation temperature that is typically 30° C. above the glass transition temperature ($T_g$).

The reheated preform is then placed into a bottle blow mold and, by stretching and inflating with high-pressure air, formed into a heated bottle. The blow mold is maintained at a temperature between about 115° C. and 200° C., usually between about 120° C. and 160° C. Those having ordinary skill in the art will recognize that the introduction of compressed air into the heated preform effects formation of the heated bottle. Thus, in one variation, the compressed air is turbulently released from the bottle by the balayage technique to facilitate cooling of the heated bottle. It is believed that the preforms according to the present invention can be blow molded into low-shrinkage bottles using lower-than-conventional pressure for the compressed air.

With respect to the high-clarity, hot-fill polyester bottle preforms of the present invention, after the reheating step, the preforms are blow molded into low-shrinkage bottles within a cycle time of less than about 6 seconds (i.e., at normal production rates).

Those of ordinary skill in the art will understand that any defect in the preform is typically transferred to the bottle. Accordingly, the quality of the bottle resin used to form injection-molded preforms is critical to achieving commercially acceptable bottles. Aspects of injection-molding preforms and stretch-blow molding bottles are discussed in U.S. Pat. No. 6,309,718 for Large Polyester Containers and Method for Making the Same, which is hereby incorporated entirely herein by reference.

Those of ordinary skill in the art will further appreciate that branching agents may be included in small amounts (e.g., less than about 2,000 ppm) to increase polymerization rates and improve bottle-making processes. Chain branching agents can be introduced, for example, during esterification or melt phase polymerization. Typically, less than 0.1 mole percent branching agent is included in the polyethylene terephthalate resins of the present invention.

As used herein, the term "branching agent" refers to a multifunctional monomer that promotes the formation of side branches of linked monomer molecules along the main polymer chain. See Odian, Principles of Polymerization, pp. 18-20 (Second Edition 1981). The chain branching agent is preferably selected from the group consisting of trifunctional, tetrafunctional, pentafunctional and hexafunctional alcohols or acids that will copolymerize with polyethylene terephthalate. As will be understood by those skilled in the art, a trifunctional branching agent has one reactive site available for branching, a tetrafunctional branching agent has two reactive sites available for branching, a pentafunctional branching agent has three reactive sites available for branching and a hexafunctional branching agent has four reactive sites available for branching. Further, as used herein, the term "branching agent" embraces dendrimers (i.e., hyperbranched polymeric macromolecules possessing a branches-upon-branches structure).

Acceptable chain branching agents include, but are not limited to, trimesic acid ($C_6H_3(COOH)_3$), pyromellitic acid ($C_6H_2(COOH)_4$), pyromellitic dianhydride, trimellitic acid, trimellitic anhydride, trimethylol propane ($C_2H_5C(CH_2OH)_3$), ditrimethylol propane ($C_2H_5C(CH_2OH)_2C_2H_4OC(CH_2OH)_2C_2H_5$), dipentaerythritol ($CH_2OHC(CH_2OH)_2C_2H_4OC(CH_2OH)_2CH_2OH$), pentaerythritol ($C(CH_2OH)_4$), 1,2,3,4-butanetetracarboxylic acid, ethoxylated glycerol, ethoxylated pentaerythritol (3EO/4OH and 15 EO/4OH from Aldrich Chemicals), ethoxylated trimethylol propane (2.5EO/OH and 20EO/3OH from Aldrich Chemicals), and Lutrol HF-1 (an ethoxylated glycerol from BASF).

Preferred aromatic chain branching agents—aromatic rings appear to curb stress nucleation—include trimellitic acid (TMLA), trimellitic anhydride (TMA), pyromellitic acid (PMLA), pyromellitic dianhydride (PMDA), benzophenone tetracarboxylic acid, benzophenone tetracarboxylic dianhydride, naphthalene tetracarboxylic acid, and naphthalene tetracarboxylic dianhydride, as well as their derivatives:

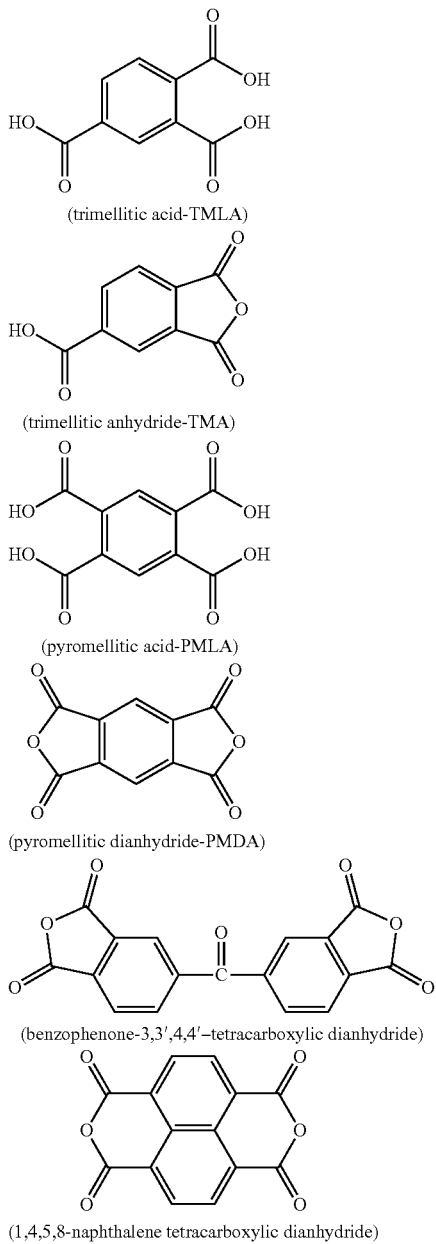

(trimellitic acid-TMLA)

(trimellitic anhydride-TMA)

(pyromellitic acid-PMLA)

(pyromellitic dianhydride-PMDA)

(benzophenone-3,3',4,4'-tetracarboxylic dianhydride)

(1,4,5,8-naphthalene tetracarboxylic dianhydride)

The inclusion of chain branching agent has been observed to improve bottles formed from the present polyethylene terephthalate resins. FIGS. 17-26 show that the inclusion of branching agent seems to improve certain properties of carbonated soft drink bottles, such as caustic stress cracking and high-pressure expansion, as well as various thermal stability characteristics. In this regard, FIGS. 17-26 depict titanium-catalyzed polyethylene terephthalate resins according to the present invention that include about 3.0 mole percent isophthalic acid and 2.4 mole percent diethylene glycol comonomer substitution and antimony-catalyzed polyethylene terephthalate resins that include about 2.8 mole percent isophthalic acid and 3.0 mole percent diethylene glycol comonomer substitution. Unless otherwise noted, the intrinsic viscosities of the titanium-catalyzed and antimony-catalyzed polyethylene terephthalate resins depicted in FIGS. 17-26 are between about 0.80 dL/g and 0.84 dL/g.

Those having ordinary skill in the art will recognize that a polyester resin should facilitate efficient forming operations (e.g., injection molding and stretch-blow molding). Surprisingly, at a desired molecular weight, polyethylene terephthalate resins that include branching agent yield carbonated soft drink bottles that possess better physical properties than do otherwise identical resins that omit branching agent. Of course, such polyethylene terephthalate resins are suitable not only for carbonated soft drink bottles but also other polyester articles that could benefit from improved strength (e.g., films, sheets, and other containers).

As noted, the polyethylene terephthalate resins of the present invention typically include less than about 0.1 mole percent branching agent. The branching agent present in the polyethylene terephthalate resins can also be expressed in terms of "mole-equivalent branches" per mole of standardized polymer, which is herein described with respect to unmodified polyethylene terephthalate.

As used herein, the term "mole-equivalent branches" refers to the reactive sites available for chain branching on a molar basis (i.e., the number of reactive sites in excess of the two required to form a linear molecule). For example, as will be appreciated by those having ordinary skill in the art, a trifunctional branching agent (e.g., trimethylol propane or trimellitic acid) possesses one reactive site that is available for branching. A tetrafunctional branching agent (e.g., pentaerythritol) possesses two reactive sites that are available for branching. Similarly, as further examples, a pentafunctional branching agent and a hexafunctional branching agent can possess three and four reactive sites, respectively, that are available for branching.

As used herein, the term "standardized polymer" refers to the repeat unit of unmodified polyethylene terephthalate, which has a molecular weight of 192 g/mol. In this regard, it will be understood by those having ordinary skill in the art that, for a given total weight of polyethylene terephthalate, comonomer substitution, and branching agent, changing the relative mole fraction and/or molecular weight of the comonomer modifiers will affect total moles. Consequently, to maintain consistency across various concentrations and molecular weights of comonomer modifiers, the chain branching agent concentration is based on the repeat unit of unmodified polyethylene terephthalate.

In other words, the weight fraction of branching agent should be calculated as if the polymer is made of only unmodified polyethylene terephthalate. Consequently, the mole fraction and/or molecular weight of comonomer modifiers can be disregarded in calculating mole-equivalent branches per mole of standardized polymer.

Accordingly, as will be appreciated by those having ordinary skill in the art, a polyethylene terephthalate resin of the present invention that includes less than about 0.1 mole percent of a trifunctional chain branching agent (i.e., providing one available chain branching reactive site) can be characterized as a polyethylene terephthalate resin that includes branching agent in an amount less than about 0.1 percent mole-equivalent branches per mole of standardized polymer as herein defined.

Likewise, as herein defined, a polyethylene terephthalate resin of the present invention that includes less than about 0.1 mole percent of a tetrafunctional chain branching agent (i.e., providing two available chain branching reactive sites), can be characterized as a polyethylene terephthalate resin that includes branching agent in an amount less than about 0.2 percent mole-equivalent branches per mole of standardized polymer.

Similarly, as herein defined, a polyethylene terephthalate resin of the present invention that includes less than about 0.1 mole percent of a pentafunctional chain branching agent (i.e., providing three available chain branching reactive sites), can be characterized as a polyethylene terephthalate resin that includes branching agent in an amount less than about 0.3 percent mole-equivalent branches per mole of standardized polymer.

Finally, as herein defined, a polyethylene terephthalate resin of the present invention that includes less than about 0.1 mole percent of a hexafunctional chain branching agent (i.e., providing four available chain branching reactive sites), can be characterized as a polyethylene terephthalate resin that includes branching agent in an amount less than about 0.4 percent mole-equivalent branches per mole of standardized polymer.

To illustrate this relationship (i.e., mole-equivalent branches per mole of standardized polymer), assume 1000 grams of starting materials—about 175 ppm pentaerythritol, which has a molecular weight of 136.15 g/mol, and the remainder polyethylene terephthalate. This is equivalent to about 0.175 gram pentaerythritol, or 0.0013 moles of pentaerythritol, and 999.825 grams polyethylene terephthalate, or 5.21 moles polyethylene terephthalate repeat units. The mole fraction of pentaerythritol relative to the polyethylene terephthalate is, therefore, about 0.025 mole percent (i.e., 0.00025–0.0013 moles of pentaerythritol÷5.21 moles polyethylene terephthalate). As noted, pentaerythritol has two available chain branching reactive sites. Thus, the mole-equivalent branches per mole of unmodified polyethylene terephthalate is about 0.050 percent (i.e., 0.00050 mole-equivalent branches per mole of standardized polymer.)

Exemplary polyethylene terephthalate resins of the present invention can include, among other illustrative concentrations, chain branching agent in an amount of less than about 0.4 percent mole-equivalent branches per mole of standardized polymer as defined herein; less than about 0.3 percent mole-equivalent branches per mole of standardized polymer as defined herein; less than about 0.2 percent mole-equivalent branches per mole of standardized polymer as defined herein; less than about 0.14 percent mole-equivalent branches per mole of standardized polymer as defined herein; less than about 0.1 percent mole-equivalent branches per mole of standardized polymer as defined herein; less than about 0.08 percent mole-equivalent branches per mole of standardized polymer as defined herein; less than about 0.075 percent mole-equivalent branches per mole of standardized polymer as defined herein; less than about 0.06 percent mole-equivalent branches per mole of standardized polymer as defined herein; less than about 0.05 percent mole-equivalent branches per mole of standardized polymer as defined herein; and less than about 0.04 percent mole-equivalent branches per mole of standardized polymer as defined herein.

Other exemplary embodiments of the invention include polyethylene terephthalate resins that incorporate chain branching agent in an amount ranging from about 0.02 to about 0.2 percent mole-equivalent branches per mole of standardized polymer as defined herein; from about 0.04 to about 0.2 percent mole-equivalent branches per mole of standardized polymer as defined herein; from about 0.08 to about 0.2 percent mole-equivalent branches per mole of standardized polymer as defined herein; from about 0.03 to about 0.14 percent mole-equivalent branches per mole of standardized polymer as defined herein; from about 0.025 to about 0.1 percent mole-equivalent branches per mole of standardized polymer as defined herein; from about 0.03 to about 0.08 percent mole-equivalent branches per mole of standardized polymer as defined herein; from about 0.025 to about 0.075 percent mole-equivalent branches per mole of standardized polymer as defined herein; from about 0.05 to about 0.075 percent mole-equivalent branches per mole of standardized polymer as defined herein; from about 0.025 to about 0.05 percent mole-equivalent branches per mole of standardized polymer as defined herein; from about 0.04 to about 0.05 percent mole-equivalent branches per mole of standardized polymer as defined herein; from about 0.01 to about 0.04 percent mole-equivalent branches per mole of standardized polymer as defined herein, among other concentrations; and from about 0.02 to about 0.03 percent mole-equivalent branches per mole of standardized polymer as defined herein, among other concentrations.

The weight fraction corresponding to mole-equivalent branches per mole of standardized polymer can be estimated for any branching agent using the following equation:

$$\text{branching agent(ppm)} = (MEB \div CBRS) \cdot (BAMW \div SPMW) \cdot 10^6, \text{wherein}$$

MEB=mole-equivalent branches per mole of standardized polymer
CBRS=number of available chain branching reactive sites
BAMW=molecular weight of the branching agent (g/mol)
SPMW=192 g/mol—molecular weight of the standardized polymer (i.e., unmodified polyethylene terephthalate).

Thus, for example, pentaerythritol that is present in an amount between about 0.0004 and 0.00075 mole-equivalent branches per mole of standardized polymer (i.e., between about 0.04 and 0.075 percent mole-equivalent branches per mole) is equivalent to a weight fraction of between about 140 and 270 ppm when based on the standardized polymer of unmodified polyethylene terephthalate (i.e., having a repeat unit molecular weight of about 192 g/mol). This exemplary amount of pentaerythritol has been observed to improve the properties of carbonated soft drink bottles formed from the polyethylene terephthalate resins of the present invention.

As noted, trifunctional branching agent (e.g., trimethylol propane—MW=134.17 g/mol, or trimellitic acid—MW=210.15 g/mol) possesses one branching site and tetrafunctional branching agent (e.g., pentaerythritol—MW=136.15 g/mol) possesses two branching sites.

Consequently, for trimethylol propane, 0.1 mole percent branching agent (i.e., about 700 ppm) converts to 0.1 percent mole-equivalent branches per mole of standardized polymer, and for trimellitic acid, 0.1 mole percent branching agent (i.e., about 1,100 ppm) likewise converts to 0.1 percent mole-equivalent branches per mole of standardized polymer (i.e., a 1× conversion). For pentaerythritol, in contrast, 0.1 mole percent branching agent (i.e., about 700 ppm) converts to 0.2 percent mole-equivalent branches per mole of standardized polymer (i.e., a 2× conversion).

Thus, by way of comparison, pentaerythritol at 0.1 percent mole-equivalent branches per mole of standardized polymer converts to about 350 ppm. Stated otherwise, 350 ppm pentaerythritol has about the same branching efficacy as 700 ppm trimethylol propane or 1,100 ppm trimellitic acid.

It will be appreciated by those of skill in the chemical arts that if the mole-equivalent branches were not referenced to a mole of standardized polymer, a chain branching agent concentration (e.g., less than 0.4 percent mole-equivalent branches per mole of polyester) could translate to a slightly higher or lower weight fraction, (i.e., ppm), depending on the mole fraction and/or average molecular weight of the comonomer modifiers. By employing unmodified polyethylene terephthalate as the standardized polymer, however, pentaerythritol at about 0.05 percent mole-equivalent branches per mole of standardized polymer is equivalent to a weight fraction of about 177 ppm, regardless of the mole fraction and/or molecular weight of the comonomer modifiers.

This application incorporates entirely by reference the following commonly assigned patents, each of which discusses stoichiometric molar ratios with respect to reactive end groups (i.e., "mole-equivalent branches"): U.S. Pat. No. 6,623,853, for Polyethylene Glycol Modified Polyester Fibers and Method for Making the Same; U.S. Pat. No. 6,582,817, for Nonwoven Fabrics Formed from Polyethylene Glycol Modified Polyester Fibers and Method for Making the Same; U.S. Pat. No. 6,509,091, for Polyethylene Glycol Modified Polyester Fibers; U.S. Pat. No. 6,454,982, for Method of Preparing Polyethylene Glycol Modified Polyester Filaments; U.S. Pat. No. 6,399,705, for Method of Preparing Polyethylene Glycol Modified Polyester Filaments; U.S. Pat. No. 6,322,886, for Nonwoven Fabrics Formed from Polyethylene Glycol Modified Polyester Fibers and Method for Making the Same; U.S. Pat. No. 6,303,739, for Method of Preparing Polyethylene Glycol Modified Polyester Filaments; and U.S. Pat. No. 6,291,066, for Polyethylene Glycol Modified Polyester Fibers and Method for Making the Same.

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. A polyethylene terephthalate resin, comprising:
   polyethylene terephthalate polymers including between about 5 and 8 mole percent comonomer substitution;
   branching agent in an amount greater than zero and less than about 0.08 percent mole-equivalent branches per mole of standardized polymer, the standardized polymer being unmodified polyethylene terephthalate;
   between about 2 and 50 ppm of elemental titanium;
   more than about 10 ppm of elemental cobalt;
   at least one heat-up rate additive selected from the group consisting of carbon black, activated carbon and graphite;
   less than about 100 ppm of elemental antimony, if any; and
   more than about 5 ppm of elemental phosphorus; and
   wherein the polyethylene terephthalate resin has an L* value of more than about 65 as classified in the CIE L*a*b* color space.

2. A polyethylene terephthalate resin according to claim 1, comprising:
   between about 2 and 20 ppm of elemental titanium;
   less than about 75 ppm of elemental antimony, if any; and
   between about 15 and 75 ppm of elemental phosphorus.

3. A polyethylene terephthalate resin according to claim 1, comprising more than about 20 ppm of elemental phosphorus.

4. A polyethylene terephthalate resin according to claim 1, wherein the polyethylene terephthalate polymers comprise a diacid moiety that includes between about 3 and 6 mole percent isophthalic acid and a diol moiety that includes between about 1 and 4 mole percent diethylene glycol.

5. A polyethylene terephthalate resin according to claim 1, wherein the heat-up rate additive is present in an amount sufficient to improve resin reheating.

6. A polyethylene terephthalate resin according to claim 1, wherein the polyethylene terephthalate resin has an absorbance (A) of at least about 0.25 cm$^{-1}$ at a wavelength of 1100 nm and at a wavelength of 1280 nm, a 1100:550 absorption ratio of at least about 75 percent, a 1280:550 absorption ratio of at least about 75 percent, a 1100:700 absorption ratio of at least about 85 percent, and a 1280:700 absorption ratio of at least about 85 percent.

7. A polyethylene terephthalate resin according to claim 1, wherein the polyethylene terephthalate resin has an intrinsic viscosity between about 0.50 dL/g and 0.70 dL/g.

8. A polyethylene terephthalate resin according to claim 1, wherein the polyethylene terephthalate resin has an intrinsic viscosity of between about 0.68 dL/g and 0.80 dL/g.

9. An article formed from the polyethylene terephthalate resin of claim 1.

10. The polyethylene terephthalate resin according to claim 1, wherein the heat-up rate additive is present in an amount of from 4 to 16 ppm.

11. A polyethylene terephthalate resin, comprising:
    polyethylene terephthalate polymers including more than 6 mole percent comonomer substitution;
    branching agent in an amount greater than zero and less than about 0.08 percent mole-equivalent branches per mole of standardized polymer, the standardized polymer being unmodified polyethylene terephthalate;
    between about 5 and 25 ppm of elemental titanium;
    less than about 100 ppm of elemental antimony, if any; and
    at least one heat-up rate additive selected from the group consisting of activated carbon, carbon black and graphite, present in an amount sufficient to improve resin reheating; and
    wherein the polyethylene terephthalate resin has an L* value of more than about 65 as classified in the CIE L*a*b* color space.

12. A polyethylene terephthalate resin according to claim 11, comprising more than about 20 ppm of elemental phosphorus.

13. A polyethylene terephthalate resin according to claim 11, comprising more than about 60 ppm of elemental phosphorus.

14. A polyethylene terephthalate resin according to claim 11, comprising:
    less than about 75 ppm of elemental antimony, if any;
    more than about 15 ppm of elemental phosphorus; and
    between about 15 and 40 ppm of elemental cobalt.

15. A polyethylene terephthalate resin according to claim 11, comprising:
    less than about 25 ppm of elemental antimony, if any; and
    more than about 5 ppm of elemental phosphorus.

16. A polyethylene terephthalate resin according to claim 11, wherein the polyethylene terephthalate polymers include between about 7 and 10 mole percent comonomer substitution.

17. A polyethylene terephthalate resin according to claim 11, wherein the polyethylene terephthalate polymers comprise at least about 4 mole percent diol comonomer substitution and less than about 3 mole percent diacid and/or diester comonomer substitution.

18. A polyethylene terephthalate resin according to claim 11, wherein the polyethylene terephthalate polymers comprise at least about 4 mole percent diacid and/or diester comonomer substitution and less than about 3 mole percent diol comonomer substitution.

19. A polyethylene terephthalate resin according to claim 11, wherein the branching agent is selected from the group consisting of trimesic acid ($C_6H_3(COOH)_3$), pyromellitic acid ($C_6H_2(COOH)_4$), pyromellitic dianhydride, trimellitic acid, trimellitic anhydride, trimethylol propane ($C_2H_5C$ (CH$_2$OH)$_3$), ditrimethylol propane (C$_2$H$_5$C(CH$_2$OH)$_2$C$_2$H$_4$OC(CH$_2$OH)$_2$C$_2$H$_5$), dipentaerythritol (CH$_2$OHC(CH$_2$OH)$_2$C$_2$H$_4$OC(CH$_2$OH)$_2$CH$_2$OH), pentaerythritol (C(CH$_2$OH)$_4$), butanetetracarboxylic acid, ethoxylated glycerol, ethoxylated pentaerythritol, ethoxylated trimethylol propane, benzophenone tetracarboxylic acid, benzophenone tetracarboxylic dianhydride, naphthalene tetracarboxylic acid, naphthalene tetracarboxylic dianhydride, mixtures thereof, and derivatives thereof.

20. A polyethylene terephthalate resin according to claim 11, further comprising one or more metal-containing heat-up rate additives.

21. A polyethylene terephthalate resin according to claim 11, wherein the heat-up rate additive is present in the resin in an amount between about 4 and 16 ppm.

22. A polyethylene terephthalate resin according to claim 11, wherein the polyethylene terephthalate resin has an intrinsic viscosity of more than about 0.6 dL/g.

23. A polyethylene terephthalate resin according to claim 11, wherein the polyethylene terephthalate resin has an intrinsic viscosity of between about 0.68 dL/g and 0.80 dL/g.

24. A polyethylene terephthalate resin according to claim 11, wherein the polyethylene terephthalate resin has an intrinsic viscosity of between about 0.78 dL/g and 0.86 dL/g.

25. A polyethylene terephthalate resin according to claim 11, wherein the polyethylene terephthalate resin possesses an L* value of more than about 70 as classified in the CIE L*a*b* color space.

26. An article formed from the polyethylene terephthalate resin of claim 11.

27. A film or sheet formed from the polyethylene terephthalate resin of claim 11.

28. A preform or container formed from the polyethylene terephthalate resin of claim 11.

29. A container designed for a product capacity of less than about 2.5 liters and formed from the polyethylene terephthalate resin of claim 11, wherein the container has sidewall thickness of less than 0.5 mm and sidewall haze of less than about 5 percent.

30. A polyethylene terephthalate resin according to claim 11, comprising branching agent in an amount between about 0.04 and 0.075 percent mole-equivalent branches per mole of standardized polymer, the standardized polymer being unmodified polyethylene terephthalate.

31. A polyethylene terephthalate resin according to claim 30, wherein the branching agent is selected from the group consisting of trifunctional, tetrafunctional, pentafunctional, and hexafunctional alcohols or acids, and mixtures and derivatives thereof, that will copolymerize with polyethylene terephthalate polymers.

32. A polyethylene terephthalate resin according to claim 11, wherein the polyethylene terephthalate resin has an absorbance (A) of at least about 0.20 cm$^{-1}$ at a wavelength of 1100 nm and at a wavelength of 1280 nm.

33. A polyethylene terephthalate resin according to claim 32, wherein the polyethylene terephthalate resin has a 1100:550 absorption ratio of at least about 70 percent and a 1280:550 absorption ratio of at least about 70 percent.

34. A polyethylene terephthalate resin according to claim 32, wherein the polyethylene terephthalate resin has a 1100:700 absorption ratio of at least about 90 percent and a 1280:700 absorption ratio of at least about 90 percent.

35. A polyethylene terephthalate resin according to claim 11, wherein the polyethylene terephthalate resin has an absorbance (A) of at least about 0.25 cm$^{-1}$ at a wavelength of 1100 nm or at a wavelength of 1280 nm.

36. A polyethylene terephthalate resin according to claim 35, wherein a 1100:550 absorption ratio of at least about 70 percent, a 1280:550 absorption ratio of at least about 70 percent, a 1100:700 absorption ratio of at least about 85 percent, and a 1280:700 absorption ratio of at least about 85 percent.

37. A polyethylene terephthalate resin, comprising:
polyethylene terephthalate polymers including more than 6 mole percent comonomer substitution and less than 12 mole percent comonomer substitution;
branching agent in an amount greater than zero and less than about 0.08 percent mole-equivalent branches per mole of standardized polymer, the standardized polymer being unmodified polyethylene terephthalate;
between about 2 and 20 ppm of elemental titanium;
less than about 100 ppm of elemental antimony, if any;
at least about 5 ppm of elemental phosphorus; and
a carbon-based heat-up rate additive that is present in the resin in an amount greater than 0 ppm and less than about 25 ppm; and
wherein the polyethylene terephthalate resin has an intrinsic viscosity between about 0.50 dL/g and 0.90 dL/g; and
wherein the polyethylene terephthalate resin has an L* value of more than about 65 as classified in the CIE L*a*b* color space.

38. A polyethylene terephthalate resin according to claim 37, comprising branching agent in an amount between about 0.025 to about 0.05 percent mole-equivalent branches per mole of standardized polymer, the standardized polymer being unmodified polyethylene terephthalate.

39. A polyethylene terephthalate resin according to claim 37, comprising at least about 20 ppm of elemental phosphorus.

40. A polyethylene terephthalate resin according to claim 37, comprising at least about 10 ppm of elemental cobalt.

41. A preform or container formed from the polyethylene terephthalate resin of claim 37.

42. The polyethylene terephthalate resin of claim 37, wherein the heat-up rate additive is present in an amount of from 4 to 16 ppm.

43. The polyethylene terephthalate resin of claim 37, wherein the heat-up rate additive is at least one selected from the group consisting of activated carbon, carbon black and graphite.

* * * * *